(12) United States Patent
Kondo et al.

(10) Patent No.: US 7,047,325 B2
(45) Date of Patent: May 16, 2006

(54) DATA PROCESSING APPARATUS, DATA PROCESSING METHOD, AND RECORDING MEDIUM THEREFOR

(75) Inventors: Tetsujiro Kondo, Tokyo (JP); Hideo Nakaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 157 days.

(21) Appl. No.: 09/853,420

(22) Filed: May 10, 2001

(65) Prior Publication Data

US 2002/0019892 A1    Feb. 14, 2002

(30) Foreign Application Priority Data

May 11, 2000    (JP)    ............................. 2000-138364

(51) Int. Cl.
  G06F 3/00    (2006.01)
  G06F 15/00    (2006.01)
  G03F 3/08    (2006.01)

(52) U.S. Cl. .............................. 710/16; 710/15; 710/6; 710/5; 358/1.9; 358/518; 358/521

(58) Field of Classification Search .................... 710/1, 710/8, 10, 11, 17, 18, 62, 63, 16, 15, 6, 5; 358/518, 521, 1.9; 370/254; 382/167, 236
See application file for complete search history.

(56) References Cited

U.S. PATENT DOCUMENTS 5,517,588 A    5/1996    Kondo
5,581,376 A *  12/1996   Harrington .................. 358/518
5,636,290 A *  6/1997    Kita et al. .................... 382/167
5,666,164 A    9/1997    Kondo et al.
5,668,890 A *  9/1997    Winkelman .................. 358/521

(Continued)

FOREIGN PATENT DOCUMENTS

IL    EP000565283 A1 *    3/1993

OTHER PUBLICATIONS

Patent Abstract of Japan, Publication No. 63-038381, Date of Publication Feb. 18, 1988, entitled "Interpolation Circuit For Digital Picture Signal".

(Continued)

Primary Examiner—Kim Huynh
Assistant Examiner—Joshua D. Schneider
(74) Attorney, Agent, or Firm—Frommer Lawrence & Haug LLP; William S. Frommer; Thomas F. Presson

(57) ABSTRACT

An integrated processing box performs processing commonly to a plurality of input devices, a plurality of output devices, or a plurality of storage devices. For example, the integrated processing box performs noise reduction processing on data received from an input device or a storage device or data supplied to an output device or the storage device. The integrated processing box also performs processing, for example, temporal/spatial processing or grayscale processing, variably to each type of input device, each type of output device, or each type of storage device. Accordingly, if the input device is, for example, a video camera, the video camera is formed only by a CCD, a sample-and-hold circuit for sampling and holding the output from the CCD, an AGC circuit for adjusting the gain of the output from the sample-and-hold circuit, and an A/D conversion circuit for converting the analog output of the AGC circuit into a digital output. That is, it is possible to form the video camera without blocks performing defect correction for the pixels of the CCD, γ correction, color matrix conversion.

52 Claims, 39 Drawing Sheets

U.S. PATENT DOCUMENTS

| | | | | |
|---|---|---|---|---|
| 5,699,489 | A * | 12/1997 | Yokomizo | 358/1.9 |
| 5,940,132 | A | 8/1999 | Kondo et al. | |
| 6,031,937 | A * | 2/2000 | Graffagnino | 382/236 |
| 6,189,050 | B1 * | 2/2001 | Sakarda | 710/18 |
| 6,268,939 | B1 * | 7/2001 | Klassen et al. | 358/518 |
| 6,301,708 | B1 | 10/2001 | Gazdik et al. | |
| 6,490,255 | B1 * | 12/2002 | Kiriha et al. | 370/254 |
| 6,526,174 | B1 * | 2/2003 | Graffagnino | 382/236 |

OTHER PUBLICATIONS

Patent Abstract of Japan, Publication No. 63-048088, Date of Publication Feb. 29, 1988, entitled "Interpolation Circuit For Digital Image Signal".

Patent Abstract of Japan, Publication No. 05-167991, Date of Publication Jul. 2, 1993, entitled "Image Conversion Device Capable Of Compensating Resolution".

Patent Abstract of Japan, Publication No. 07-085267, Date of Publication Mar. 31, 1995, entitled "Converting Device For The Number of Quantizing Bits".

Patent Abstract of Japan, Publication No. 07-030859, Date of Publication Jan. 31, 1995, entitled "Frame Interpolation Device".

Patent Abstract of Japan, Publication No. 07-067028, Date of Publication Mar. 10, 1995, entitled "Device And Method For Restoring Image".

Patent Abstract of Japan, Publication No. 08-051599, Date of Publication Feb. 20, 1996, entitled "Image Information Converter".

Patent Abstract of Japan, Publication No. 08-317346, Date of Publication Nov. 29, 1996, entitled "Device And Method For Converting Digital Video Signal".

Patent Abstract of Japan, Publication No. 10-313445, Date of Publication Nov. 24, 1998, entitled "Image Signal Converter, Television Receiver Using The Same, And Generating Device And Method For Coefficient Data Used Therefor".

Patent Abstract of Japan, Publication No. 11-355731, Date of Publication Dec. 24, 1999, entitled "Converting Device And Converting Method For Image Signal And Device And Method For Generating Coefficient Data Used For Them".

Patent Abstract of Japan, Publication No. 2000-092454, Date of Publication Mar. 31, 2000, entitled "Device And Method For Image Information Conversion".

Patent Abstracts of Japan, Publication No. 07-147670 dated Jun. 6, 1995.

Patent Abstracts of Japan, Publication No. 08-275118 dated Oct. 18, 1996.

Patent Abstracts of Japan, Publication No. 10-070709 dated Mar. 10, 1998.

Patent Abstracts of Japan, Publication No. 10-098695 dated Apr. 14, 1998.

* cited by examiner

DATA PROCESSING APPARATUS, DATA PROCESSING METHOD, AND RECORDING MEDIUM THEREFOR

BACKGROUND OF THE INVENTION

1. Field of the Invention

The present invention generally relates to data processing apparatuses, data processing methods, and recording media. More particularly, the invention relates to a data processing apparatus and a data processing method for performing suitable processing on data received from various input devices, data to be supplied to various output devices, and data received from and supplied to various storage devices. The invention also pertains to a recording medium for implementing the above-described method.

2. Description of the Related Art

As output devices for outputting (displaying) images, cathode ray tube (CRT) monitors, liquid crystal display monitors, etc. are known. Further, CRT monitors include national television system committee (NTSC)-type and phase alternation by line (PAL)-type monitors.

Conventionally, in order to watch PAL television programs, a user who has, for example, only an NTSC CRT monitor must purchase a PAL CRT monitor.

That is, even though only the scanning method employed in a PAL CRT monitor is different from that employed in an NTSC CRT monitor, and the other functions are the same, it is necessary for the user to purchase a PAL CRT monitor, thereby increasing the financial burden on the user.

Generally, devices, such as CRT monitors, can be largely divided into three portions, such as portions unique to the devices (hereinafter referred to as "unique portions"), portions which perform processing commonly for some devices (hereinafter referred to as "common processing"), and portions which perform processing variably according to the types of individual devices (hereinafter referred to as "variable processing").

The portion unique to the device is a portion physically essential to the device. For example, concerning a CRT device, a CRT and a deflection circuit are unique portions, and concerning a liquid crystal display monitor, a liquid crystal panel is a unique portion. In, for example, an NTSC CRT monitor and a liquid crystal panel monitor, the portions which perform common processing correspond to a portion for converting NTSC television broadcast signals into red (R), green (G), and blue (B) components, i.e., a portion which performs NTSC decoding processing. In, for example, a CRT monitor, the portions which perform variable processing correspond to a portion for adjusting an image signal to the frequency characteristics associated with the CRT of the CRT monitor. In a liquid crystal display monitor, the portions which perform variable processing correspond to a portion for adjusting an image signal to the frequency characteristics associated with the liquid crystal panel of the liquid crystal monitor.

Accordingly, the common processing can be performed independent of the devices. On the other hand, the variable processing is dependent upon the devices, and the processing content is different according to the device.

As discussed above, conventionally, CRT monitors must be selected according to the scanning method. Accordingly, it is expected in the future that a device having only a unique portion will be sold separately from a data processing apparatus for performing the common processing and the variable processing. However, it would be inconvenient if a different data processing apparatus is required for each device.

SUMMARY OF THE INVENTION

Accordingly, it is an object of the present invention to suitably perform processing on various types of devices.

In order to achieve the above object, according to one aspect of the present invention, there is provided a data processing apparatus for selectively receiving information data from a plurality of types of input devices. The data processing apparatus includes an input interface functioning as an interface with the input devices. An input common processing unit performs processing, commonly to the input devices, on the information data received from the input devices via the input interface. An input variable processing performs processing, variably according to the type of input device selected from a plurality of types of input devices, on the information data received from the input devices via the input interface.

The aforementioned data processing apparatus may further include an input device detector for detecting the type of input device from which the information data is received via the input interface. In this case, the input common processing unit and the input variable processing unit may perform the processing based on a detection result obtained from the input device detector.

The input interface may function as an interface with each of at least two of the input devices.

The aforementioned data processing apparatus may further include: an output interface functioning as an interface with a plurality of types of output devices; an output common processing unit for performing processing, commonly to the output devices, on information data to be supplied to the output devices via the output interface; and an output variable processing unit for performing processing, variably according to the type of output device selected from a plurality of output devices, on the information data supplied to the output devices via the output interface.

The above-described data processing apparatus may further include an output device detector for detecting the type of output device to which the information data is to be supplied via the output interface. In this case, the output common processing unit and the output variable processing unit may perform the processing based on a detection result obtained from the output device detector.

The output interface may function as an interface with each of at least two of the output devices.

The input interface and the output interface may be integrated into a single interface.

The above-described data processing apparatus may further include: a storage interface functioning as an interface with a plurality of types of storage devices; a storage common processing unit for performing processing, commonly to the storage devices, on information data received from the storage devices via the storage interface or information data supplied to the storage devices via the storage interface; and a storage variable processing unit for performing processing, variably according to the type of storage device selected from the storage devices, on the information data received from the storage devices via the storage interface or the information data supplied to the storage devices via the storage interface.

The aforementioned data processing apparatus may further include a storage device detector for detecting the type of storage device from or to which the information data is received or supplied via the storage interface. In this case, the storage common processing unit and the storage variable processing unit may perform the processing based on a detection result obtained from the storage device detector.

The storage interface may function as an interface with each of at least two of the storage devices.

The input interface and the storage interface may be integrated into one interface.

The input interface, the output interface, and the storage interface may be integrated into a single interface.

According to another aspect of the present invention, there is provided a data processing method for use in a data processing apparatus for selectively receiving information data from a plurality of types of input devices. The data processing method includes: an input common processing step of performing processing, commonly to the input devices, on the information data received from the input devices via an input interface functioning as an interface with the input devices; and an input variable processing step of performing processing, variably according to the input device selected from a plurality of types of input devices, on the information data received from the input devices via the input interface.

According to still another aspect of the present invention, there is provided a recording medium for storing a program which causes a computer to perform data processing for processing information data received from a plurality of types of input devices. The program includes: an input common processing step of performing processing, commonly to the input devices, on the information data received from the input devices via an input interface functioning as an interface with the input devices; and an input variable processing step of performing processing, variably according to the input device selected from a plurality of types of input devices, on the information data received from the input devices via the input interface.

With this arrangement, common processing is performed on information data received from a plurality of types of input devices via the input interface, and variable processing is also performed on the information data according to the type of input device. Thus, processing can be suitably performed on various types of input devices.

According to a further aspect of the present invention, there is provided a data processing apparatus for selectively supplying information data to a plurality of types of output devices. The data processing apparatus includes an output interface functioning as an interface with the output devices. An output common processing unit performs processing, commonly to the output devices, on the information data to be supplied to the output devices via the output interface. An output variable processing unit performs processing, variably according to the type of output device selected from a plurality of types of output devices, on the information data to be supplied to the output devices via the output interface.

The aforementioned data processing apparatus may further include an output device detector for detecting the type of output device to which the information data is to be supplied via the output interface. In this case, the output common processing unit and the output variable processing unit may perform the processing based on a detection result obtained from the output device detector.

In the aforementioned data processing apparatus, the output interface may function as an interface with each of at least two of the output devices.

The aforementioned data processing apparatus may further include: a storage interface functioning as an interface with a plurality of types of storage devices; a storage common processing unit for performing processing, commonly to the storage devices, on information data received from the storage devices via the storage interface or information data supplied to the storage devices via the storage interface; and a storage variable processing unit for performing processing, variably according to the type of storage device selected from a plurality of types of storage devices, on the information data received from the storage devices via the storage interface or the information data supplied to the storage devices via the storage interface.

The above-described data processing apparatus may further include a storage device detector for detecting the type of storage device from or to which the information data is received or supplied via the storage interface. In this case, the storage common processing unit and the storage variable processing unit may perform the processing based on a detection result obtained from the storage device detector.

The storage interface may function as an interface with each of at least two of the storage devices.

The output interface and the storage interface may be integrated into a single interface.

According to a yet further aspect of the present invention, there is provided a data processing method for use in a data processing apparatus for selectively supplying information data to a plurality of types of output devices. The data processing method includes: an output common processing step of performing processing, commonly to the output devices, on the information data to be supplied to the output devices via an output interface functioning as an interface with the output devices; and an output variable processing step of performing processing, variably according to the type of output device selected from a plurality of types of output devices, on the information data to be supplied to the output devices via the output interface.

According to a further aspect of the present invention, there is provided a recording medium for storing a program which causes a computer to perform data processing for processing information data to be supplied to a plurality of types of output devices. The program includes: an output common processing step of performing processing, commonly to the output devices, on the information data to be supplied to the output devices via an output interface functioning as an interface with the output devices; and an output variable processing step of performing processing, variably according to the type of output device selected from a plurality of types of output devices, on the information data to be supplied to the output devices via the output interface.

With this arrangement, common processing is performed on information data supplied to a plurality of types of output devices via the output interface, and variable processing is also performed on the information data according to the type of output device. Thus, processing can be suitably performed on various types of output devices.

According to a further aspect of the present invention, there is provided a data processing apparatus for selectively receiving and supplying information data from and to a plurality of types of storage devices. The data processing apparatus includes a storage interface functioning as an interface with a plurality of types of storage devices. A storage common processing unit performs processing, commonly to the storage devices, on the information data received from the storage devices via the storage interface or the information data supplied to the storage devices via the storage interface. A storage variable processing unit performs processing, variably according to the type of storage device selected from a plurality of types of storage devices, on the information data received from the storage devices via the storage interface or information data supplied to the storage devices via the storage interface.

The aforementioned data processing apparatus may further include a storage device detector for detecting the type of storage device from or to which the information data is received or supplied via the storage interface. In this case, the storage common processing unit and the storage variable processing unit may perform the processing based on a detection result obtained from the storage device detector.

The storage interface may function as an interface with each of at least two of the storage devices.

According to a further aspect of the present invention, there is provided a data processing method for use in a data processing apparatus for selectively receiving and supplying information data from and to a plurality of types of storage devices. The data processing method includes: a storage common processing step of performing processing, commonly to the storage devices, on the information data to be supplied to the storage devices via a storage interface functioning as an interface with the storage devices, or on the information data received from the storage devices via the storage interface; and a storage variable processing step of performing processing, variably according to the type of storage device selected from a plurality of types of storage devices, on the information data to be supplied to the storage devices from the storage interface, or on the information data received from the storage devices via the storage interface.

According to a further aspect of the present invention, there is provided a recording medium for storing a program which causes a computer to perform data processing for processing information data received and supplied from and to a plurality of types of storage devices. The program includes: a storage common processing step of performing processing, commonly to the storage devices, on the information data to be supplied to the storage devices via a storage interface functioning as an interface with the storage devices, or on the information data received from the storage devices via the storage interface; and a storage variable processing step of performing processing, variably according to the type of storage device selected from a plurality of types of storage devices, on the information data to be supplied to the storage devices from the storage interface, or on the information data received from the storage devices via the storage interface.

With this arrangement, common processing is performed on information data received from and supplied to a plurality of types of storage devices via the storage interface, and variable processing is also performed on the information data according to the type of storage device. Thus, processing can be suitably performed on various types of storage devices.

DESCRIPTION OF THE PREFERRED EMBODIMENTS

Figure 1:
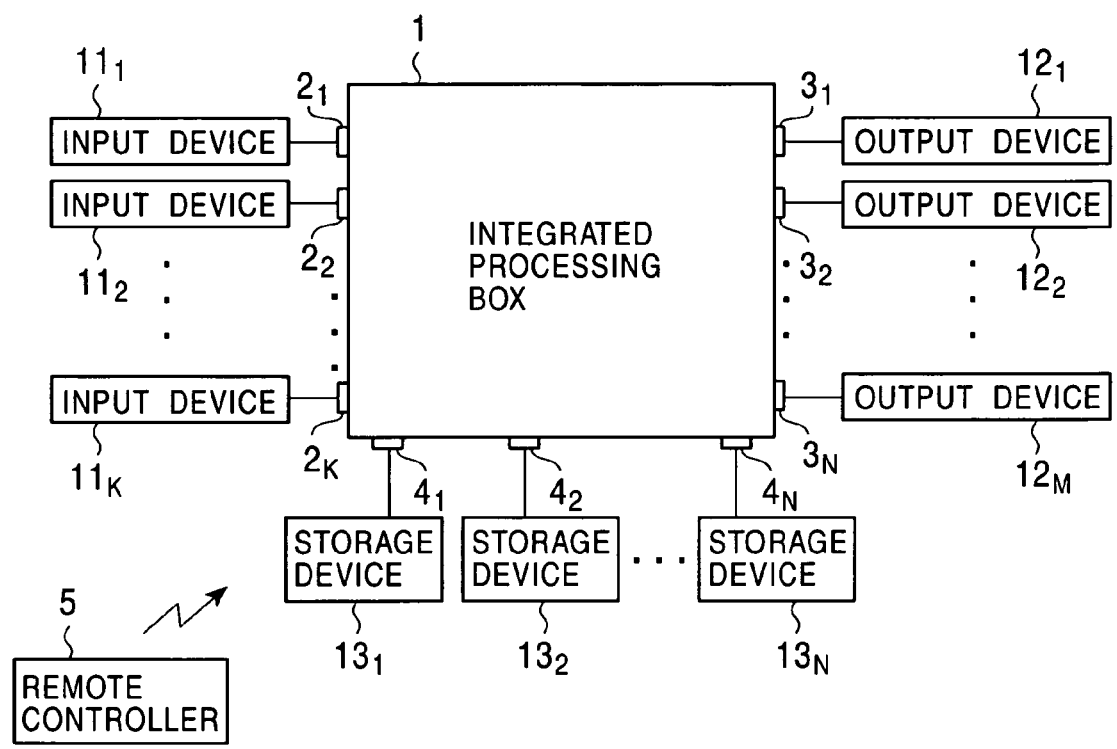
FIG. 1 is a block diagram illustrating an example of the configuration of a data processing system according to an embodiment of the present invention.

FIG. 1 illustrates a data processing system according to a first embodiment of the present invention. In this specification, a system is a logical group of a plurality of devices, and it is not essential that the different devices be within the same housing.

An integrated processing box 1 includes a plurality of (K in the embodiment shown in FIG. 1) terminals $2_1$ through $2_K$ connectable to a plurality of input devices $11_1$ through $11_K$, respectively, a plurality of (M in the embodiment shown in FIG. 1) terminals $3_1$ through $3_M$ connectable to a plurality of output devices $12_1$ through $12_M$, and a plurality of (N in the embodiment shown in FIG. 1) terminals $4_1$ through $4_N$ connectable to a plurality of storage devices $13_1$ through $13_N$.

The integrated processing box 1 performs the common processing and the variable processing on data received from the input device $11_k$ (k=1, 2, ..., K), data to be output to the output device $12_m$ (m=1, 2, ..., M), data to be written into the storage device $13_n$ (n=1, 2, ..., N), and data read from the storage device $13_n$.

The input device 11k is a device for receiving data, for example, a video camera, a digital camera, an image scanner, etc. The output device $12_m$ is a device for outputting data in a form recognizable by humans, for example, a CRT monitor, a liquid crystal display monitor, a projector, a printer, and so on. The storage device $13_n$ is a device for storing data, for example, a digital versatile disc (DVD) player, a video cassette recorder (VCR), etc.

As discussed above, conventional devices can be largely divided into unique portions, portions which perform common processing, and portions which perform variable processing. Among the processing performed by the three portions, the integrated processing box 1 performs the common processing and the variable processing. Thus, it is not necessary to provide portions which perform the common processing and the variable processing for the input device $11_k$, the output device $12_m$, and the storage device $13_n$ connected to the integrated processing box 1. That is, only the unique portions are required for the input device $11_k$, the output device $12_m$, and the storage device $13_n$ connected to the integrated processing box 1.

It should be noted, however, that the input device $11_k$, the output device $12_m$, and the storage device $13_n$ may have three portions, i.e., unique portions, portions which perform the common processing, and portions which perform the variable processing, as in conventional devices. In other words, not only the devices having only unique portions, but also conventional devices, are connectable to the integrated processing box 1.

The devices formed of only the unique portions are hereinafter referred to as unique devices, while the devices having three portions, that is, unique portions, portions which perform the common processing, and portions which perform the variable processing, as in conventional devices, are hereinafter referred to as regular devices.

A user operates a remote controller 5 to provide various instructions to the integrated processing box 1. The remote controller 5 emits an operation signal, for example, an infrared signal, in response to a user's operation, and the integrated processing box 1 receives the infrared signal so as to recognize the user's instruction.

In the embodiment shown in FIG. 1, although the input device $11_k$, the output device $12_m$, and the storage device $13_n$ are all connected to the integrated processing box 1 by cable, they can individually perform data communication with the integrated processing box 1 wirelessly, for example, using radio waves or infrared beams.

For simplicity, it is determined that data to be processed by the integrated processing box 1 is image data.

Figure 2:
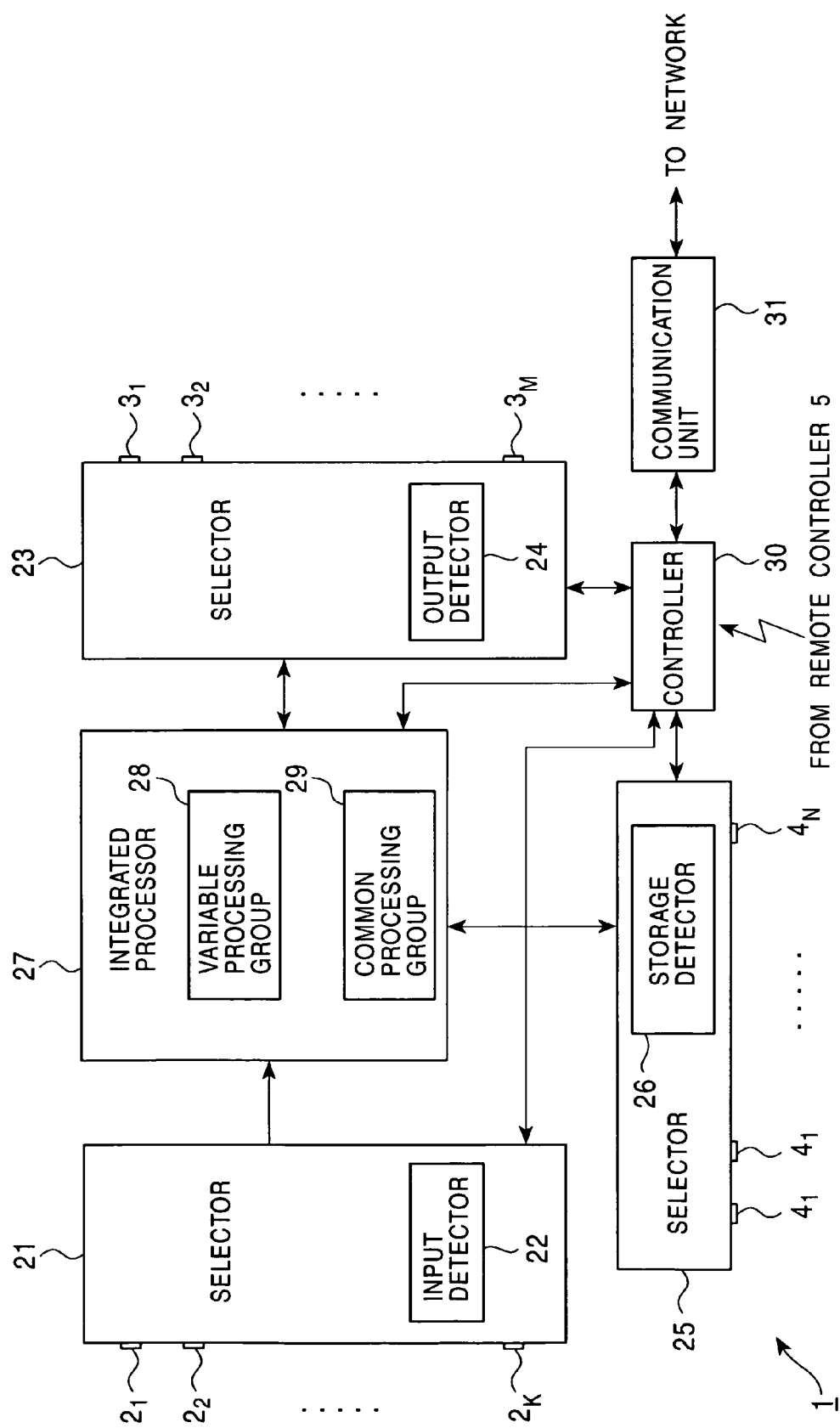
FIG. 2 is a block diagram illustrating an example of the configuration of an integrated processing box 1 shown in FIG. 1.

FIG. 2 illustrates an example of the configuration of the integrated processing box 1 shown in FIG. 1.

A selector 21, which serves as an interface with the input device $11_k$, receives image data from the input devices $11_1$ through $11_K$ connected to the terminals $2_1$ through $2_K$, respectively, selects the target image data under the control of a controller 30, and supplies it to an integrated processor 27. The selector 21 has a built-in input detector 22 for detecting the types of input devices $11_1$ through $11_K$ connected to the terminals $2_1$ through $2_K$, respectively, and supplies information indicating the detected types of devices to the controller 30.

The input detector 22 is able to detect the type of input device $11_k$ connected to the terminal $2_k$ by performing communication with the input device $11_k$ connected to the terminal $2_k$. Alternatively, input devices connectable to the terminals $2_1$ through $2_K$ may be set in advance, thereby making it possible to detect the type of input device $11_k$ connected to the terminal $2_k$. Alternatively, the user may input the type of input device $11_k$ connected to the terminal $2_k$ by operating the remote controller 5. Similarly, an output detector 24 and a storage detector 26, which are discussed later, detect the type of output device $12_m$ connected to the terminal $3_m$ and the type of storage device $13_n$ connected to the terminal $4_n$, respectively.

A selector 23, which serves as an interface with the output device $12_m$, selects one of the output devices $12_1$ through $12_M$ connected to the terminals $3_1$ through $3_M$, respectively, under the control of the controller 30, and supplies the image data received from the integrated processor 27 to the selected output device. The selector 23 has the built-in output detector 24 for detecting the types of output devices $12_1$ through $12_M$ connected to the terminals $3_1$ through $3_M$, respectively, and supplies information indicating the detected types of output devices to the controller 30.

A selector 25, which serves as an interface with the storage device $13_n$, selects one of the storage devices $13_1$ through $13_N$ connected to the terminals $4_1$ through $4_N$, respectively, according to a control signal from the controller 30, and supplies the image data received from the integrated processor 27 to the selected storage device. The selector 25 has the built-in storage detector 26 for detecting the types of storage devices $13_1$ through $13_N$ connected to the terminals $4_1$ through $4_N$, respectively, and supplies the information indicating the types of storage devices to the controller 30.

In the embodiment shown in FIG. 2, the selector 21, which serves as the interface with the input device $11_k$, the selector 23, which serves as the interface with the output device $12_m$, and the selector 25, which serves as the interface with the storage device $13_n$, are separately provided. However, only one selector may be provided for all of the input device $11_K$, the output device $12_m$, and the storage device $13_n$. That is, instead of providing the three selectors 21, 23, and 25, only a single selector may be provided, and the input device $11_k$, the output device $12_m$, and the storage device $13_n$ may all be connectable to the single selector.

The integrated processor 27 is formed of a variable processing group 28 consisting of at least one variable processing unit for performing the variable processing, and a common processing group 29 consisting of at least one common processing unit for performing the common processing. The variable processing group 28 performs the variable processing on the image data supplied from the selectors 21 and 25 and the image data to be output to the selectors 23 and 25 under the control of the controller 30. The common processing group 29 performs the common processing on the image data supplied from the selectors 21 and 25 and the image data to be output to the selectors 23 and 25 under the control of the controller 30.

The controller 30 controls the selectors 21, 23, and 25, and the integrated processor 27 based on the information concerning the detected types of input devices $11_1$ through $11_K$ received from the input detector 22, the information concerning the detected types of output devices $12_1$ through $12_M$ received from the output detector 24, the information concerning the detected types of storage devices $13_1$ through $13_N$ received from the storage detector 26, and a signal from the remote controller 5. The controller 30 receives data transmitted from a communication unit 31 via a predetermined network, such as the Internet, and performs predetermined processing.

The communication unit 31 is formed of, for example, a modem, a terminal adapter, a network interface card, etc., and receives data transmitted from a server (not shown) via a network and supplies it to the controller 30. That is, the communication unit 31 requests the server via a network to send data (for example, a prediction coefficient, which is discussed below) required for processing to be performed in the integrated processor 27 under the control of the controller 30. If the server has the requested data, it supplies the data to the communication unit 31 via the network. The communication unit 31 receives the data from the server and supplies it to the controller 30.

Upon receiving the data from the communication unit 31 as discussed above, the controller 30 may update the previous data with the received data if necessary.

The variable processing and the common processing performed by the integrated processor 27 are as follows.

Figure 3:
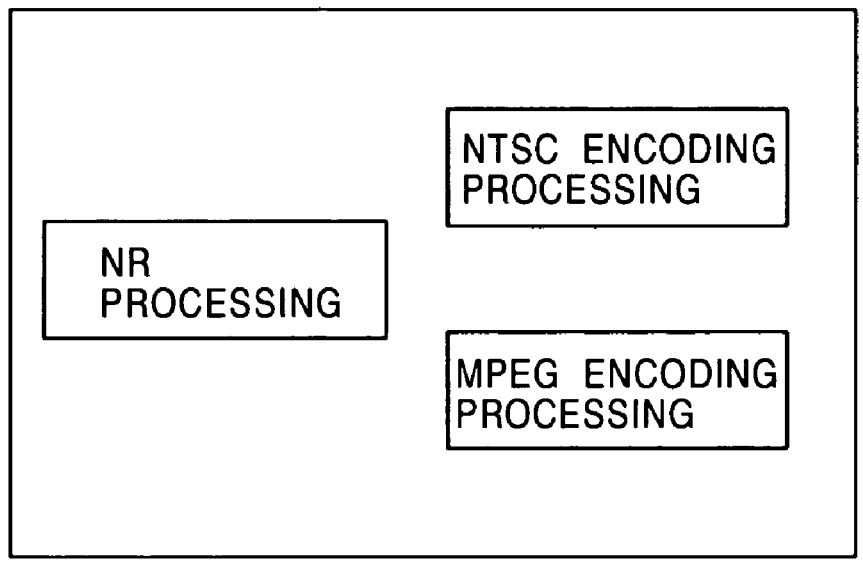
FIGS. 3, 4, and 5 illustrate common processing.

As stated above, the common processing is device-independent processing, and can be performed commonly for a plurality of devices. For example, for the input devices for receiving image data, as shown in FIG. 3, the common processing corresponds to noise reduction (NR) processing, NTSC encoding processing, and moving picture experts group (MPEG) encoding processing.

Figure 4:
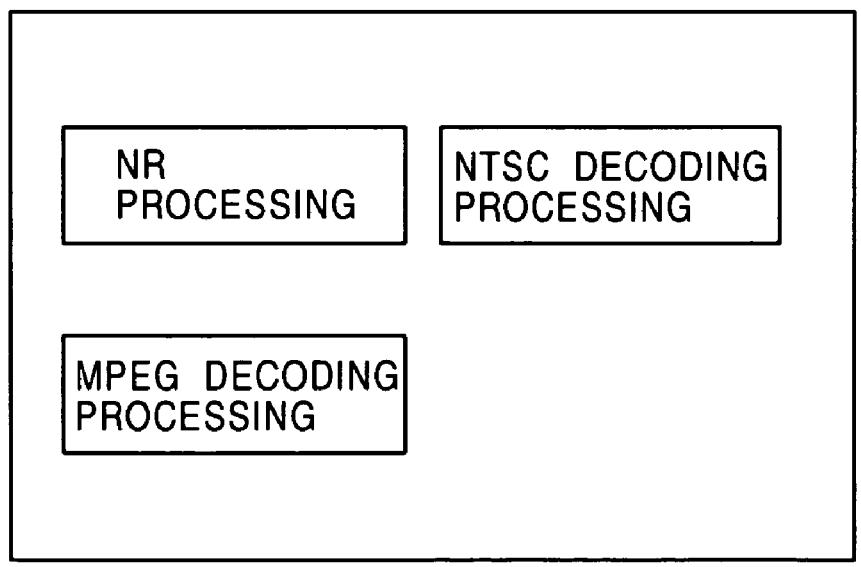
Figure 5:
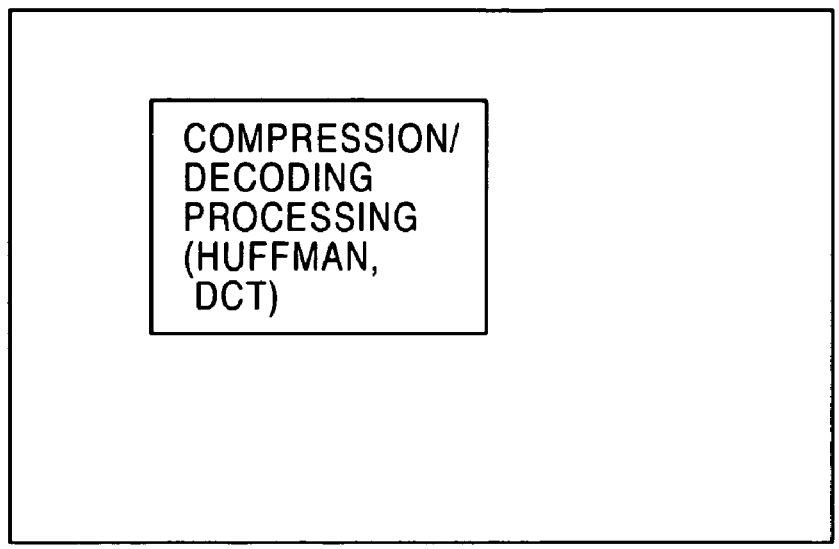

For the output devices for outputting image data, as shown in FIG. 4, the common processing corresponds to NR processing, NTSC decoding processing, and MPEG decoding processing. For the storage devices for storing image data, as shown in FIG. 5, the common processing corresponds to Huffman-coding/decoding processing used in compression/decoding processing, and discrete cosine transform (DCT)/inverse DCT processing.

Figure 6:
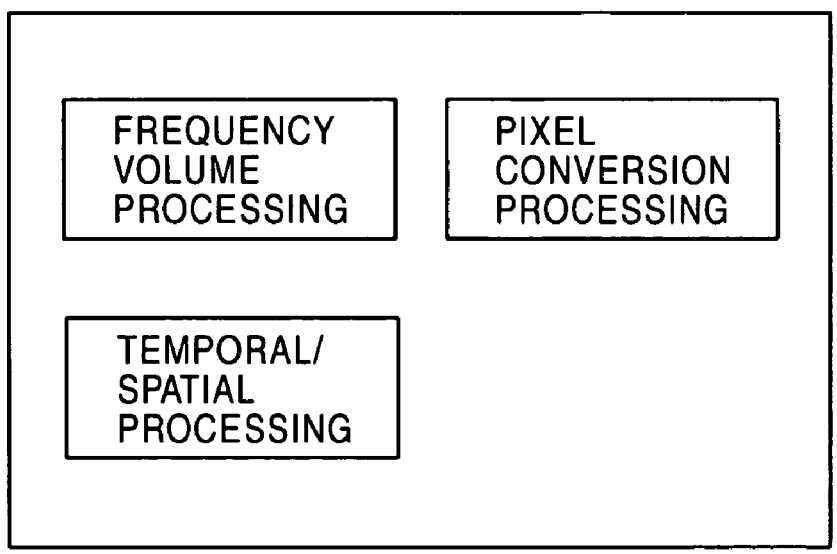
FIGS. 6, 7, and 8 illustrate variable processing.
Figure 7:
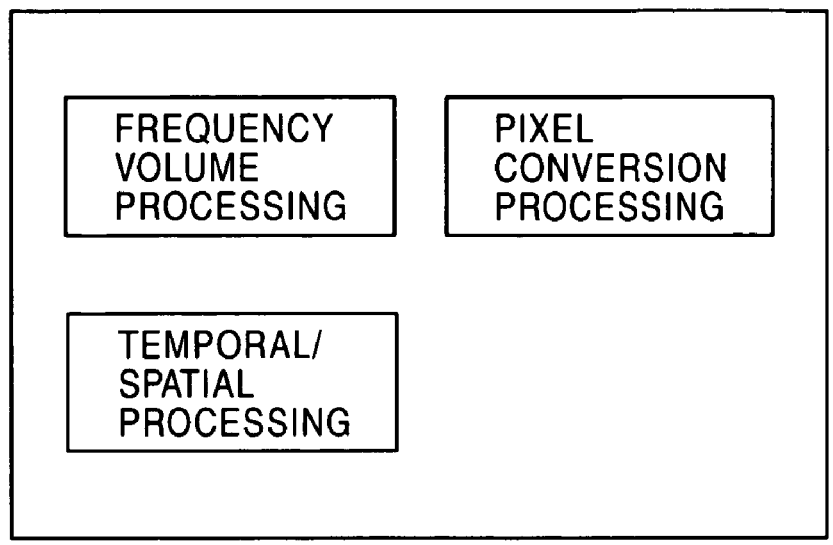

In contrast, the variable processing is device-dependent processing, i.e., processing whose content is different according to the type of device. For example, regarding the input devices for receiving image data, as shown in FIG. 6, the variable processing corresponds to frequency volume processing, temporal/spatial processing, pixel conversion processing, etc. Concerning the output devices for outputting image data, as shown in FIG. 7, the variable processing corresponds to frequency volume processing, temporal/spatial processing, and pixel conversion processing.

In the frequency volume processing, the definition (resolution) is changed by adjusting the frequency characteristics of an image. "Volume" means that the frequency characteristics are adjustable. That is, the frequency volume processing determines the frequency characteristics of an image. According to the temporal/spatial processing, the number of pixels in the temporal domain or in the spatial domain is changed. According to the pixel conversion processing, the aspect ratio of pixels is changed.

When an image is displayed on a CRT or a liquid crystal panel, which serves as an output device, it is desirable that the frequency characteristics of the image match the characteristics of the output device, i.e., the CRT or the liquid crystal panel. When an image is displayed on the CRT, the frame (field) rate of the image should be changed according to the type of CRT, i.e., the NTSC type or the PAL type. It is also necessary to change the aspect ratio of pixels according to whether the CRT is the NTSC type or is used for computers. Accordingly, the frequency volume processing for changing the frequency characteristics, the temporal/spatial processing for changing the definition (resolution) in the temporal or spatial domain, and the pixel conversion processing for changing the aspect ratio of pixels are device-dependent and correspond to the variable processing.

Figure 8:
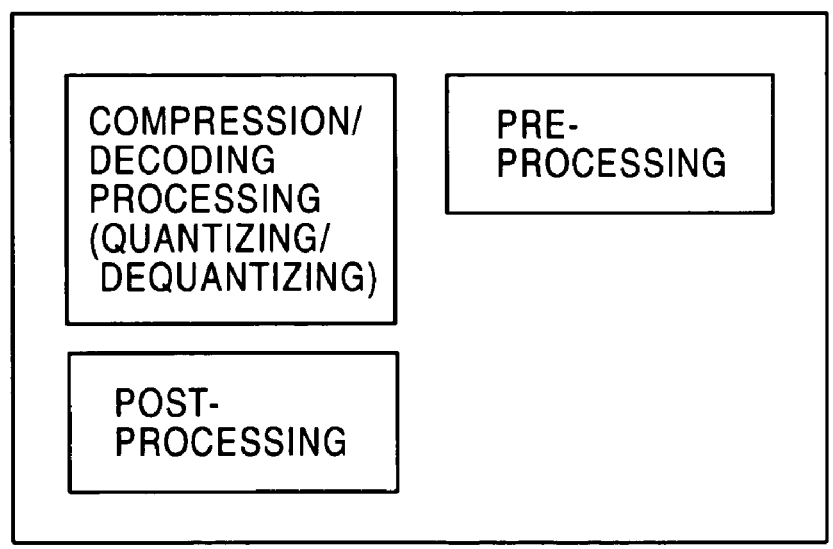

Concerning the storage devices for storing images, for example, as shown in FIG. 8, the variable processing corresponds to quantizing/dequantizing processing used in compression/decoding processing, pre-processing or post-processing, such as filtering processing performed before or after the quantizing processing for inhibiting quantization noise. More specifically, for a storage device having a large storage capacity, it is desired that the quantizing processing be performed with a smaller quantizing step for improving the image quality. Conversely, for a storage device having a small storage capacity, it is desired that the quantizing processing be performed with a greater quantizing step so that the whole image can be stored by trading off the image quality. Accordingly, the quantizing/dequantizing processing is device dependent and corresponds to the variable processing.

As discussed above, the variable processing group 28 shown in FIG. 2 performs the variable processing, such as the frequency volume processing, the pixel conversion processing, and the temporal/spatial processing. Such variable processing can be performed by classification adaptive processing which was previously proposed by the assignee of the present application. The classification adaptive processing is discussed below.

The classification adaptive processing is further divided into classification processing and adaptive processing. Data is classified according to the characteristics by performing the classification processing, and the data items of each class are adapted according to the adaptive processing. Details of the adaptive processing are as follows.

According to the adaptive processing, pixels forming a standard-definition or low-definition image (SD image) (such pixels are hereinafter referred to as "SD pixels") are linearly combined with predetermined prediction coefficients. As a result, prediction values of pixels forming an image having a definition higher (HD image) than the SD image can be determined. Based on the prediction values, a higher-definition image than the SD image can be obtained.

More specifically, for example, a certain HD image is set to be supervisor data, and an SD image having a definition lower than the HD image is set to be learner data. It is now considered that a prediction value E[y] of a true pixel value y of the pixels forming the HD image (such pixels are hereinafter referred to as "HD pixels") is to be determined by a linearly combined model which is defined by linearly combining a set of pixel values $x_1$, $x_2$, and so on, of some SD pixels and predetermined prediction coefficients $w_1$, $w_2$, and so on. In this case, the prediction value E[y] can be expressed by the following equation.

$$E[y] = w_1 x_1 + w_2 x_2 + \ldots \quad (1)$$

To generalize equation (1), when a matrix W consisting of a set of prediction coefficients $w_j$, a matrix X consisting of learner data $x_{ij}$, and a matrix Y' consisting of a set of prediction values $E[y_j]$ are defined as follows, $$X = \begin{bmatrix} x_{11} & x_{12} & \cdots & x_{1J} \\ x_{21} & x_{22} & \cdots & x_{2J} \\ \cdots & \cdots & \cdots & \cdots \\ x_{I1} & x_{I2} & \cdots & x_{IJ} \end{bmatrix} \quad (2)$$

$$W = \begin{pmatrix} w_1 \\ w_2 \\ \cdots \\ w_J \end{pmatrix}, Y' = \begin{pmatrix} E[y_1] \\ E[y_2] \\ \cdots \\ E[y_I] \end{pmatrix}$$

then the following observation equation holds true.

$$XW = Y' \quad (3)$$

wherein the component $x_{ij}$ in the matrix X indicates the j-th item of the i-th set of learner data (the i-th set of learner data is used for predicting the item $y_i$ of the i-th supervisor data), the component $w_j$ in the matrix W represents a prediction coefficient to be multiplied with the j-th item of the i-th set of learner data, $y_i$ indicates the i-th item of supervisor data, and accordingly, $E[y_i]$ designates a prediction value of the i-th item of supervisor data. The variable y in the left side of equation (1) corresponds to the component $y_i$ of the matrix Y without the suffix i. The variables $x_1$, $x_2$, and so on in the right side of equation (1) correspond to the component $x_{ij}$ of the matrix X without the suffix i.

It is now considered that the prediction value E[y] positioned close to the pixel value y of the HD pixels is to be determined by applying the method of least squares to the observation equation. In this case, when a matrix Y consisting of a set of true pixel values y of the HD pixels, which serve as supervisor data, and a matrix E consisting of a set of residuals e between the prediction values E[y] and the pixel values y of the HD pixels are determined as follows, $$E = \begin{pmatrix} e_1 \\ e_2 \\ \cdots \\ e_I \end{pmatrix}, Y = \begin{pmatrix} y_1 \\ y_2 \\ \cdots \\ y_I \end{pmatrix} \quad (4)$$

then the following residual equation holds true.

$$XW = Y + E \quad (5)$$

In this case, the prediction coefficient $w_j$ for determining the prediction value E[y] which is positioned close to the pixel value y of the HD pixels can be determining as follows by minimizing the square error.

$$\sum_{i=1}^{I} e_i^2 \quad (6)$$

Accordingly, when the value obtained by differentiating the above-described square error with respect to the prediction coefficient $w_j$ results in zero, the prediction coefficient $w_j$ which satisfies the following equation (7) is an optimal value for determining the prediction value E[y] close to the pixel value y of the HD pixels.

$$e_1 \frac{\partial e_1}{\partial w_j} + e_2 \frac{\partial e_2}{\partial w_j} + \ldots + e_I \frac{\partial e_I}{\partial w_j} = 0 (j = 1, 2, \ldots, J) \quad (7)$$

Thus, by differentiating equation (5) with respect to the prediction coefficient $w_j$, the following equation holds true.

$$\frac{\partial e_i}{\partial w_1} = x_{i1}, \frac{\partial e_i}{\partial w_2} = x_{i2}, \ldots, \frac{\partial e_i}{\partial w_J} = x_{iJ}, (i = 1, 2, \ldots, I) \quad (8)$$

From equations (7) and (8), equations (9) can be determined.

$$\sum_{i=1}^{I} e_i x_{i1} = 0, \sum_{i=1}^{I} e_i x_{i2} = 0, \ldots \sum_{i=1}^{I} e_i x_{iJ} = 0 \quad (9)$$

By considering the relationships among the learner data $x_{ij}$, the prediction coefficient $w_j$, the supervisor data $y_i$, and the residual $e_i$ in the residual equation (5), the following normal equations can be obtained from equations (9).

$$\begin{cases} \left(\sum_{i=1}^{I} x_{i1}x_{i1}\right)w_1 + \left(\sum_{i=1}^{I} x_{i1}x_{i2}\right)w_2 + \ldots + \left(\sum_{i=1}^{I} x_{i1}x_{iJ}\right)w_J = \left(\sum_{i=1}^{I} x_{i1}y_i\right) \\ \left(\sum_{i=1}^{I} x_{i2}x_{i1}\right)w_1 + \left(\sum_{i=1}^{I} x_{i2}x_{i2}\right)w_2 + \ldots + \left(\sum_{i=1}^{I} x_{i2}x_{iJ}\right)w_J = \left(\sum_{i=1}^{I} x_{i1}y_i\right) \\ \left(\sum_{i=1}^{I} x_{iJ}x_{i1}\right)w_1 + \left(\sum_{i=1}^{I} x_{iJ}x_{i2}\right)w_2 + \ldots + \left(\sum_{i=1}^{I} x_{iJ}x_{iJ}\right)w_J = \left(\sum_{i=1}^{I} x_{iJ}y_i\right) \end{cases} \quad (10)$$

When a matrix (covariance matrix) A and a vector v are defined as follows, $$A = \begin{pmatrix} \sum_{i=1}^{I} x_{i1}x_{i1} & \sum_{i=1}^{I} x_{i1}x_{i2} & \cdots & \sum_{i=1}^{I} x_{i1}x_{iJ} \\ \sum_{i=1}^{I} x_{i2}x_{i1} & \sum_{i=1}^{I} x_{i2}x_{i2} & \cdots & \sum_{i=1}^{I} x_{i2}x_{iJ} \\ & & \cdots & \\ \sum_{i=1}^{I} x_{iJ}x_{i1} & \sum_{i=1}^{I} x_{iJ}x_{i2} & \cdots & \sum_{i=1}^{I} x_{iJ}x_{iJ} \end{pmatrix} \quad (11)$$

$$V = \begin{pmatrix} \sum_{i=1}^{I} x_{i1}y_i \\ \sum_{i=1}^{I} x_{i2}y_i \\ \vdots \\ \sum_{i=1}^{I} x_{iJ}y_i \end{pmatrix}$$

and when the vector W is defined by equations (2), the normal equations (10) can be expressed as follows.

$$AW = v \quad (12)$$

According to each normal equation (10), by preparing a predetermined number of sets of learner data $x_{ij}$ and supervisor data $y_i$, the same number of normal equations as the number J of prediction coefficients $w_j$ to be determined can be obtained. Accordingly, by solving the vector W (it should be noted that the matrix A in equation (12) is a regular matrix in order to solve equation (12)), the optimal prediction coefficient $w_j$ can be determined. Equation (12) can be solved according to, for example, the Gauss-Jordan method of elimination.

The optimal prediction coefficient $w_j$ is determined, as discussed above. Then, by using the prediction coefficient $w_j$, the prediction value E[y] close to the pixel value y of the HD pixels is determined according to equation (1). The adaptive processing is performed as discussed above.

According to the adaptive processing, components which are not contained in an SD image but which are contained in an HD image are reconstructed. In light of this feature, the adaptive processing is different from, for example, interpolation processing. More specifically, the adaptive processing appears to be similar to the interpolation processing using an interpolation filter in view of equation (1). However, the prediction coefficients w, which are equivalent to tap coefficients used in the interpolation filter, are obtained by using the supervisor data, i.e., by learning, thereby making it possible to reconstruct components contained in the HD image. Consequently, the adaptive processing has an image-creation (definition-creation) function.

Although in this example the adaptive processing is performed to improve the definition, it may be performed to improve the signal-to-noise (S/N) ratio or the image quality (for example, blurring) by changing the supervisor data and the learner data used for determining the prediction values.

Additionally, in the above-described example, the adaptive processing is performed to convert the SD image into the HD image having more pixels in the spatial domain. However, by changing the supervisor data and the learner data used for determining the prediction coefficients, the number of pixels in the temporal domain, i.e., the frame rate (field rate), or the aspect ratio of pixels may be changed.

That is, according to the adaptive processing, various prediction coefficients can be obtained by changing the supervisor data and the learner data. Then, various types of processing can be performed on images.

Figure 9:
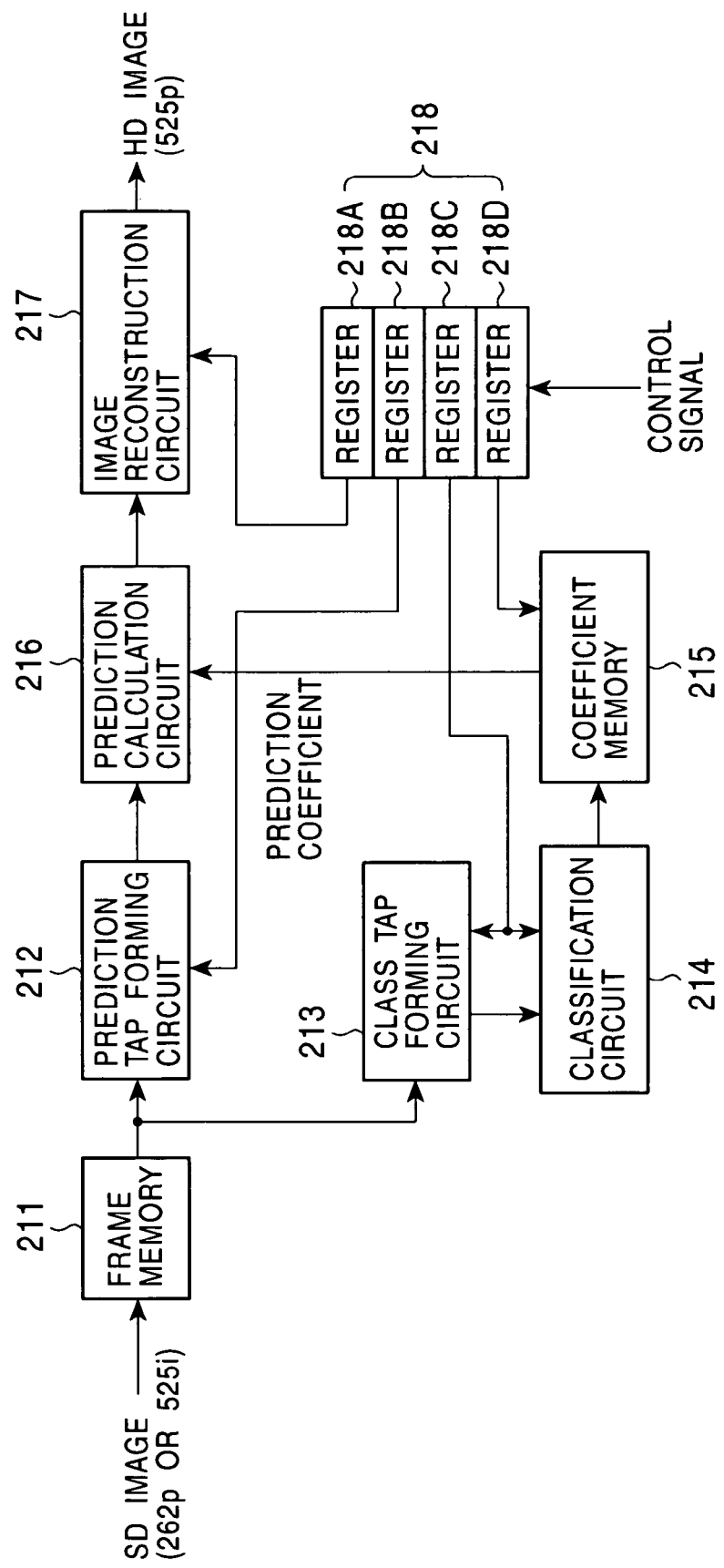
FIG. 9 is a block diagram illustrating an example of the configuration of a variable processing unit forming a variable processing group 28.

FIG. 9 illustrates an example of the configuration of a variable processing unit for performing the adaptive processing, and more specifically, for performing temporal/spatial processing for determining prediction values of an HD image with improved definition according to the classification adaptive processing.

In the variable processing unit shown in FIG. 9, when an SD image is supplied from the input device $11_k$ to the output device $12_m$, the variable processing for appropriately improving the definition is performed according to the types of the input device $11_k$ and the output device $12_m$.

For simple representation, it is now assumed that a 525i image (interlace image having 525 horizontal lines) or a 262p image (progressive image having 262 horizontal lines) is input as an SD image, and a 525p image (progressive image having 525 horizontal lines) is output as an HD image. The frame rate of the 262p SD image, the field rate of the 525i SD image, and the frame rate of the 525p HD image are the same, for example, 60 Hz. Accordingly, the frame rate of the 525i SD image is 30 Hz.

Figure 10:
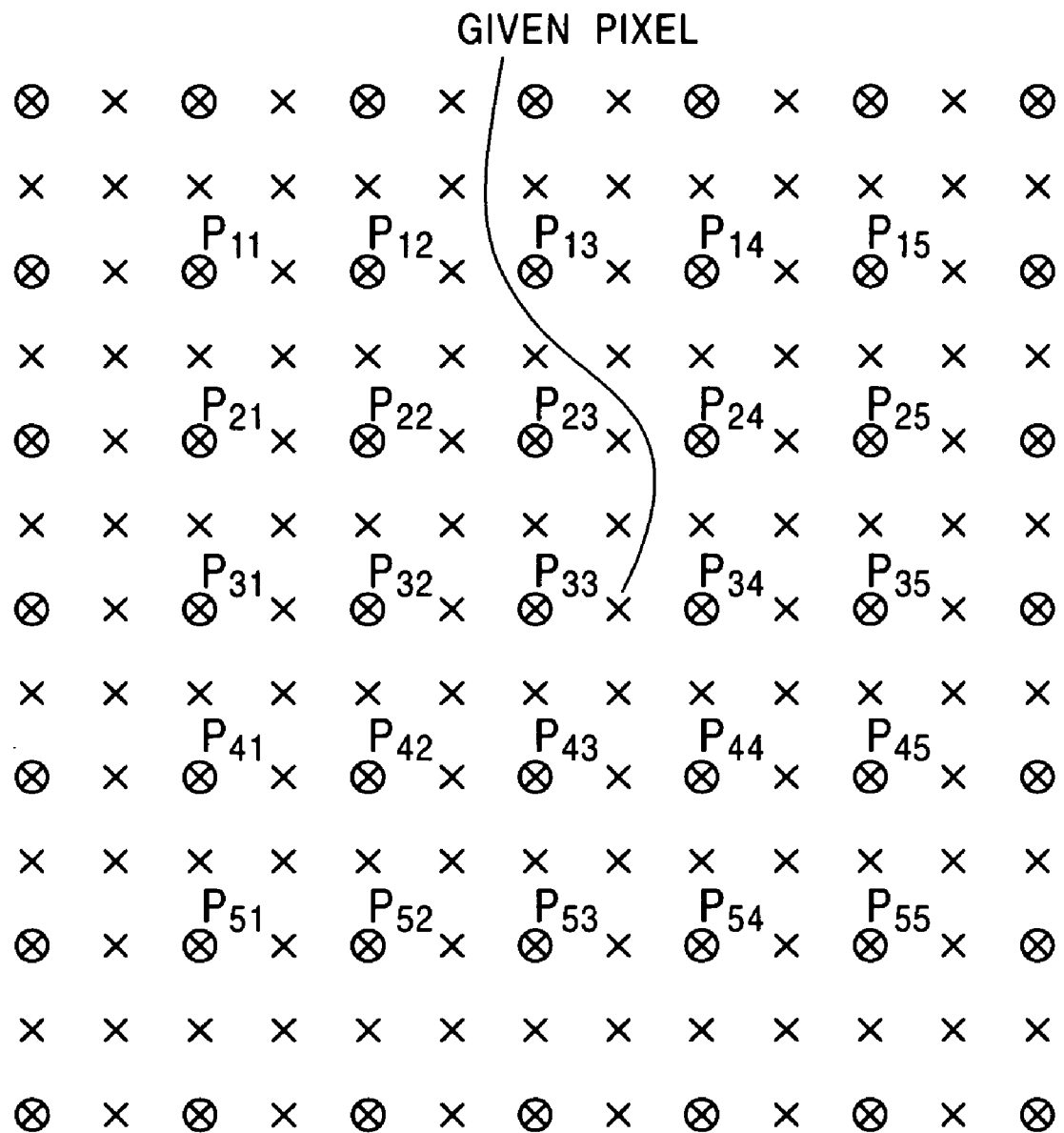
FIG. 10 illustrates the relationship between a standard definition (SD) image and a high definition (HD) image.

Thus, one frame of the 262p SD image corresponds to one frame of the HD image, and one field of the 525i SD image corresponds to one frame of the HD image. The ratio of the number of pixels on one horizontal line of the 262p or 525i SD image to that of the 525p HD image is determined to be, for example, 1:2. Accordingly, both the 262p SD image and the 525i SD image are converted, as shown in FIG. 10, into the 525p HD image with improved definition by doubling the numbers of vertical pixels and horizontal pixels. In FIG. 10, O indicates SD pixels, and x represents HD pixels.

A typical example of the 525i image is an NTSC image forming a television broadcast program (hereinafter referred to as a "television image"), sent from a television broadcast station. A typical example of the 252p image is a game image read from a game machine.

Referring to FIG. 9, SD images whose definition is to be improved are supplied in units of, for example, frames or fields, to a frame memory 211, and are stored therein for a predetermined period.

The frame memory 211 includes a plurality of banks so as to simultaneously store a plurality of frames or fields of SD images.

A prediction tap forming circuit 212 sequentially sets predetermined pixels which form an HD image having a definition higher than the SD image stored in the frame memory 211 to be given pixels. The HD image is a virtual image since it does not actually exist in the variable processing unit. The prediction tap forming unit 212 then selects some SD pixels positioned spatially or temporally close to the given pixels of the HD image from the SD image stored in the frame memory 211, thereby forming prediction taps to be multiplied with prediction coefficients.

The prediction tap forming circuit 212 also sets a selection pattern of the SD pixels to be used as prediction taps based on information (hereinafter referred to as "prediction tap information") set in a register 218B.

More specifically, based on the prediction tap forming information, the prediction tap forming circuit 212 selects, as shown in FIG. 10, the pixel of the SD image positioned closest to the given pixel (there are two pixels in FIG. 10, i.e., $P_{33}$ and $P_{34}$, and $P_{33}$ is to be selected in this example), four nearest SD pixels, i.e., $P_{23}$, $P_{43}$, $P_{32}$, and $P_{34}$, positioned above, below, to the left, and to the right of $P_{33}$, and the SD pixel of the previous frame corresponding to $P_{33}$, and the SD pixel of the subsequent frame corresponding to $P_{33}$, that is, a total of seven pixels. The prediction tap forming circuit 212 sets the seven pixels as a selection pattern of the SD pixels to be used as prediction taps.

Alternatively, according to the prediction tap forming information, the prediction tap forming circuit 212 selects, as shown in FIG. 10, the pixel $P_{33}$ of the SD image closest to the given pixel, the four nearest SD pixels $P_{23}$, $P_{43}$, $P_{32}$, and $P_{34}$, positioned above, below, to the left, and to the right of the pixel $P_{33}$, the SD pixel of the previous field corresponding to $P_{33}$, and the SD pixel of the subsequent field corresponding to $P_{33}$, i.e., a total of seven pixels, as a selection pattern of the SD pixels to be used as prediction taps.

Alternatively, according to the prediction tap forming information, the prediction tap forming circuit 212 selects, as shown in FIG. 10, the pixel $P_{33}$ of the SD image closest to the given pixel, four next-but-one SD pixels $P_{13}$, $P_{53}$, $P_{31}$, and $P_{35}$, above, below, to the left, and to the right of the pixel $P_{33}$, the SD pixel two frames (or two fields) before the pixel $P_{33}$, and the SD pixel two frames (or two fields) after the pixel $P_{33}$, i.e., a total of seven pixels, as a selection pattern of the SD pixels to be used as prediction taps.

As discussed above, the prediction tap forming circuit 212 sets the selection pattern based on the prediction tap forming information, and selects the SD pixels to be used as prediction taps for the given pixel from the SD image stored in the frame memory 211. Then, the selected prediction taps forming the SD pixels are output to a prediction calculation circuit 216.

The SD pixels selected as prediction taps are not restricted to the above-described selection patterns. Additionally, although in the above-described example prediction taps are formed of seven SD pixels, the number of SD pixels to form prediction taps may suitably be set based on the prediction tap forming information.

A class tap forming circuit 213 selects some SD pixels positioned spatially or temporally close to the given pixel from the SD image stored in the frame memory 211, thereby forming class taps for classifying the given pixels into classes.

The class tap forming circuit 213 sets a selection pattern of SD pixels to be used as class taps based on information (hereinafter referred to as "class tap forming information) set in a register 218C.

More specifically, based on the class tap forming information, the class tap forming circuit 213 selects, as shown in FIG. 10, the pixel $P_{33}$ positioned closest to the given pixel, eight nearest SD pixels $P_{23}$, $P_{43}$, $P_{32}$, $P_{34}$, $P_{22}$, $P_{42}$, $P_{24}$, and $P_{44}$ located above, below, and at the left, right, upper left, lower left, upper right, and lower right of the pixel $P_{33}$, the SD pixel of the previous frame, and the SD pixel of the subsequent frame, i.e., a total of eleven pixels, as a selection pattern of the SD pixels to be used as class taps.

Alternatively, according to the class tap forming information, the class tap forming circuit 213 selects, as shown in FIG. 10, as shown in FIG. 10, the pixel $P_{33}$ positioned closest to the given pixel, eight nearest SD pixels $P_{23}$, $P_{43}$, $P_{32}$, $P_{34}$, $P_{22}$, $P_{42}$, $P_{24}$, and $P_{44}$ located on the above and below, and at the left, right, upper left, lower left, upper right, lower right of the pixel $P_{33}$, an SD pixel of the previous field, and an SD pixel of the subsequent field, i.e., a total of eleven pixels, as a selection pattern of the SD pixels to be used as class taps.

Alternatively, according to the class tap forming information, the class tap forming circuit 213 selects, as shown in FIG. 10, the pixel $P_{33}$ of the SD image closest to the given pixel, eight next-but-one SD pixels $P_{13}$, $P_{53}$, $P_{31}$, $P_{35}$, $P_{11}$, $P_{51}$, $P_{15}$, and $P_{55}$ located on the above and below, at the left, right, upper left, lower left, upper right, and lower right of the pixel $P_{33}$, the SD pixel two frames (or two fields) before the pixel $P_{33}$, and the SD pixel two frames (or two fields) after the pixel $P_{33}$, i.e., a total of eleven pixels, as a selection pattern of the SD pixels to be used as class taps.

As stated above, the class tap forming circuit 213 sets the selection pattern based on the class tap forming information, and selects the SD pixels to be used as class taps for the given pixel from the SD image stored in the frame memory 211 according to the selection pattern. The class taps are then output to a classification circuit 214.

The SD pixels selected as class taps are not restricted to the above-described selection patterns. Additionally, although in the above-described example class taps are formed of eleven SD pixels, the number of SD pixels to form class taps may suitably be set based on the class tap forming information.

The classification circuit 214 classifies the given pixels, and class codes corresponding to the resulting classes are supplied to a coefficient memory 215 as addresses.

Figure 11:
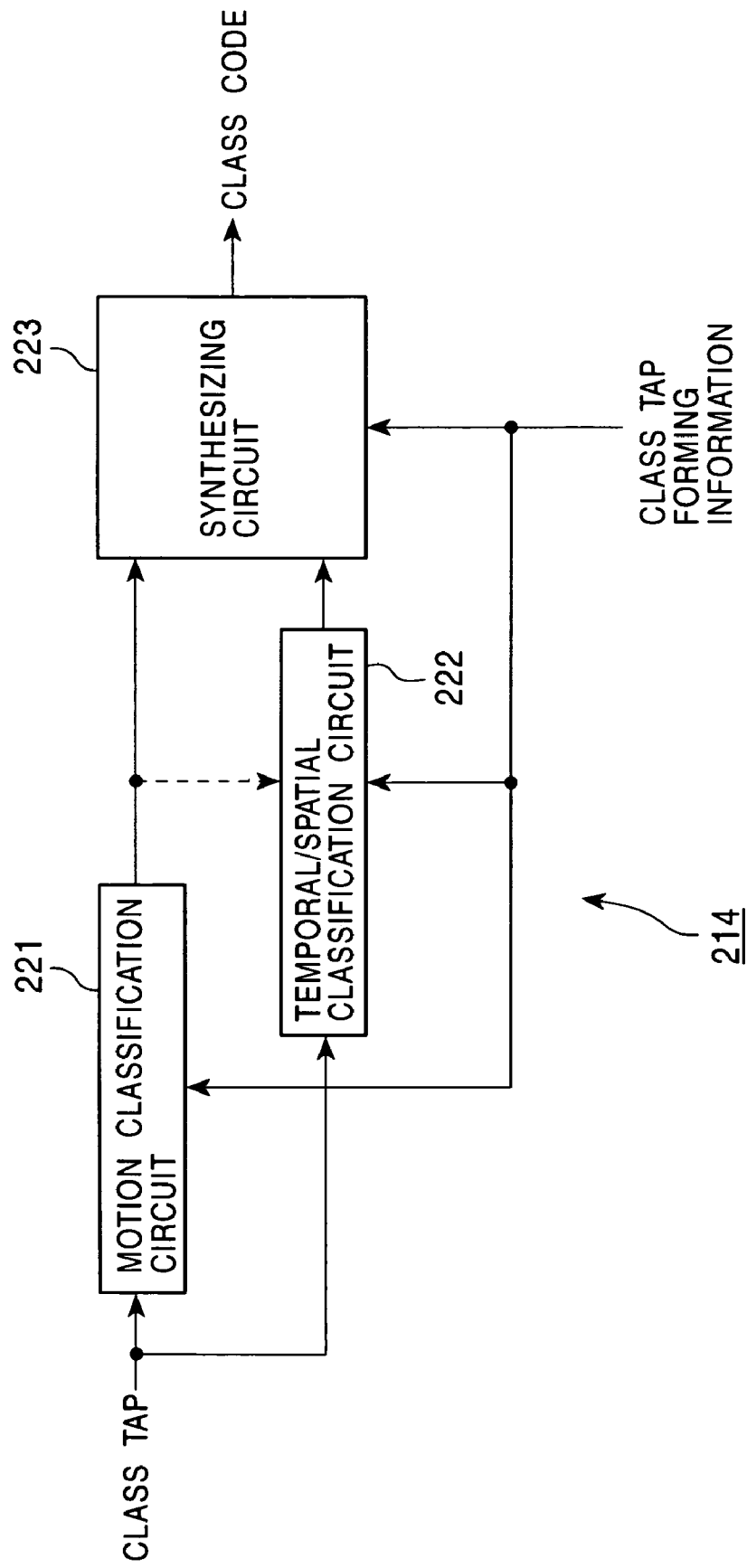
FIG. 11 is a block diagram illustrating an example of the configuration of a classification circuit 214.

FIG. 11 illustrates an example of the configuration of the classification circuit 214 shown in FIG. 9.

The class taps are supplied to a motion classification circuit 221 and a temporal/spatial classification circuit 222.

The motion classification circuit 221 classifies the given pixels in terms of the motion of the image according to the arrangement of the SD pixels forming the class taps in the temporal domain. That is, the motion classification circuit 221 classifies the given pixels, as shown in FIG. 10, by using a total of three pixels, i.e., the pixel $P_{33}$ closest to the given pixel, the SD pixel of the previous field or frame (or the SD pixel two fields or two frames before the pixel $P_{33}$), and the SD pixel of the subsequent field or frame (or the SD pixel two fields or two frames after the pixel $P_{33}$).

More specifically, the motion classification circuit 221 calculates the sum of the absolute differences between temporally adjacent SD pixels among the three SD pixels, and compares the sum with a predetermined threshold. Then, the motion classification circuit 221 outputs a class code, i.e., 0 or 1, to a synthesizing circuit 223 based on the comparison result.

The class code output from the motion classification circuit 221 is hereinafter referred to as "motion class code".

The temporal/spatial classification circuit 222 classifies the given pixels according to the level distribution in the spatial domain or the temporal domain of the image by using all the SD pixels forming the class taps.

As the classification method employed in the temporal/spatial classification circuit 222, an adaptive dynamic range coding (ADRC) method may be used.

According to the ADRC method, the SD pixels forming the class taps are subjected to ADRC processing, and the given pixels are classified according to the resulting ADRC code.

In the K-bit ADRC method, the maximum pixel value MAX and the minimum pixel value MIN of the SD pixels forming the class taps are detected, and DR=MAX−MIN is determined to be the local dynamic range DR. Based on the dynamic range DR, the SD pixels forming the class taps are re-quantized into K bits. That is, the minimum pixel value MIN is subtracted from the pixel value of each SD pixel forming the class taps, and the subtracted value is divided by $DR/2^K$ (quantized). Then, a bit stream of the K-bit pixel values arranged in a predetermined order is output as ADRC code. Thus, for example, according to the one-bit ADRC processing, the minimum pixel value MIN is subtracted from the pixel value of each SD pixel forming the class taps, and the resulting value is divided by the average value between the maximum pixel value MAX and the minimum pixel value MIN. As a result, each pixel value is quantized into one bit. Then, a bit stream of the one-bit pixel values arranged in a predetermined order is output as the ADRC code.

The temporal/spatial classification circuit 222 may directly output the level distribution pattern of the SD pixels forming the class taps as a class code. However, if the class taps are formed of N number of SD pixels, and if K bits are assigned to each SD pixel, the number of class codes results in $(2^N)^K$, which is an enormous number exponentially proportional to the number of bits K.

Accordingly, it is preferable that the temporal/spatial classification circuit 222 classifies the given pixels after performing compression processing, such as ADRC processing, on the number of bits of pixel values. Another type of ADRC processing, for example, vector quantizing processing, may be performed.

The class code output from the temporal/spatial classification circuit 222 is hereinafter referred to as a "temporal/spatial class code".

The synthesizing circuit 223 arranges (combines) a bit stream representing the motion class code (in this embodiment, one-bit class code) output from the motion classification circuit 221 and a bit stream representing the temporal/spatial class code output from the temporal/spatial classification circuit 222, as one-bit stream, thereby generating the final class code of the given pixels and outputting it to the coefficient memory 215.

In the embodiment shown in FIG. 11, the class tap forming information set in the register 218C is supplied to the motion classification circuit 221, the temporal/spatial classification circuit 222, and the synthesizing circuit 223. This is to deal with a change in the selection pattern of the SD pixels as the class taps formed in the class tap forming circuit 213.

The motion class codes obtained in the motion classification circuit 221 may be supplied to the temporal/spatial classification circuit 222, as indicated by the one-dot-chain line in FIG. 11, and the temporal/spatial classification circuit 222 may change the SD pixels according to the motion class codes.

In this case, the class taps formed of the eleven SD pixels are supplied from the class tap forming circuit 213 (FIG. 9) to the temporal/spatial classification circuit 222. Then, the temporal/spatial classification circuit 222 may perform classification as follows. When the motion class code is 0, ten predetermined SD pixels among the eleven SD pixels may be used. When the motion class code is 1, ten SD pixels in which a predetermined pixel among the above-described ten SD pixels is replaced by the remaining pixel which is not selected when the motion class code is 0.

When the temporal/spatial classification circuit 222 performs classification according to one-bit ADRC processing, the number of temporal/spatial class codes results in $(2^{11})^1$ if all the eleven SD pixels are used.

On the other hand, if only ten SD pixel are used according to the motion class code as discussed above, the resulting number of temporal/spatial class codes is $(2^{10})^1$. Accordingly, the number of temporal/spatial class codes is apparently smaller than that obtained by performing classification by using all the eleven SD pixels.

In this case, however, one-bit information representing which SD pixel is omitted for classification is required. Accordingly, the number of temporal/spatial class codes results in $(2^{10})^1 \times 2^1$, i.e., $(2^{11})^1$. This is exactly the same as the number obtained by performing classification by using all the eleven SD pixels.

Referring again to FIG. 9, the coefficient memory 215 stores a plurality of prediction coefficients obtained by performing learning processing, which is described below. That is, the coefficient memory 215 is formed of a plurality of types of banks, and each bank stores a corresponding type of prediction coefficient. The coefficient memory 215 sets a bank to be used based on information set in a register 218D (hereinafter referred to as "coefficient information"). The coefficient memory 215 then reads prediction coefficients stored in the addresses of the bank corresponding to the class codes supplied from the classification circuit 214, and supplies such prediction coefficients to the prediction calculation circuit 216.

Then, the prediction calculation circuit 216 performs linear prediction calculation (product sum calculation) expressed by equation (1) by using the prediction taps supplied from the prediction tap forming circuit 212 and the prediction coefficients supplied from the coefficient memory 215. The resulting pixel value is then output to an image reconstruction circuit 217 as the prediction value of the HD image having improved definition over the SD image.

The image reconstruction circuit 217 sequentially forms the individual frames of the 525p HD image from the prediction values supplied from the prediction calculation circuit 216, and outputs them.

As stated above, the 262p SD image is converted into an HD image in which the number of lines of each frame is doubled. The 525i SD image is converted into an HD image in which the number of lines of each field is doubled. Accordingly, the horizontal synchronizing frequency of the HD image is twice as high as that of the SD image. The conversion of the horizontal synchronizing frequency is also performed in the image reconstruction circuit 217.

Although in this embodiment the SD image is converted into a 525p HD image, it may be converted into another format of HD image, such as a 1050i HD image (interlace image having 1050 horizontal lines) or a 1050p HD image (progressive image having 1050 horizontal lines). The format of HD image to be output from the image reconstruction circuit 217 is set based on information stored in a register 218A (hereinafter referred to as "HD image format information").

The register group 218 stores information for setting the functions of the prediction tap forming circuit 212, the class tap forming circuit 213, the coefficient memory 215, and the image reconstruction circuit 217.

That is, the register group 218 is formed of, as shown in FIG. 9, the four registers 218A through 218D. As discussed above, according to the corresponding control signal, the HD image format information is set in the register 218A, the prediction tap forming information is set in the register 218B, the class tap forming information is set in the register 218C, and the coefficient information is set in the register 218D. Accordingly, the control signals contain the HD image format information, the prediction tap forming information, the class tap forming information, and the coefficient information. The control signals are generated in the controller 30 (FIG. 2).

More specifically, the controller 30 determines the HD image format information based on the type of output device $12_m$ for supplying the image data via the selector 23. The controller 30 also determines the prediction tap forming information, the class tap forming information, and the coefficient information based on the type of input device $11_k$ for supplying the image data via the selector 21 (in this embodiment, the type of input device $11_k$ indicates whether the input device $11_k$ outputs a 525i image or a 262p image) and the type of output device $12_m$ for supplying the image data via the selector 23 so that predetermined processing can be performed on the input device $11_k$ and the output device $12_m$.

Figure 12:
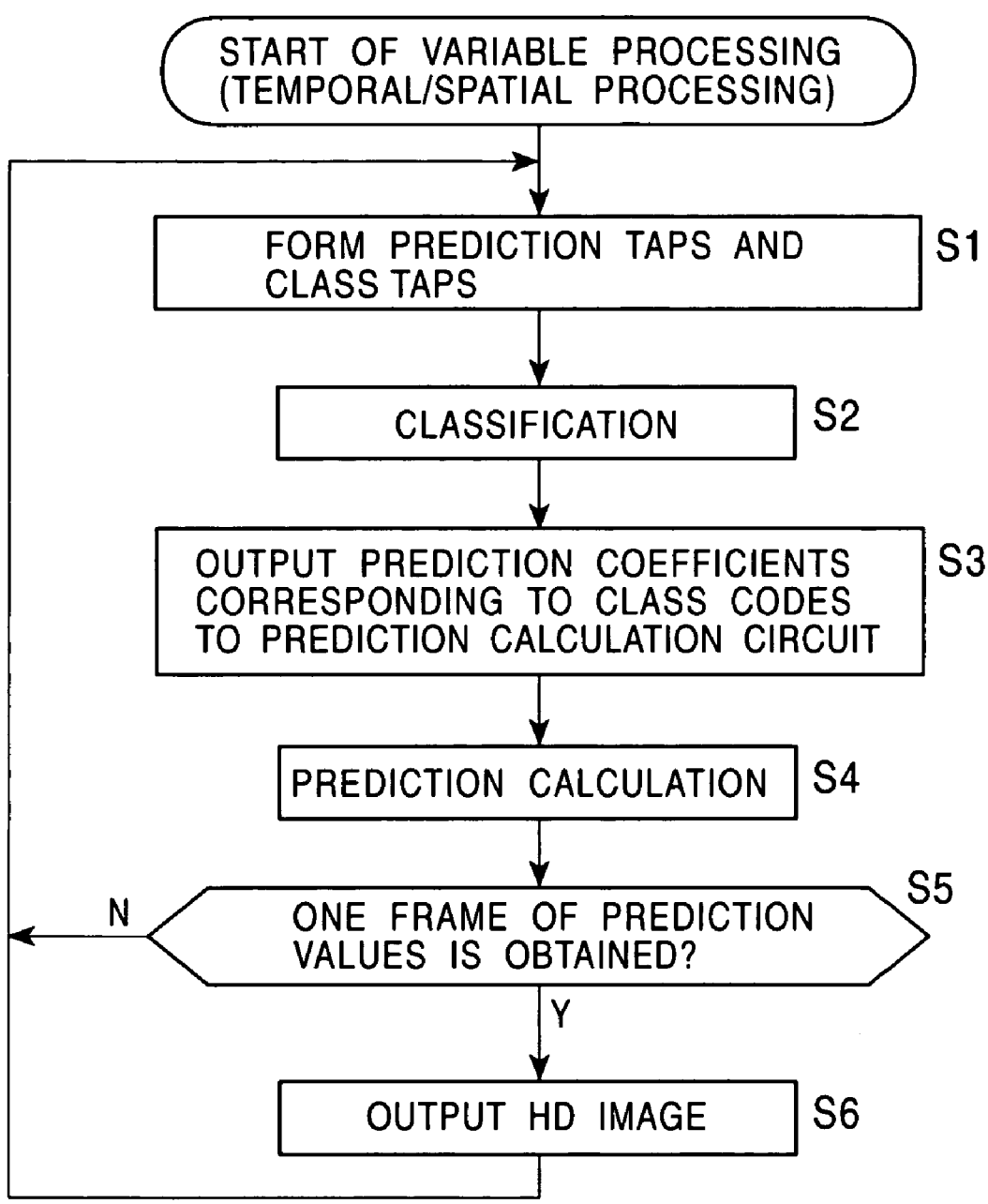
FIG. 12 is a flow chart illustrating temporal/spatial processing performed by a variable processing unit.

A description is now given, with reference to the flow chart of FIG. 12, of the temporal/spatial processing for improving the definition of an SD image performed in the variable processing unit shown in FIG. 9.

When the user specifies the input device $11_k$ for inputting an image and the output device $12_m$ for outputting an image by operating the remote controller 5 (FIG. 1), the controller 30 controls the selectors 21 and 23 to select the terminal $2_k$ connected to the designated input device $11_k$ and the terminal $3_m$ connected to the designated output device $12_m$, respectively. Then, the image data output from the input device $11_k$ is selected by the selector 21 and is supplied to the integrated processor 27 (variable processing group 28 and common processing group 29) shown in FIG. 2, and the image data output from the integrated processor 27 is selected by the selector 23, and is supplied to the output device $12_m$.

In this embodiment, the input device $11_k$ and the output device $12_m$ are selected by the user's instruction. Alternatively, the corresponding input device $11_k$ and the output device $12_m$ may be set in the terminal $2_k$ of the selector 21 and the terminal $3_m$ of the selector 23 in advance. Or, the controller 30 may select a combination of the optimal input device and the optimal output device based on the type of input device connected to the selector 21 and the type of output device connected to the selector 23.

The SD images received from the input device $11_k$ selected by the selector 21 are sequentially supplied to and stored in the frame memory 211 in units of frames or fields.

Meanwhile, the controller 30 (FIG. 1) generates the corresponding control signals based on the type of input device $11_k$ and the type of the output device $12_m$, and supplies them to the register group 218. Accordingly, the HD image format information, the prediction tap forming information, the class tap forming information, and the coefficient information are set in the registers 218A, 218B, 218C, and 218D, respectively, of the register group 218 according to the control signals.

In this embodiment, the 525i or 262p SD image is converted into the 525p HD image. Thus, the 525p image is set in the HD image format information. In the prediction tap forming information, a selection pattern for forming optimal prediction taps for converting the 525i or 262p SD image into the 525p HD image is set. In the class tap forming information, a selection pattern for forming optimal class taps for converting the 525i or 262p SD image into the 525p HD image is set. In the coefficient information, information indicating a bank of the coefficient memory 215 for storing optimal prediction coefficients for converting the 525i or 262p SD image into the 525p HD image is set.

Then, in step S1, a given pixel is set among the pixels forming an HD image with improved definition over the SD image stored in the frame memory 211. As stated above, the HD image is a virtual image since it does not actually exist in the variable processing unit. The prediction tap forming circuit 212 forms a prediction tap for the given pixel by using the pixels of the SD image stored in the frame memory 211. Also, in step S1, the class tap forming unit 213 forms a class tap for the given pixel by using the pixels of the SD image stored in the frame memory 211. Then, the prediction taps are supplied to the prediction calculation circuit 216, while the class taps are supplied to the classification circuit 214.

The prediction tap forming circuit 212 sets a selection pattern of the SD pixels to be used as prediction taps according to the prediction tap forming information set in the register 218B, and selects the SD pixels according to the selection pattern, thereby forming the prediction taps. The class tap forming circuit 213 sets a selection pattern of the SD pixels to be used as class taps according to the class tap forming information set in the register 218C, and selects the SD pixels according to the selection pattern, thereby forming the class taps.

Subsequently, in step S2, the classification circuit 214 classifies the given pixels based on the class taps supplied from the class tap forming circuit 213, and supplies class codes corresponding to the resulting classes to the coefficient memory 215 as addresses.

Then, in step S3, the coefficient memory 215 reads prediction coefficients stored in the addresses represented by the class codes supplied from the classification circuit 214, and supplies the prediction coefficients to the prediction calculation circuit 216.

The coefficient memory 215 selects a bank corresponding to the coefficient information set in the register 218D, and reads the prediction coefficients stored in the addresses of the selected bank supplied from the classification circuit 214.

In step S4, the prediction calculation circuit 216 performs linear prediction calculation expressed by equation (1) by using the prediction taps supplied from the prediction tap forming circuit 212 and the prediction coefficients supplied from the coefficient memory 215, and supplies the resulting pixel value to the image reconstruction circuit 217 as the prediction value for the given pixel.

Subsequently, in step S5, the image reconstruction circuit 217 determines whether, for example, one frame of prediction values is obtained from the prediction calculation circuit 216. If the outcome of step S5 is no, the process returns to step S1, and a new given pixel is set among the pixels forming the corresponding frame of the HD image, and processing in steps S1 through S5 is repeated.

If it is found in step S5 that one frame of prediction values is obtained, the process proceeds to step S6 in which the image reconstruction circuit 217 reconstructs one frame of the HD image (525p HD image) corresponding to the frame of prediction values. The process then returns to step S1, and processing from step S1 is similarly repeated for the subsequent frame of the HD image.

Figure 13:
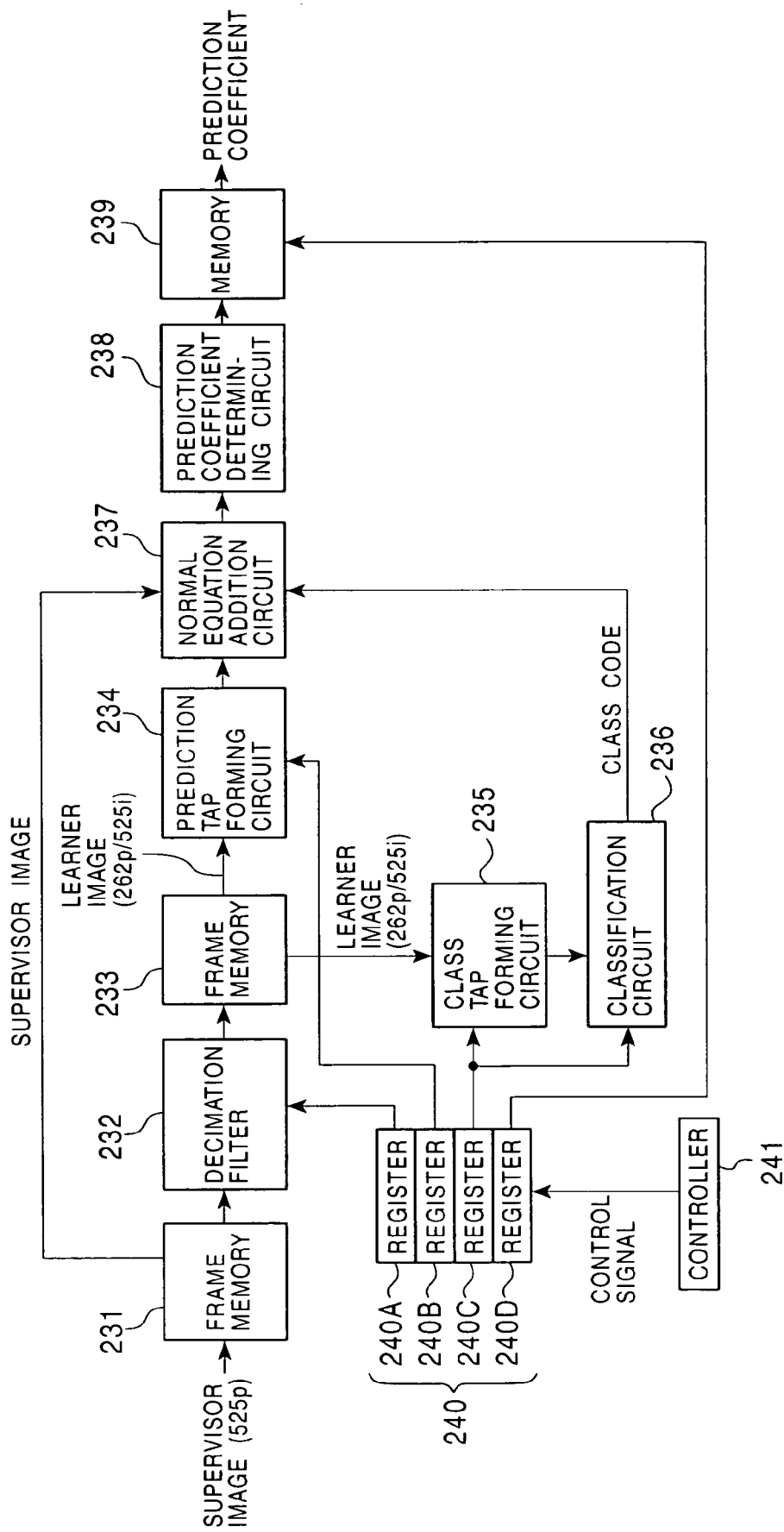
FIG. 13 is a block diagram illustrating an example of the configuration of a learning apparatus for performing learning processing for determining prediction coefficients.

FIG. 13 illustrates an example of the configuration of a learning apparatus for performing learning processing for determining the prediction coefficients to be stored in the coefficient memory 215 of the variable processing unit shown in FIG. 9.

HD images, which serve as supervisor data, (hereinafter referred to as "supervisor images"), are supplied to a frame memory 231 in units of, for example, frames, and the frame memory 231 sequentially stores the supervisor images.

In this embodiment, since the HD image to be obtained in the variable processing unit shown in FIG. 9 is a 525p image, a 525p image is used as a supervisor image.

A decimation filter 232 reads the supervisor images stored in the frame memory 231 in units of, for example, frames. The decimation filter 232 then performs low-pass-filtering (LPF) to reduce the frequency bandwidth of the supervisor image, and also to reduce the number of pixels. Accordingly, the decimation filter 232 lowers the definition of the supervisor image so as to generate an SD image, which serves as learner data, (hereinafter referred to as a "learner image"), and supplies the SD image to a frame memory 233.

That is, in this embodiment, in the variable processing unit shown in FIG. 9, a 525p HD image is obtained from a 525i or 262p SD image. Also, the number of pixels of the 525p HD image in the vertical and horizontal directions double that of the 525i or 262p SD image.

Thus, for generating the learner image (525i or 262p SD image) from the supervisor image (525p HD image), the decimation filter 232 first performs LPF processing (in this case, half band filtering) so as to reduce the frequency band to one half.

The decimation filter 232 also decimates every other pixel arranged in the horizontal direction of the LPF-processed image, thereby reducing the number of pixels to one half. Then, the decimation filter 232 decimates every other horizontal line of each frame of the supervisor image, thereby reducing the number of horizontal lines to one half. As a result, a 262p SD image can be generated as a learner image.

Alternatively, the decimation filter 232 may decimate even-numbered lines of each odd-numbered frame and also decimate odd-numbered lines of each even-numbered frame of the supervisor image, thereby reducing the number of horizontal lines to one half. As a result, a 525i SD image can be generated as a learner image.

The decimation filter 232 determines the type of image, i.e., the 252p SD image or the 525i SD image, according to information set in the register 240A (hereinafter referred to as "learner image format information").

The frame memory 233 sequentially stores the learner images output from the decimation filter 232 in units of, for example, frames or fields.

A prediction tap forming circuit 234 sequentially sets the pixels forming the supervisor image stored in the frame memory 231 (hereinafter referred to as "supervisor pixels") as given pixels. The prediction tap forming circuit 234 then reads some pixels of the learner image (hereinafter referred to as "learner pixels") positioned spatially or temporally close to the given pixel from the frame memory 233, and forms prediction taps to be multiplied with the prediction coefficients.

That is, as in the prediction tap forming circuit 212 shown in FIG. 9, the prediction tap forming circuit 234 sets a selection pattern of the learner pixels to be used as prediction taps based on information set in a register 240B (hereinafter referred to as "prediction tap forming information"). Then, according to the selection pattern, the prediction tap forming circuit 234 selects learner pixels to be used as prediction taps for the given pixel from the learner image stored in the frame memory 233. The prediction taps are then output to a normal equation addition circuit 237.

Meanwhile, a class tap forming circuit 235 reads some learner pixels positioned spatially or temporally close to the given pixel from the frame memory 233, and forms class taps to be used for classification.

More specifically, as in the class tap forming circuit 213 shown in FIG. 9, the class tap forming circuit 235 sets a selection pattern of learner pixels to be used as class taps based on information set in a register 240C (hereinafter referred to as "class tap forming information"). Then, according to the selection pattern, the class tap forming circuit 235 selects learner pixels to be used as class taps for the given pixel from the learner image stored in the frame memory 233. The class taps are then output to a classification circuit 236.

The classification circuit 236 is similarly configured to the classification circuit 214 shown in FIG. 9. The classification circuit 236 classifies the given pixels based on the class taps supplied from the class tap forming circuit 235, and supplies class codes corresponding to the resulting classes to the normal equation addition circuit 237.

The class tap forming information set in the register 240C is supplied to the classification circuit 236. The reason for this is the same as that discussed while referring to the classification circuit 214 shown in FIG. 9.

The normal equation addition circuit 237 reads the supervisor pixels set as the given pixels from the frame memory 231, and performs calculation on the supervisor pixels and the learner pixels forming the prediction taps supplied from the prediction tap forming circuit 234.

More specifically, the normal equation addition circuit 237 performs the multiplication of learner pixels $(x_{in}x_{im})$ and the summation $(\Sigma)$ in each component of the matrix A of equation (12) by using the prediction taps (learner pixels) of each class corresponding to the class code supplied from the classification circuit 236.

The normal equation addition circuit 237 also performs multiplication of the learner pixels and the given pixels (supervisor pixels) $(x_{in}y_i)$ and the summation $(\Sigma)$ in each component of the vector v of equation (12) by using the prediction taps (learner pixels) and the given pixels (supervisor pixels) of each class corresponding to the class code supplied from the classification circuit 236.

The normal equation addition circuit 237 performs the above-described calculation by using all the supervisor pixels stored in the frame memory 231 as given pixels, thereby formulating the normal equation, expressed by equation (12), of each class.

A prediction coefficient determining circuit 238 determines a prediction coefficient of each class by solving the normal equation formulated in the normal equation addition circuit 237, and supplies the prediction coefficient to the address corresponding to each class of a memory 239.

According to the number of images (number of frames) prepared as supervisor images or the content of the images, there may be some classes whose normal equations required for determining prediction coefficients cannot be formulated. In this case, the prediction coefficient determining circuit 238 outputs default prediction coefficients for such classes.

The memory 239 stores the prediction coefficients supplied from the prediction coefficient determining circuit 238. That is, the memory 239 is formed of a plurality of banks and stores the corresponding prediction coefficients in each bank. The memory 239 sets a bank to be used based on information set in a register 240D (hereinafter referred to as "coefficient information"), and stores the prediction coefficient supplied from the prediction coefficient determining circuit 238 in the address corresponding to the class code supplied from the classification circuit 214.

A register group 240 stores information for setting the functions of the decimation filter 232, the prediction tap forming circuit 234, the class tap forming circuit 235, and the memory 239.

More specifically, in the embodiment shown in FIG. 13, the register group 240 is formed of the four registers 240A through 240D. According to control signals from a controller 241, the learner image format information is set in the register 240A, the prediction tap forming information is set in the register 240B, the class tap forming information is set in the register 240C, and the coefficient information is set in the register 240D. Accordingly, the control signals include the learner image format information, the prediction tap forming information, the class tap forming information, and the coefficient information.

The controller 241 is operated by, for example, a system designer. According to the designer's operation, the controller 241 determines the learner image format information, the prediction tap forming information, the class tap forming information, and the coefficient information to be set in the register group 240. The controller 241 then generates the corresponding control signals and supplies them to the register group 240.

Figure 14:
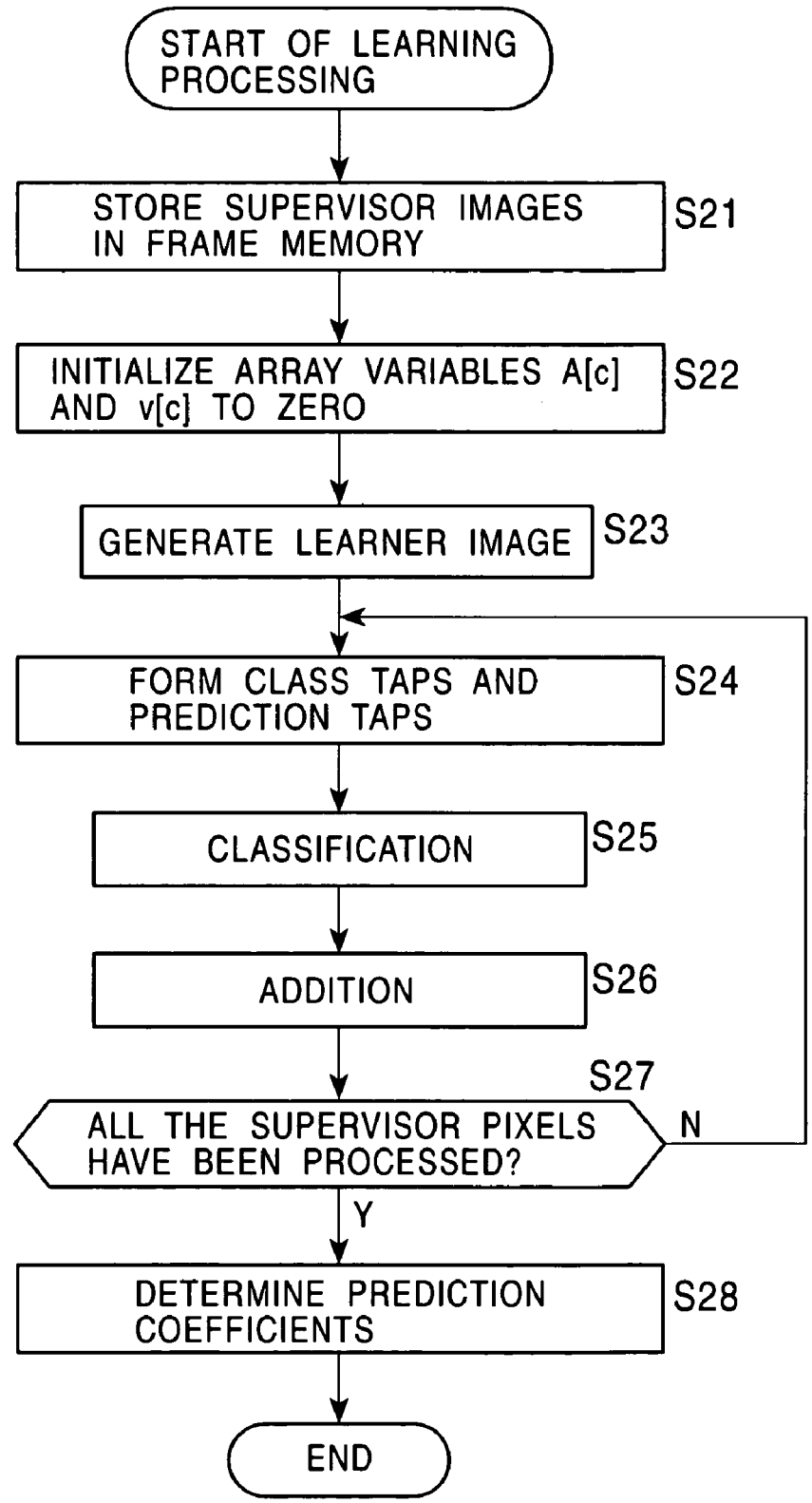
FIG. 14 is a flow chart illustrating learning processing performed by the learning apparatus shown in FIG. 13.

A description is now given of, with reference to the flow chart of FIG. 14, the learning processing of prediction coefficients performed by the learning apparatus shown in FIG. 13.

The controller 241 generates the control signals, and supplies them to the register group 240. Accordingly, the learner image format information, the prediction tap forming information, the class tap forming information, and the coefficient information based on the corresponding control signals are set in the registers 240A, 240B, 240C, and 240D, respectively.

Then, in step S21, supervisor images prepared for learning prediction coefficients are supplied to and stored in the frame memory 231. In step S22, the normal equation addition circuit 237 initializes an array variable A[c] for storing the matrix A of each class and an array variable v[c] for storing the vector v in equation (12) to 0.

Subsequently, in step S23, the decimation filter 232 generates a 525i or 262p SD image as a learner image according to the learner image format information set in the register 240A by processing the supervisor image stored in the frame memory 231. That is, the decimation filter 232 performs LPF processing on the supervisor image stored in the frame memory 231 and then reduces the number of pixels of the LPF-processed supervisor image, thereby generating a learner image with lower definition. The learner images are sequentially supplied to and stored in the frame memory 233.

In step S24, a given pixel is set among the supervisor pixels stored in the frame memory 231. The prediction tap forming circuit 234 selects the learner pixels stored in the frame memory 233 according to the selection pattern corresponding to the prediction tap forming information set in the register 240B, thereby forming prediction taps for the given pixel. Meanwhile, the class tap forming circuit 235 selects the learner pixels stored in the frame memory 233 according to the selection pattern corresponding to the class tap forming information set in the register 240C, thereby forming class taps for the given pixel. Then, the prediction taps are supplied to the normal equation addition circuit 237, while the class taps are supplied to the classification circuit 236.

In step S25, the classification circuit 236 classifies the given pixels based on the class taps supplied from the class tap forming circuit 235, and supplies class codes corresponding to the resulting classes to the normal equation addition circuit 237.

Thereafter, in step S26, the normal equation addition circuit 237 reads the supervisor pixels (given pixels) from the frame memory 231, and performs the above-described addition for the prediction taps (learner pixels) of the matrix A and the given pixels (supervisor pixels) of the vector v in equation (12) by using the array variables A[c] and v[c] according to each class c supplied from the classification circuit 236.

It is then determined in step S27 whether all the supervisor pixels forming the supervisor image stored in the frame memory 231 have been processed as given pixels. If the outcome of step S27 is no, the process returns to step S24. In this case, one of the supervisor pixels is set as a new given pixel, and processing in steps S24 through S27 is repeated.

If it is found in step S27 that all the supervisor pixels have been processed as given pixels, i.e., that normal equations for all the classes are formulated in the normal equation addition circuit 237, the process proceeds to step S28. In step S28, the prediction coefficient determining circuit 238 determines the prediction coefficients of each class by solving the corresponding normal equation, and supplies them to the address of the corresponding class of the memory 239.

The memory 239 has selected the bank corresponding to the coefficient information set in the register 240D, and stores the prediction coefficients of the corresponding class supplied from the prediction coefficient determining circuit 238 in each address of the selected bank. The learning processing is then completed.

The learning processing shown in FIG. 14 is performed every time the bank of the memory 239 is changed. In other words, the learning processing is performed according to the type of prediction coefficient.

In the aforementioned embodiment, there are two types of prediction coefficients, i.e., prediction coefficients for suitably converting a 525i SD image into a 525p HD image (hereinafter referred to as "525i prediction coefficients"), and prediction coefficients for suitably converting a 262 SD image into a 525p HD image (hereinafter referred to as "262p prediction coefficients").

According to the learning apparatus shown in FIG. 13, by changing the supervisor data (supervisor images) and the learner data (learner images), 525i prediction coefficients and 262p prediction coefficients are obtained. Alternatively, prediction coefficients for changing the number of pixels in the temporal domain (frame rate or field rate) or changing the aspect ratio of pixels, or prediction coefficients for achieving noise reduction can be obtained. The 525i prediction coefficients and the 262p prediction coefficients serve the functions of increasing the number of pixels in the spatial domain and of improving the definition. Accordingly, it is possible to obtain prediction coefficients having two functions. In other words, by using such prediction coefficients, two types of processing can be performed simultaneously. More specifically, the definition of the supervisor image is first decreased, and the number of pixels of the resulting supervisor image is then reduced in the temporal/spatial domain, thereby forming a learner image. By using such learner images, learning processing is performed. As a result, prediction coefficients for improving the definition and for increasing the number of pixels in the temporal/spatial domain are determined.

As discussed above, by performing learning by using a combination of various types of supervisor data and learner data, prediction coefficients for performing various types of variable processing can be obtained. Then, the variable processing group 28 of the integrated processor 27 (FIG. 2) is able to perform various types of variable processing by using such prediction coefficients.

The common processing group 29 shown in FIG. 2 performs the previously discussed common processing. This common processing may also be performed by the classification adaptive processing. Accordingly, the individual common processing units of the common processing group 29 can be constructed similarly to the variable processing unit shown in FIG. 9.

If both the variable processing and the common processing are performed by using the classification adaptive processing, the variable processing unit shown in FIG. 9 can be cascade-connected to the corresponding common processing unit so as to perform the variable processing and the common processing, respectively. Alternatively, the processing unit shown in FIG. 9 may be used for both the variable processing unit and the common processing unit. That is, prediction coefficients are learned for performing the variable processing and the common processing at one time, and by using such prediction coefficients, the variable processing and the common processing are simultaneously performed.

A description is further given of common processing and variable processing performed in input devices, output devices, and storage devices connected to the integrated processing box 1 shown in FIG. 1, and in the integrated processor 27 shown in FIG. 2.

As stated above, the integrated processing box 1 is connectable to a device formed of only a unique portion (unique device) and to a device formed of three portions, i.e., a unique portion, a portion which performs common processing, and a portion which performs variable processing (regular device), as in conventional devices.

Figure 15:
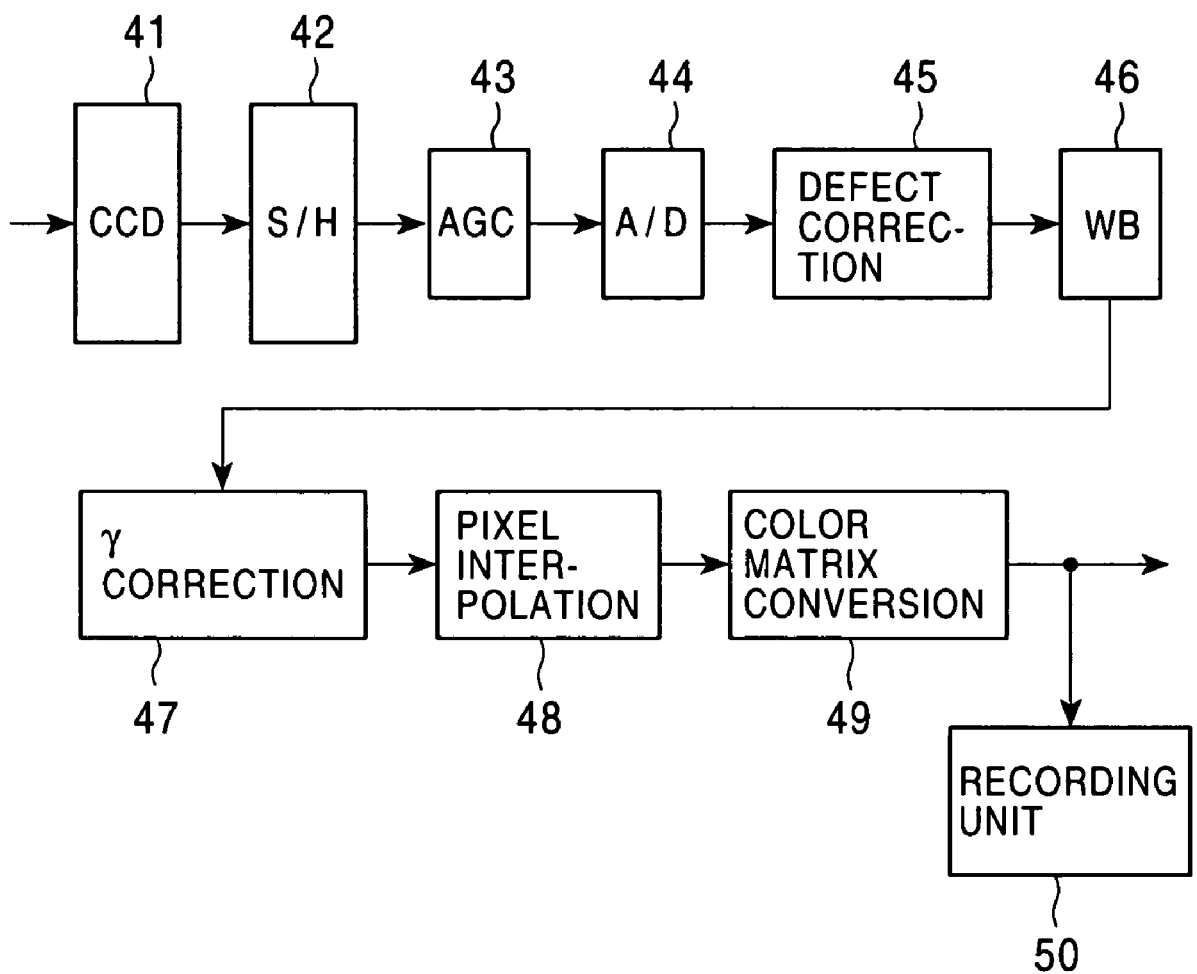
FIG. 15 is a block diagram illustrating an example of the configuration of a video camera, which is a regular device.

FIG. 15 illustrates an example of the configuration of a video camera (regular device), which serves as an input device.

A charge coupled device (CCD) 41 receives light from a subject and performs photoelectric conversion, thereby outputting a resulting electrical signal indicating the amount of received light to a sample-and-hold (S/H) circuit 42. The S/H circuit 42 samples and holds the electrical signal from the CCD 41 with a predetermined timing, and outputs it to an automatic gain control (AGC) circuit 43. The AGC circuit 43 adjusts the gain (AGC processing) of the output from the S/H circuit 42, and supplies an analog image signal to an analog-to-digital (A/D) conversion circuit 44. The A/D conversion circuit 44 performs A/D conversion on the analog image signal output from the AGC circuit 43, and outputs a resulting digital image signal to a defect correction circuit 45. The defect correction circuit 45 performs defect correction processing on the image data supplied from the A/D conversion circuit 44. In the video camera, some pixels may be missing due to defects of the CCD 41. In this correction processing, such defects can be corrected. The resulting image data is then output to a white balance (WB) circuit 46. The WB circuit 46 adjusts the levels of the individual components, such as red (R), green (G), and blue (B) components (WB processing), which form the image data output from the defect correction circuit 45. As a result, the ratio of the levels of the individual components can be a predetermined value. Then, the resulting image is output to a gamma (γ) correction circuit 47. The γ correction circuit 47 performs γ correction on the image data received from the WB circuit 46, and outputs the resulting data to a pixel interpolation circuit 48. The pixel interpolation circuit 48 interpolates R, G, and B components as required among the pixels forming the image data supplied from the γ correction circuit 47.

That is, in the embodiment shown in FIG. 15, the video camera is a single-component type, and a color filter (not shown) is disposed before the CCD 41. Accordingly, the pixels forming the image signal from the CCD 41 contain only one type of component of the R components, G components, and B components. More specifically, the pixels including R components do not contain G and B components, the pixels including G components do not contain R and B components, and the pixels including B components do not contain R and G components. Thus, the pixel interpolation circuit 48 determines which types of components are missing, interpolates the missing components, and outputs the resulting image signal to a color matrix conversion circuit 49.

If the video camera is a three-component type, the pixel interpolation circuit 48 is not necessary.

The color matrix conversion circuit 49 performs color matrix conversion processing on the R, G, and B components of the image data, and outputs, for example, Y, R-Y, and B-Y image data. A recording unit 50 records the image data supplied from the color matrix conversion circuit 49 on a recording medium, such as a video tape, as necessary.

Figure 16:
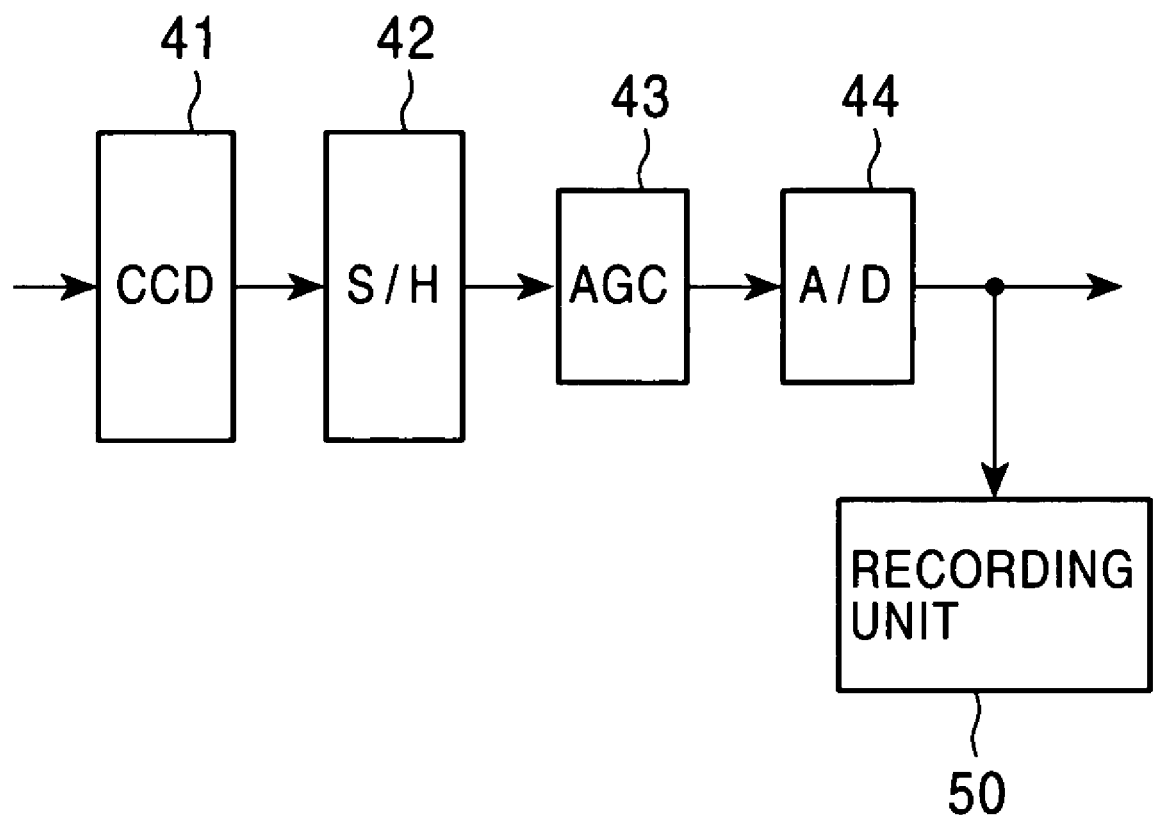
FIG. 16 is a block diagram illustrating an example of the configuration of a video camera, which is a unique device.

FIG. 16 illustrates an example of the configuration of a video camera (unique device), which serves as an input device. The same elements as those shown in FIG. 15 are designated with like reference numerals, and an explanation thereof will thus be omitted.

The video camera shown in FIG. 16 is formed without the defect correction circuit 45, the γ correction circuit 47, the pixel interpolation circuit 48, and the color matrix conversion circuit 49, which perform the common processing or the variable processing.

Accordingly, in the video camera shown in FIG. 16, which is a unique device, defect correction processing, γ correction processing, pixel interpolation processing, and color matrix conversion processing, which are performed in a regular device, are not performed.

That is, since the common processing and the variable processing are performed by the integrated processor 27, it is not necessary to provide blocks for performing the common processing or the variable processing for the video camera (unique device).

Figure 17:
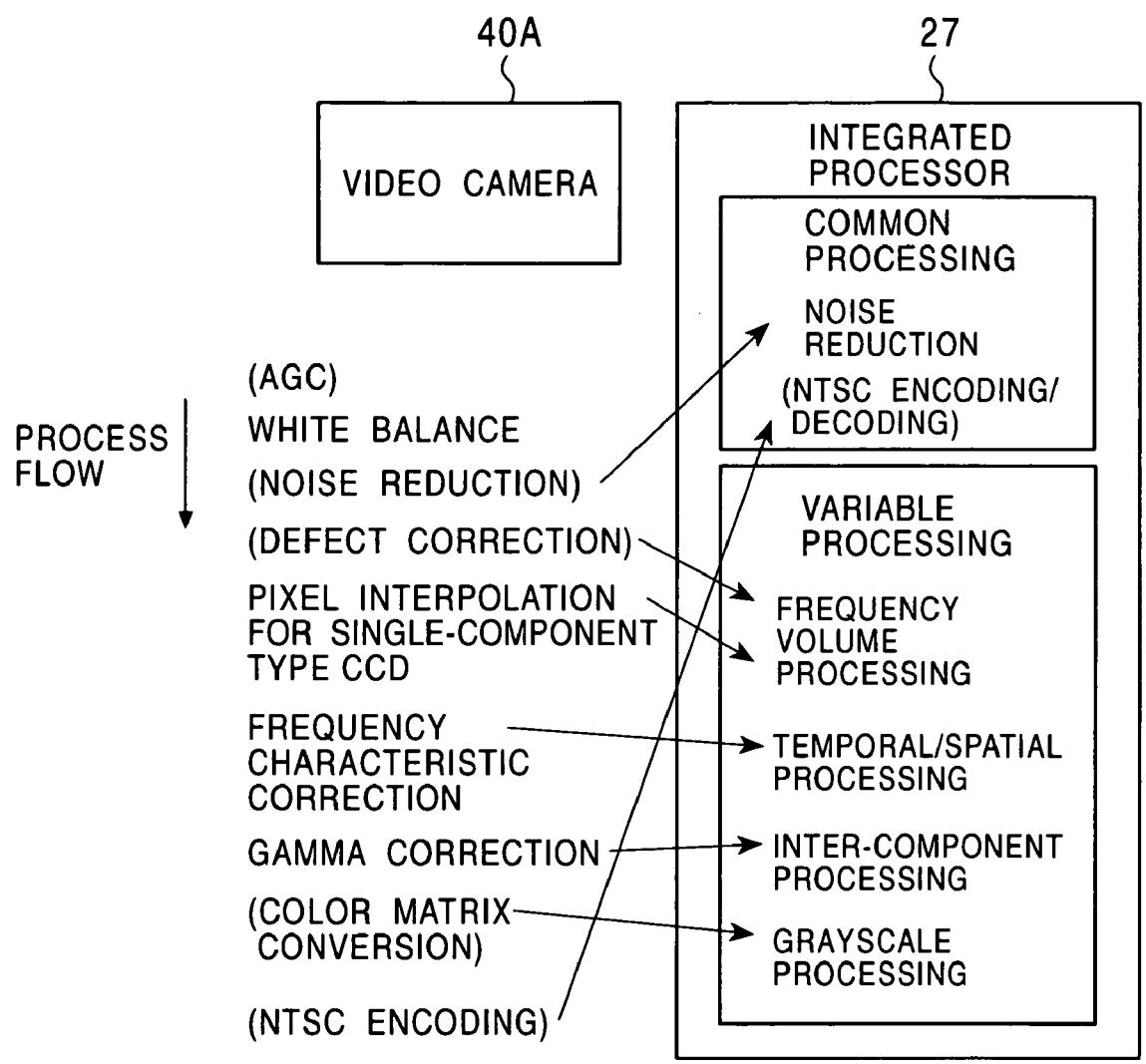
FIG. 17 illustrates the relationships between processing performed by a video camera 40A, which is a regular device, and common processing and variable processing.

FIG. 17 illustrates the relationships between the processing performed in a video camera (regular device) and the common processing and the variable processing performed in the integrated processor 27.

In a video camera 40A (regular device), AGC processing, white balance (WB) processing, noise reduction processing for reducing noise in the image data, defect correction processing, pixel interpolation processing, frequency characteristic correction processing for correcting the frequency characteristics of the image data, γ correction processing, color matrix conversion processing, NTSC encoding processing for converting image data into NTSC data, etc. are performed. In FIG. 17 (also FIGS. 20, 24, 26, and 38), operations performed by the video camera 40A are shown below the video camera 40A, and the operations in parentheses are performed when necessary.

Among the operations performed by the video camera 40A, the noise reduction processing and the NTSC encoding processing are generally independent of whether the input device is the video camera 40A, and are thus common processing. On the other hand, the defect correction processing, the pixel interpolation processing, the frequency characteristic correction processing, the γ correction processing, and the color matrix conversion processing are dependent on whether the input device is the video camera 40A, and are thus variable processing.

When the video camera 40A (regular device) is connected to the integrated processing box 1 (FIG. 1) so as to supply image data output from the video camera 40A to the integrated processor 27 (FIG. 2), the integrated processor 27 performs the following processing. The variable processing group 28 performs the defect correction processing, the pixel interpolation processing, the frequency characteristic correction processing, the γ correction processing, and the color matrix conversion processing on the image data as required, all of which are the variable processing. The common processing group 29 performs the noise reduction processing and the NTSC encoding processing as required, which are the common processing.

That is, the integrated processor 27 performs the variable processing and common processing which are not executed by the video camera 40A. Or, even among the variable processing and common processing executable by the video camera 40A, the integrated processor 27 may perform the corresponding processing if it is able to perform it more effectively than the video camera 40A.

Figure 18:
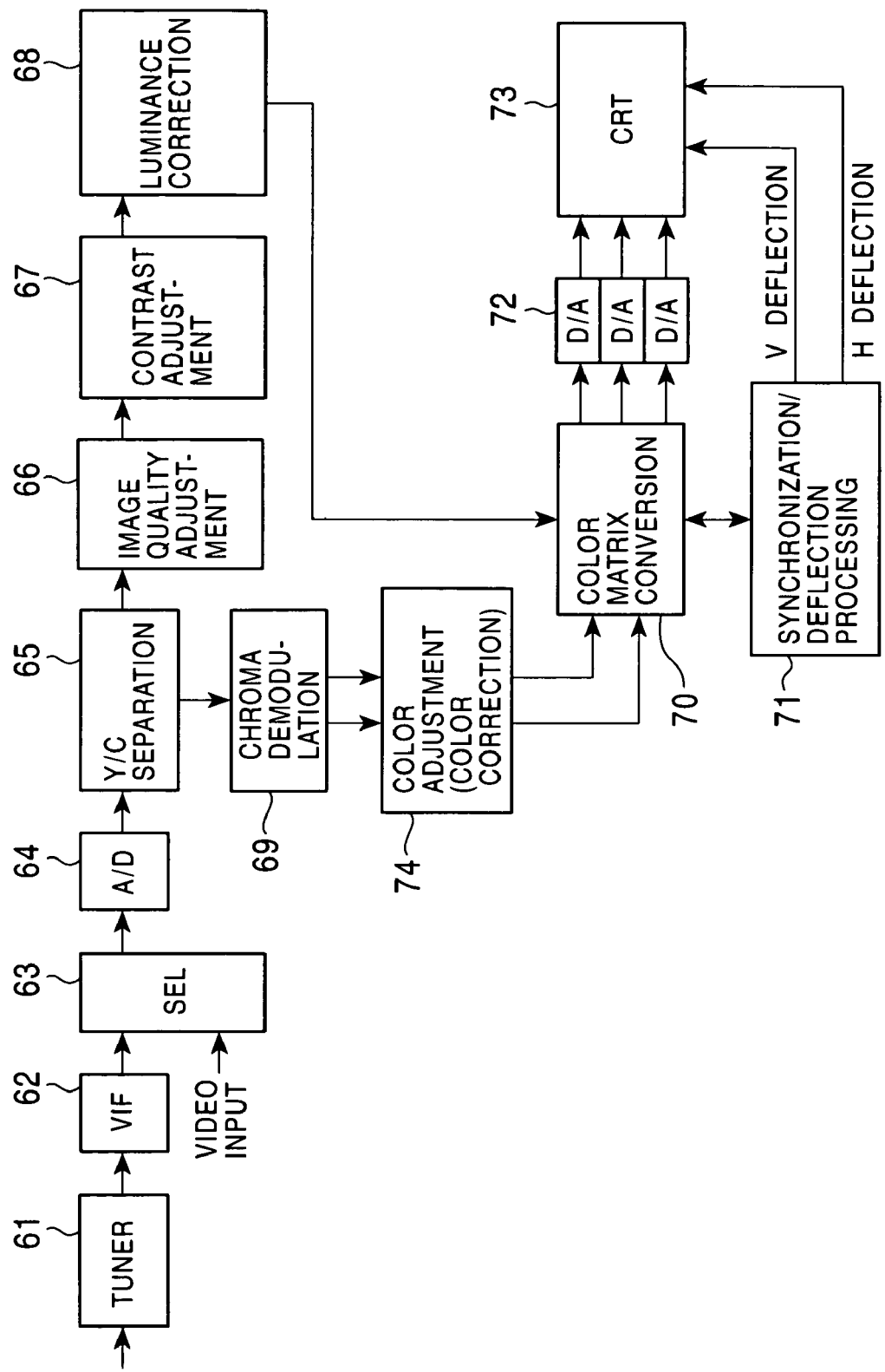
FIG. 18 is a block diagram illustrating an example of the configuration of a CRT monitor, which is a regular device.

FIG. 18 illustrates an example of the configuration of a CRT monitor (regular device), which serves as an output device.

A tuner 61 receives television broadcast signals via an antenna (not shown) and selects a signal of a predetermined channel. The tuner 61 then converts the selected signal into a signal of a video intermediate frequency (VIF) band and supplies it to a VID circuit 62. The VIF circuit 62 amplifies an output from the tuner 61 as required, and supplies it to a selector (SEL) 63. The selector 63 selects the signal from the VIF circuit 62 or a video input signal from an external source, and supplies the selected signal to an A/D conversion circuit 64. The A/D conversion circuit 64 performs A/D conversion on the output from the selector 63, thereby converting the analog image signal into a digital image signal, and supplies it to a Y/C separation circuit 65. The Y/C separation circuit 65 separates the output from the A/D converter 64 into a luminance signal (Y) and a chroma signal (C). The luminance signal (Y) is supplied to an image quality adjusting circuit 66, while the chroma signal (C) is supplied to a chroma demodulation circuit 69.

The image quality adjusting circuit 66 performs image quality adjusting processing, such as aperture correction, on the luminance signal from the Y/C separation circuit 65, by adding pre-shooting and over-shooting, and supplies the adjusted luminance signal to a contrast adjusting circuit 67. The contrast adjusting circuit 67 adjusts the contrast of the luminance signal output from the image quality adjusting circuit 66, and supplies the resulting luminance signal to a luminance correction circuit 68. The luminance correction circuit 68 performs luminance correction processing, such as reading DC components of the luminance signal output from the contrast adjusting circuit 67, and supplies the resulting luminance signal to a color matrix conversion circuit 70.

Meanwhile, the chroma demodulation circuit 69 separates a color burst signal from the chroma signal (C) output from the Y/C separation circuit 65, and demodulates an R-Y signal and a B-Y signal from the chroma signal based on the color burst signal. The chroma demodulation circuit 69 then supplies the R-Y signal and the B-Y signal to the color matrix conversion circuit 70 via a color adjusting circuit 74. The color adjusting circuit 74 performs color correction on the output from the chroma demodulation circuit 69 according to a user's operation.

The color matrix conversion circuit 70 performs color matrix conversion processing on the luminance signal (Y) from the luminance correction circuit 68 and the R-Y signal and the B-Y signal from the chroma demodulation circuit 69 so as to convert them to image data consisting of R, G, and B components. The R, G, and B components are then supplied to a digital-to-analog (D/A) converter 72. The color matrix conversion circuit 70 uses a predetermined synchronization signal while performing the color matrix conversion processing, and supplies this synchronization signal to a synchronization/deflection processing circuit 71. The synchronization/deflection processing circuit 71 generates a vertical deflection signal (V deflection signal) and a horizontal deflection signal (H deflection signal) for driving a CRT 73 based on the synchronization signal from the color matrix conversion circuit 70. The V deflection signal and the H deflection signal are supplied to a deflection coil (not shown) of the CRT 73, thereby driving the CRT 73.

Meanwhile, the D/A conversion unit 72 performs D/A conversion on the R, G, B components of the digital signal from the color matrix conversion circuit 70, and supplies the R, G, and B components of the resulting analog signal to the CRT 73. Then, the image corresponding to the R, G, and B components is displayed on the CRT 73.

In FIG. 18, the CRT monitor (regular device) may be formed without the A/D conversion circuit 64 and the D/A converter 72.

Figure 19:
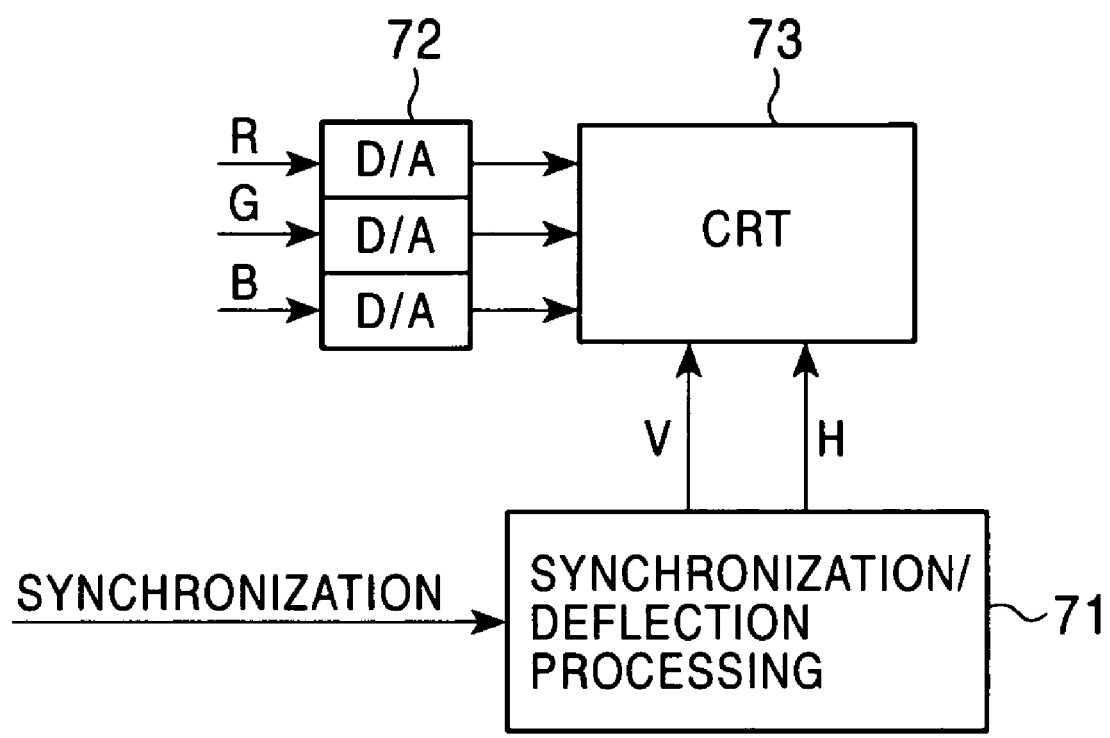
FIG. 19 is a block diagram illustrating an example of the configuration of a CRT monitor, which is a unique device.

FIG. 19 illustrates an example of the configuration of a CRT monitor (unique device), which serves as an output device. The same elements as those shown in FIG. 18 are indicated by like reference numerals, and an explanation thereof will thus be omitted.

The CRT monitor shown in FIG. 19 is formed without the image quality adjusting circuit 66, the contrast adjusting circuit 67, the luminance correction circuit 68, the color matrix conversion circuit 70, and the color adjusting circuit 74, which perform the common processing or the variable processing.

Accordingly, in the CRT monitor (unique device) shown in FIG. 19, the image quality adjusting processing, the contrast adjusting processing, the luminance correction processing, the color matrix conversion processing, and the color correction processing, which are performed in the CRT monitor (regular device), are not performed.

That is, since the above-described common processing and variable processing are executed by the integrated processor 27, the CRT monitor (unique device) can be formed without blocks performing such processing.

Figure 20:
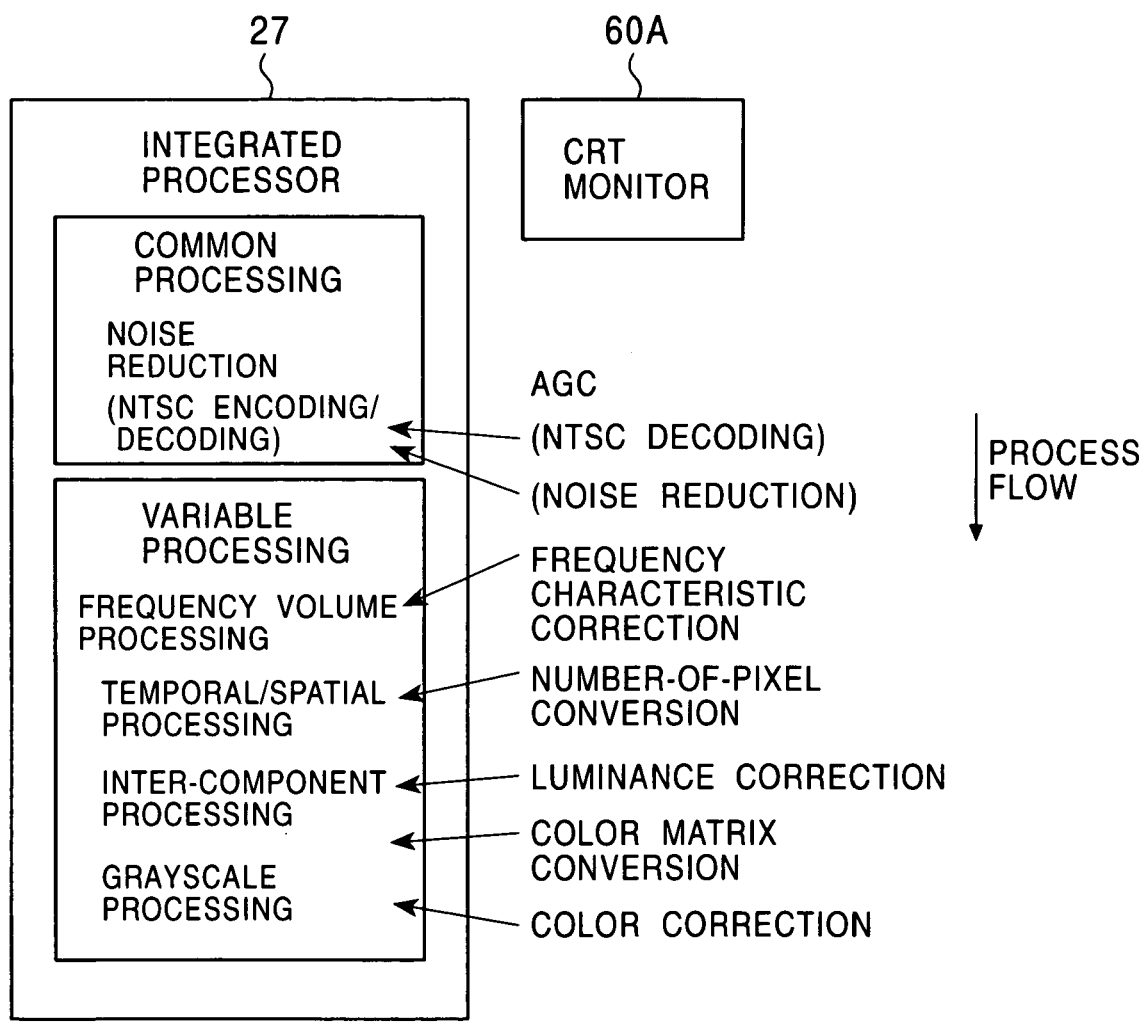
FIG. 20 illustrates the relationships between processing performed by a monitor CRT 60A, which is a regular device, and common processing and variable processing.

FIG. 20 illustrates the relationships between the operations performed by a CRT monitor (regular device) and the common processing and the variable processing performed by the integrated processor 27.

In a CRT monitor (regular device) 60A, AGC processing, NTSC decoding processing for converting NTSC image data into image data consisting of R, G, and B components, noise reduction processing, frequency characteristics correction processing, number-of-pixel conversion processing for converting the number of pixels to be suitable for the definition of the CRT monitor 60A, luminance correction processing (corresponding to the processing performed by the luminance correction circuit 68 shown in FIG. 18), color matrix conversion processing (corresponding to the processing performed by the color matrix conversion circuit 70 shown in FIG. 18), and color correction processing for adjusting the color components of the image data to the characteristics suitable for the CRT monitor 60A (corresponding to the processing performed by the color adjusting circuit 74 shown in FIG. 18) are performed.

In FIG. 20, among the operations performed by the CRT monitor 60A, the noise reduction processing and the NTSC decoding processing are independent of whether the output device is the CRT monitor 60A, and are thus common processing. The frequency characteristic correction processing, the number-of-pixel conversion processing, the luminance correction processing, the color matrix conversion processing, and the color correction processing are dependent on whether the output device is the CRT monitor 60A, and are thus variable processing.

When the CRT monitor 60A is connected to the integrated processing box 1 (FIG. 1) as an output device so as to supply image data to the CRT monitor 60A, the integrated processor 27 (FIG. 2) performs the following processing. The variable processing group 28 performs the frequency characteristic correction processing, the number-of-pixel conversion processing, the luminance correction processing, the color matrix conversion processing, and the color correction processing as required, all of which are variable processing. The common processing group 29 performs the noise reduction processing and the NTSC decoding processing as required, which are common processing.

That is, the integrated processor 27 performs variable processing and common processing which are not performed by the CRT monitor 60A. Or, even among the variable processing and common processing executable by the CRT monitor 60A, the integrated processor 27 may perform the corresponding processing if it is able to perform it more effectively than the CRT monitor 60A.

Figure 21:
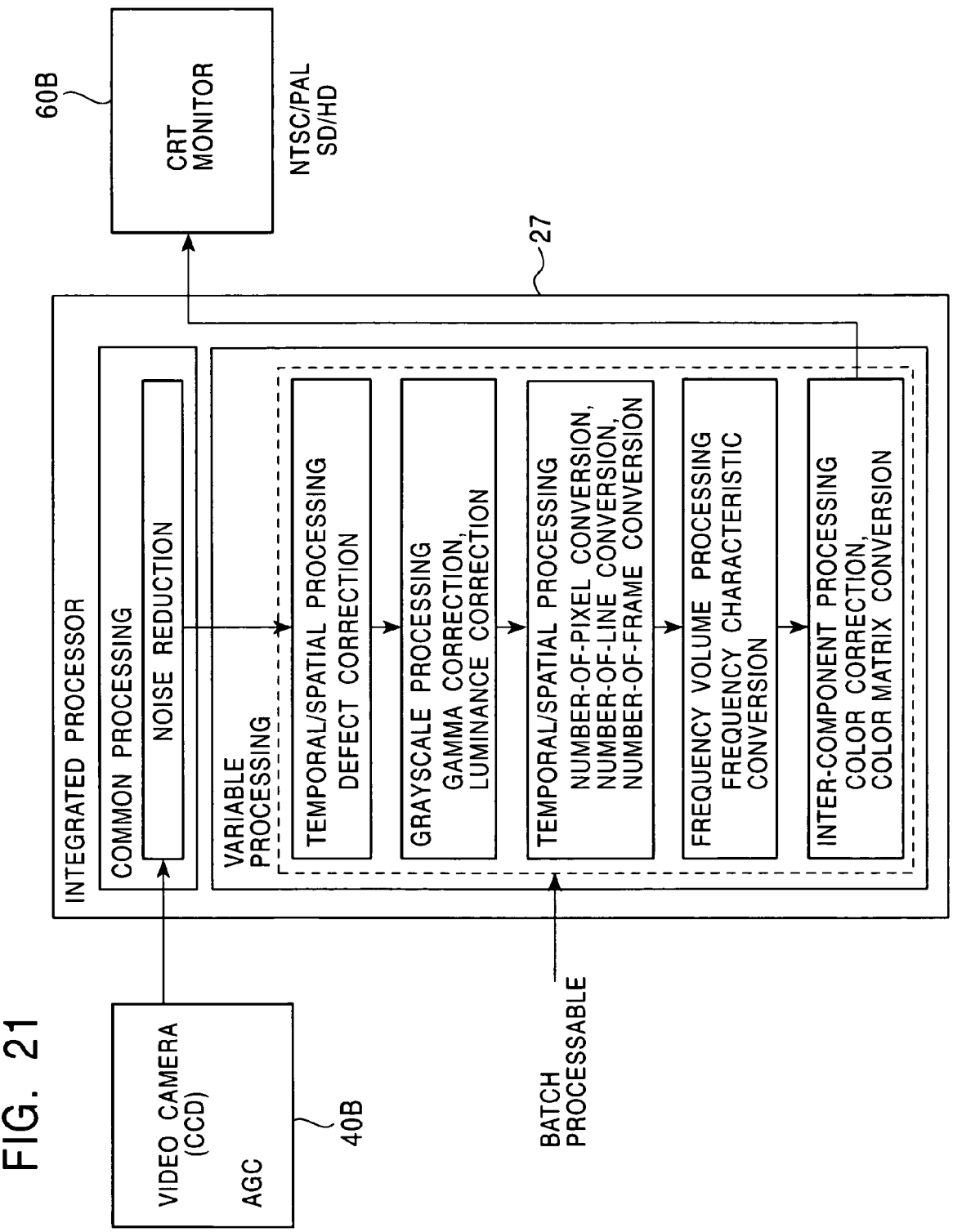
FIG. 21 illustrates processing performed by the integrated processing box 1 connected to a video camera 40B and a CRT monitor 60B, both of which are unique devices.

FIG. 21 illustrates a video camera (unique device) 40B selected as an input device and a CRT monitor (unique device) 60B selected as an output device connected to the integrated processing box 1. The video camera 40B may be formed, such as that shown in FIG. 16, and the CRT monitor 60B may be formed, such as that shown in FIG. 19.

Image data output from the video camera 40B is supplied to the integrated processor 27. The common processing group 29 of the integrated processor 27 performs the noise reduction processing on the image data. The variable processing group 28 performs variable processing, such as the defect correction, the γ correction, the luminance correction, the number-of-pixel conversion, the number-of-line conversion, the number-of-frame conversion, the frequency characteristic conversion, the color conversion, and the color matrix conversion, on the image data to be suitable for the video camera 40B and the CRT monitor 60B. The resulting image data is then supplied to the CRT monitor 60B.

The number-of-pixel conversion processing, the number-of-line conversion processing, the number-of-frame conversion processing, and the frequency characteristic conversion processing are performed based on the number of pixels of the CCD of the video camera 40B, the scanning method of the CRT monitor 60B (for example, whether the NTSC method, the PAL method, or the progressive method), the definition (for example, whether the image is an SD or HD image), etc. so that the image output from the video camera 40B can be suitably displayed on the CRT monitor 60B.

In the embodiment shown in FIG. 21, the defect correction processing, the number-of-pixel conversion processing, the number-of-line conversion processing, and the number-of-frame conversion processing are included in temporal/spatial processing. The γ correction processing and the luminance correction processing are included in grayscale processing, which is reflected in the grayscale of the image. The frequency characteristic conversion processing is contained in frequency volume processing. The color correction processing and the color matrix conversion processing are contained in inter-component processing for processing R, G, and B components forming the image data. The temporal/spatial processing, the grayscale processing, the frequency volume processing, and the inter-component processing can all be performed by the above-described classification adaptive processing.

Thus, the temporal/spatial processing for the defect correction processing, the grayscale processing for the γ correction and luminance correction processing, the temporal/spatial processing for the number-of-pixel conversion processing, number-of-line conversion processing, and number-of-frame conversion processing, the frequency volume processing for the frequency characteristic conversion processing, and the inter-component processing for the color conversion processing and the color matrix conversion processing can be individually performed by learning the corresponding prediction coefficients. Alternatively, predictive coefficients for performing all the processing may be learned, and the above-described processing may be performed at one time.

According to the frequency volume processing, the frequency characteristics of the image are adjusted according to the prediction coefficients used in classification adaptive processing. In this case, the controller 30 (FIG. 2) may determine the frequency characteristics by, for example, the user's operation through the remote controller 5 (FIG. 1). Alternatively, the controller 30 may infer the frequency characteristics based on the user's operation performed through the remote controller 5, and thereafter, the frequency volume processing may be automatically performed so that the frequency characteristics desired by the user can be obtained without the need for the user to perform the operation.

In FIG. 21, the defect correction processing as the temporal/spatial processing corresponds to the processing performed by the defect correction circuit 45 shown in FIG. 15, and the γ correction processing as the grayscale processing corresponds to the processing performed by the γ correction circuit 47 shown in FIG. 15. The luminance correction processing as the grayscale processing corresponds to the processing executed by the WB circuit 46 shown in FIG. 15 and by the contrast adjusting circuit 67 shown in FIG. 18. The color matrix conversion processing as the inter-component processing corresponds to the processing executed by the color matrix conversion processing 49 shown in FIG. 15.

In FIG. 21, the number-of-pixel conversion processing, the number-of-line conversion processing, and the number-of-frame conversion processing as the temporal/spatial processing, and the frequency characteristic conversion processing as the frequency volume processing are not performed in regular devices. The integrated processor 27 effectively performs the above-described types of processing which are not performed in regular devices. More specifically, when the video camera 40B outputs NTSC images and when the CRT monitor 60B displays PAL images, the integrated processor 27 performs the number-of-line conversion processing and the number-of-frame conversion processing as the temporal/spatial processing so as to convert an NTSC image output from the video camera 40B into a PAL image to be displayed on the CRT monitor 60B. When the video camera 40B outputs SD images, and when the CRT monitor 60B displays HD images, the integrated processor 27 performs the number-of-pixel conversion processing and the number-of-line conversion processing as the temporal/spatial processing so as to convert an SD image output from the video camera 40B into an HD image to be displayed on the CRT monitor 60B.

Figure 22:
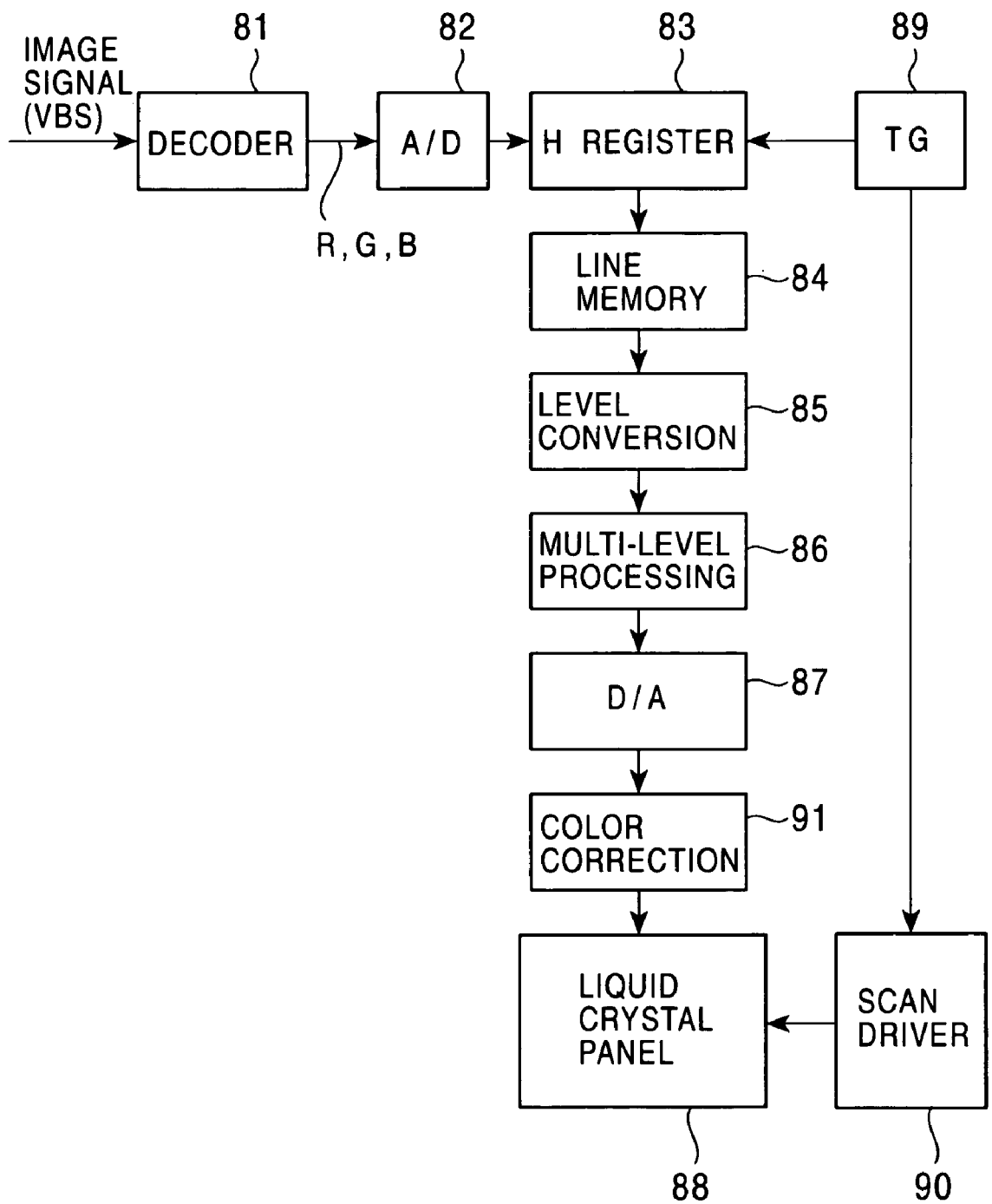
FIG. 22 is a block diagram illustrating an example of the configuration of a liquid crystal monitor, which is a regular device.

FIG. 22 illustrates an example of the configuration of a liquid crystal monitor (regular device), which serves as an output device.

An NTSC composite image signal (VBS) is supplied to a decoder 81. The decoder 81 then converts the image signal into an image signal having R, G, and B components by performing NTSC-decoding, and supplies it to an A/D conversion circuit 82. The A/D conversion circuit 82 performs A/D conversion on the image signal from the decoder 82 to convert the analog signal into a digital signal. The digital image data is then supplied to a horizontal register (H register) 83. The horizontal register 83 sequentially latches one horizontal lines of the pixel values of the image data supplied from the A/D conversion circuit 82 based on a timing signal supplied from a timing generator (TG) 89. When one horizontal line of image data (pixel values) is latched in the horizontal register 83, a line memory 84 reads the whole image data from the horizontal register 83 and stores it therein. A level conversion circuit 85 then reads one horizontal line of image data stored in the line memory 84, and converts the level of the image data (level conversion) and supplies it to a multi-leveling (grayscale) circuit 86. The multi-leveling circuit 86 generates a multi-leveled signal voltage (multi-level processing) based on the image data output from the level conversion circuit 85, and supplies it to a D/A conversion circuit 87. The D/A conversion circuit 87 converts the digital signal voltage corresponding to the image data output from the multi-leveling circuit 86 into an analog signal voltage, and supplies it to a color correction circuit 91. The color correction circuit 91 then performs color correction on the output from the D/A conversion circuit 87, and supplies the resulting signal to a liquid crystal panel 88.

Meanwhile, the timing generator 89 supplies the generated timing signal to the horizontal register 83 and also to a scan driver 90. The scan driver 90 drives the liquid crystal panel 88 according to the timing signal from the timing generator 89. As a result, an image corresponding to the signal voltage supplied from the D/A conversion circuit 87 is displayed on the liquid crystal panel 88.

Figure 23:
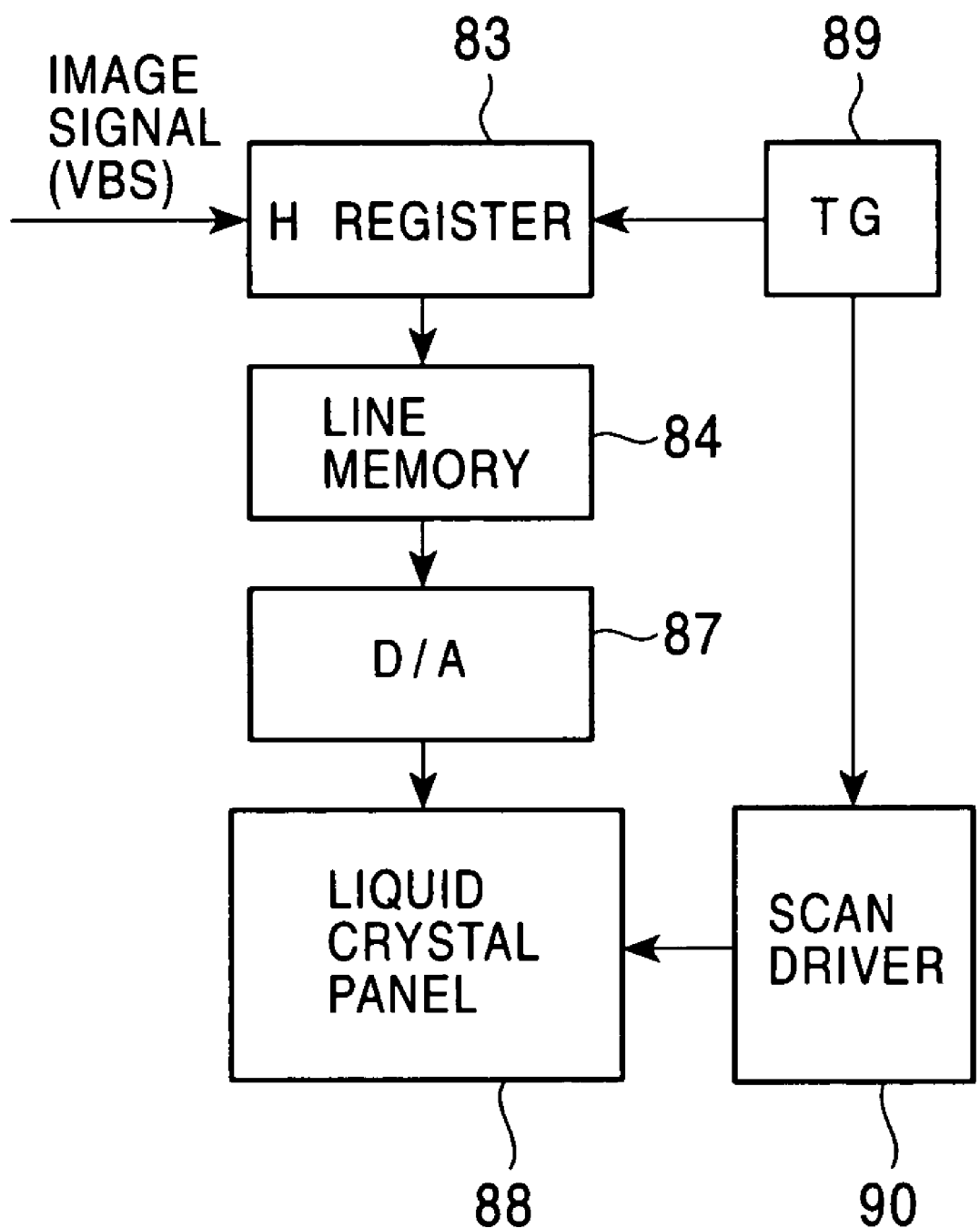
FIG. 23 is a block diagram illustrating an example of the configuration of a liquid crystal monitor, which is a unique device.

FIG. 23 illustrates an example of the configuration of a liquid crystal monitor (unique device), which serves as an output device. The same elements as those shown in FIG. 22 are designated with like reference numerals, and an explanation thereof will thus be omitted.

The liquid crystal monitor shown in FIG. 23 is formed without the decoder 81, the level conversion circuit 85, and the multi-leveling circuit 86, which perform the common processing or the variable processing.

Accordingly, in the liquid crystal monitor shown in FIG. 23, the NTSC decoding processing, the level conversion processing, and the multi-level processing which are performed in a liquid crystal monitor (regular device) are not performed.

That is, since such common processing and variable processing are performed by the integrated monitor 27, the liquid crystal monitor can be formed without blocks performing the common processing or variable processing.

Figure 24:
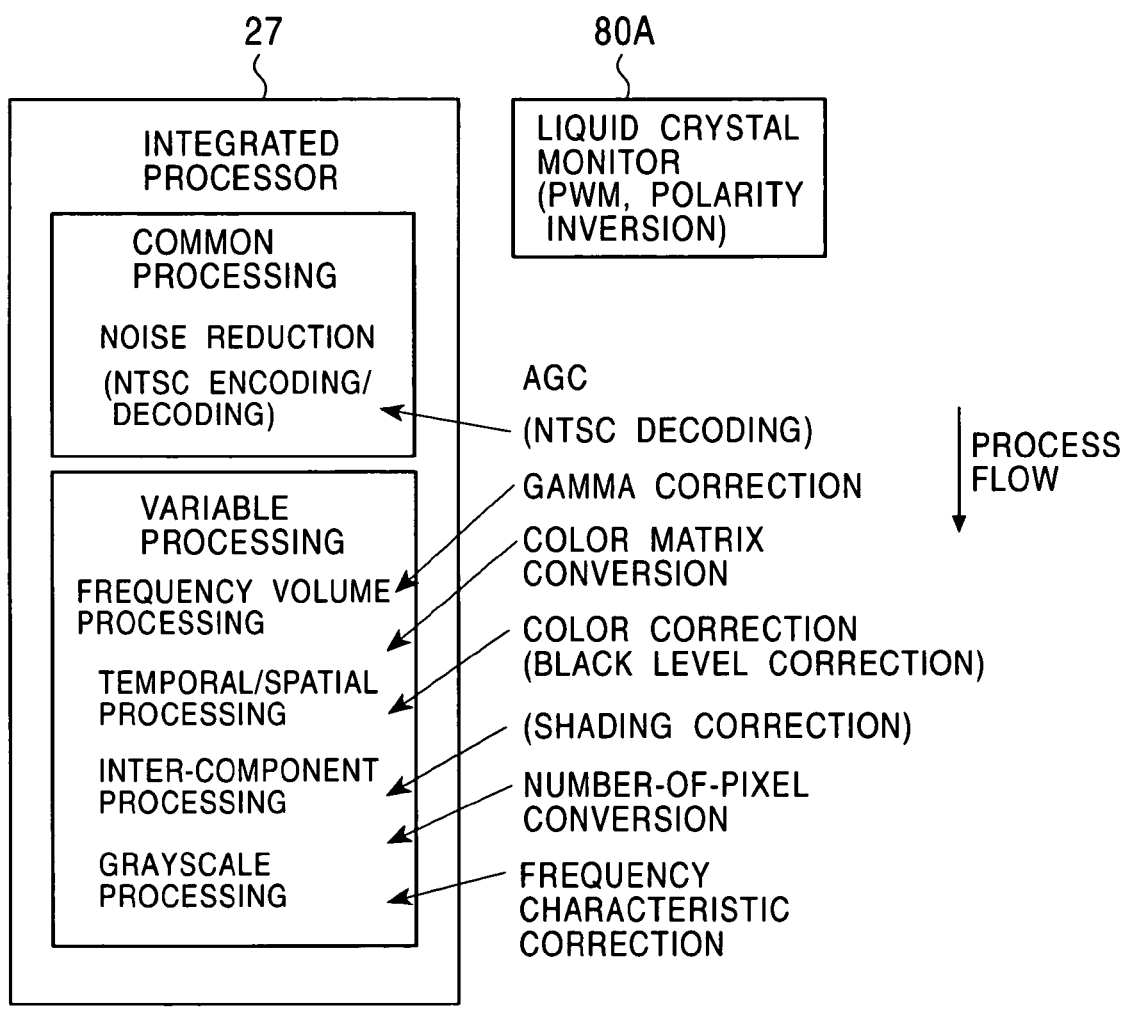
FIG. 24 illustrates the relationship between processing performed by a liquid crystal monitor 80A, which is a regular device, and common processing and variable processing.

FIG. 24 illustrates the relationships between the operations performed by a liquid crystal monitor (regular device) and the common processing and the variable processing performed by the integrated processor 27.

In a liquid crystal monitor (regular device) 80A, AGC processing, NTSC decoding processing, γ correction processing, color matrix conversion processing, color correction processing, black level correction processing, shading correction processing, number-of-pixel conversion processing, frequency characteristic correction processing, etc. are performed.

In FIG. 24, among the operations performed by the liquid crystal monitor 80A, the NTSC decoding processing is generally independent of whether the output device is the liquid crystal monitor 80A, and is thus common processing. In contrast, the γ correction processing, the color matrix conversion processing, the color correction processing, the black level correction processing, the shading correction processing, the number-of-pixel conversion processing, the frequency characteristic correction processing are dependent on whether the output device is the liquid crystal monitor 80A, and are thus variable processing.

When the liquid crystal monitor 80A is connected to the integrated processing box 1 as an output device so as to supply image data to the liquid crystal monitor 80A, the integrated processor 27 performs the following processing. The variable processing group 28 performs the variable processing as required, such as the γ correction, the color matrix conversion, the color correction, the black level correction, the shading correction, the number-of-pixel conversion, and the frequency characteristic correction. The common processing group 29 performs the NTSC decoding processing as required.

That is, the integrated processor 27 performs variable processing and common processing which are not executed by the liquid crystal monitor 80A. Or, even among the variable processing and common processing executable by the liquid crystal monitor 80A, the integrated processor 27 may perform the corresponding processing if it is able to perform it more effectively than the liquid crystal monitor 80A.

Figure 25:
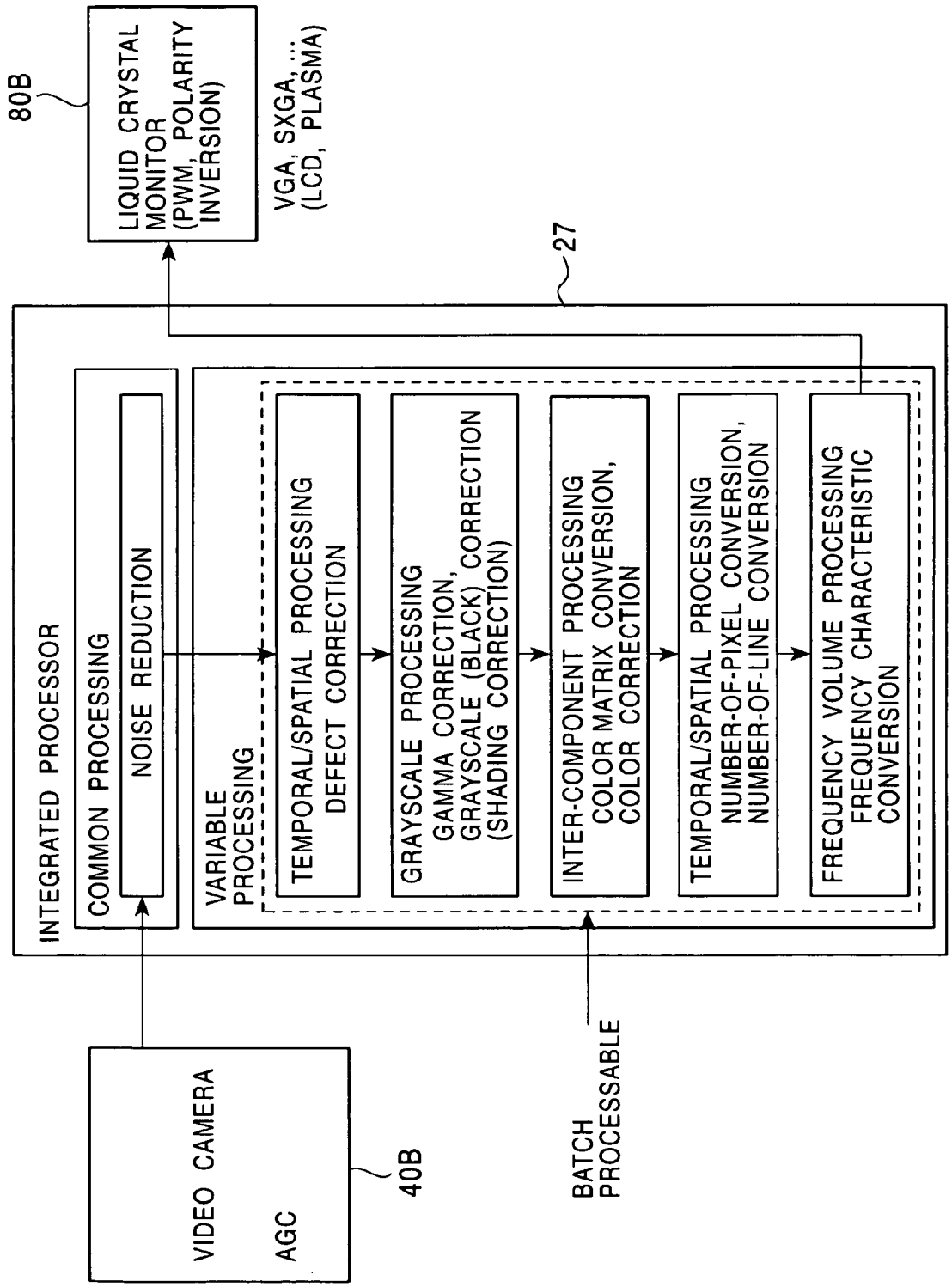
FIG. 25 illustrates processing performed by the integrated processing box 1 connected to the video camera 40B and a liquid crystal monitor 80B, both of which are unique devices.

FIG. 25 illustrates a video camera (unique device) 40B selected as an input device and a liquid crystal monitor (unique device) 80B selected as an output device connected to the integrated processing box 1. The video camera 40B may be formed such as that shown in FIG. 16, and the liquid crystal monitor 80B may be formed such as that shown in FIG. 23.

Image data output from the video camera 40B is supplied to the integrated processor 27. The common processing group 29 of the integrated processor 27 performs noise reduction processing on the image data. The variable processing group 28 performs the variable processing, such as defect correction, γ correction, grayscale correction, black level correction, shading, color matrix conversion, color correction, number-of-pixel conversion, number-of-line conversion, and frequency characteristic conversion on the image data to be suitable for the video camera 40B and the liquid crystal monitor 80B. The resulting image data is then supplied to the liquid crystal monitor 80B.

More specifically, the number-of-pixel conversion processing, the number-of-line conversion processing, and the frequency characteristic conversion processing are performed based on the number of pixels of the CCD of the video camera 40B, image standards of the liquid crystal monitor 80B (for example, VGA or SXGA), and the pulse width modulation (PWM) and the polarity inversion method used in a liquid crystal panel of the liquid crystal monitor 80B so that the image output from the video camera 40B can be suitably displayed on the liquid crystal monitor 80B.

In FIG. 25, the defect correction processing, the number-of-pixel conversion processing, and the number-of-line conversion processing are included in temporal-spatial processing. The γ correction processing, the grayscale correction processing, the black level correction processing, and the shading correction processing are included in grayscale processing. The color correction processing and the color matrix conversion processing are contained in inter-component processing. The frequency characteristic conversion processing is contained in frequency volume processing. As stated above, the temporal/spatial processing, the grayscale processing, the frequency volume processing, and the inter-component processing can all be performed by classification adaptive processing. Accordingly, the above-described processing can be individually performed by learning the corresponding prediction coefficients. Alternatively, prediction coefficients for performing all the types of processing are learned, and the processing can be simultaneously performed.

Although in the embodiment shown in FIG. 25 a liquid crystal monitor is used as the output device, another type of flat display monitor, such as a plasma display monitor, may be employed. In this manner, when the use of the types of flat display monitor is extended, the content of the variable processing varies according to whether the flat display monitor is a liquid crystal monitor or a plasma display monitor. For example, classification adaptive processing is performed by using different prediction coefficients.

In FIG. 25, the defect correction processing as the temporal/spatial processing corresponds to the processing performed by the defect correction circuit 45 shown in FIG. 15. The γ correction processing as the grayscale processing corresponds to the processing performed by the γ correction circuit 47 shown in FIG. 15. The grayscale correction processing and the black level correction processing as the grayscale processing correspond to the processing performed by the level conversion circuit 85 and the multi-leveling circuit 86 shown in FIG. 22. The color matrix conversion processing as the inter-component processing corresponds to the processing performed by the color matrix conversion circuit 49 shown in FIG. 15.

In the embodiment shown in FIG. 25, as in FIG. 21, the number-of-pixel conversion processing, and the number-of-line conversion processing as the temporal/spatial processing, and the frequency characteristic conversion processing as the frequency volume processing are not performed in regular devices. The integrated processor 27 effectively performs the above-described types of processing which are not performed in regular devices.

Figure 26:
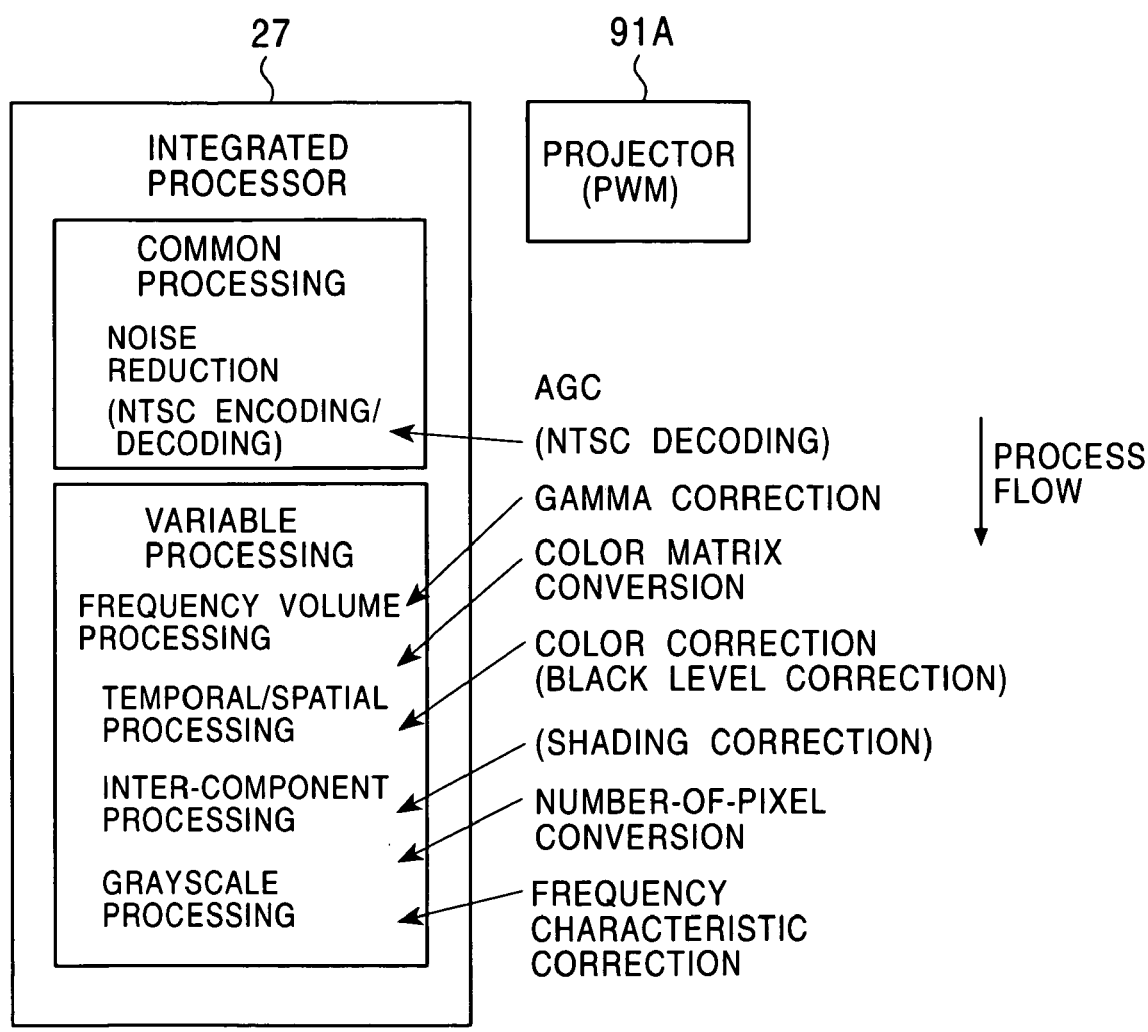
FIG. 26 illustrates the relationships between processing performed by a projector 91A, which is a regular device, and common processing and variable processing.

FIG. 26 illustrates the relationships between the operations performed by a projector (regular device), which serves as an output device, and the common processing and the variable processing performed by the integrated processor 27.

In a projector 91A (regular device), as in the liquid crystal monitor 80A (regular device) shown in FIG. 24, AGC processing, NTSC decoding processing, γ correction processing, color matrix conversion processing, color correction processing, black level correction processing, shading correction processing, number-of-pixel conversion processing, and frequency characteristic correction processing are performed.

Thus, in FIG. 26, as in FIG. 24, the NTSC decoding is common processing, while the γ correction processing, the color matrix conversion processing, the color correction processing, the black level correction processing, the shading correction processing, the number-of-pixel conversion processing, and the frequency characteristic correction processing are variable processing.

When the projector 91A (regular device) is connected to the integrated processing box 1 so as to supply image data to the projector 91A, the integrated processor 27 performs the following processing. The variable processing group 28 performs the variable processing, such as the γ correction, the color matrix conversion, the color correction, the black level correction, the shading correction, the number-of-pixel conversion, and the frequency characteristic correction, as required, while the common processing group 29 performs the common processing, such as the NTSC decoding, as required.

That is, the integrated processor 27 performs the variable processing and the common processing which are not executed by the projector 91A. Or, even among the variable processing and common processing executable by the projector 91A, the integrated processor 27 may perform the corresponding processing if it is able to perform it more effectively than the projector 91A.

Figure 27:
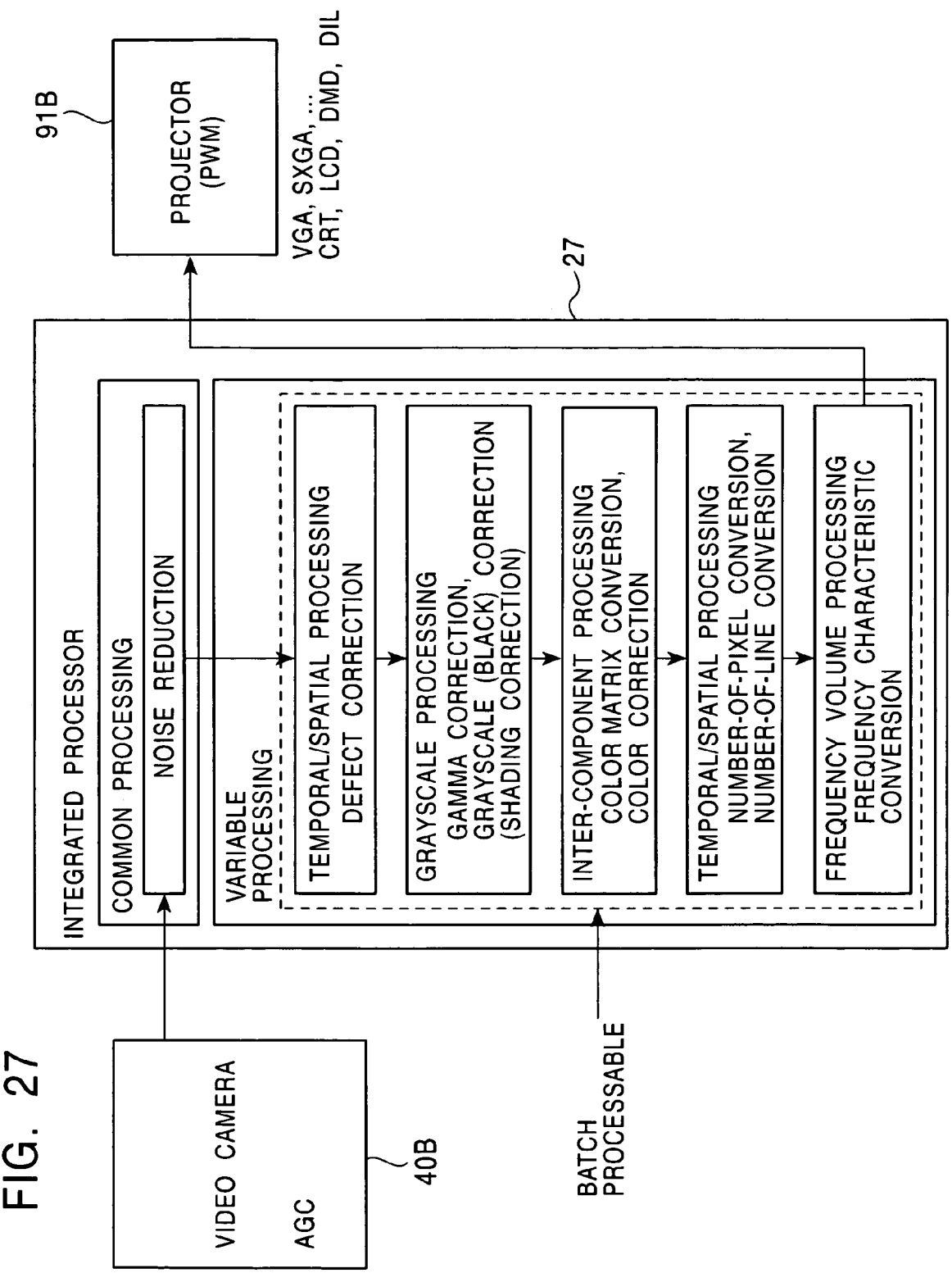
FIG. 27 illustrates processing performed by the integrated processing box 1 connected to the video camera 40B and a projector 91B, both of which are unique devices.

FIG. 27 illustrates the video camera (unique device) 40B selected as an input device and a liquid crystal monitor (unique device) 91B selected as an output device connected to the integrated processing box 1.

Image data output from the video camera 40B is supplied to the integrated processor 27. The common processing group 29 of the integrated processor 27 then performs noise reduction processing on the image data. The variable processing group 28 then performs the variable processing, such as defect correction, γ correction, grayscale correction, black level correction, shading, color matrix conversion, color correction, number-of-pixel conversion, number-of-line conversion, and frequency characteristic conversion on the image data to be suitable for the video camera 40B and the projector 91B. The resulting image data is then supplied to the projector 91B.

More specifically, the number-of-pixel conversion processing, the number-of-line conversion processing, and the frequency characteristic conversion processing are performed based on the number of pixels of the CCD of the video camera 40B, image standards of the projector 91B (for example, VGA or SXGA), the display method of the projector 91B (for example, the CRT method, liquid crystal panel (LCD) method, or digital light processing (DLP) method using a digital micromirror device (DMD) (DMD and DLP are trade names), or an image light amplifier (ILA) method), and the PWM method of the projector 91B so that the image output from the video camera 40B can be suitably displayed on the projector 91B.

In FIG. 27, as in FIG. 25, the defect correction processing, the number-of-pixel conversion processing, and the number-of-line conversion processing are included in temporal-spatial processing. The γ correction processing, the grayscale correction processing, the black level correction processing, and the shading correction processing are included in grayscale processing. The color correction processing and the color matrix conversion processing are included in inter-component processing. The frequency characteristic conversion processing is included in frequency volume processing. As stated above, the temporal/spatial processing, the grayscale processing, the frequency volume processing, and the inter-component processing can all be performed by classification adaptive processing.

Accordingly, the above-described processing can be individually performed by learning the corresponding prediction coefficients. Alternatively, prediction coefficients for performing all the types of processing are learned, and the processing can be simultaneously performed.

Figure 28:
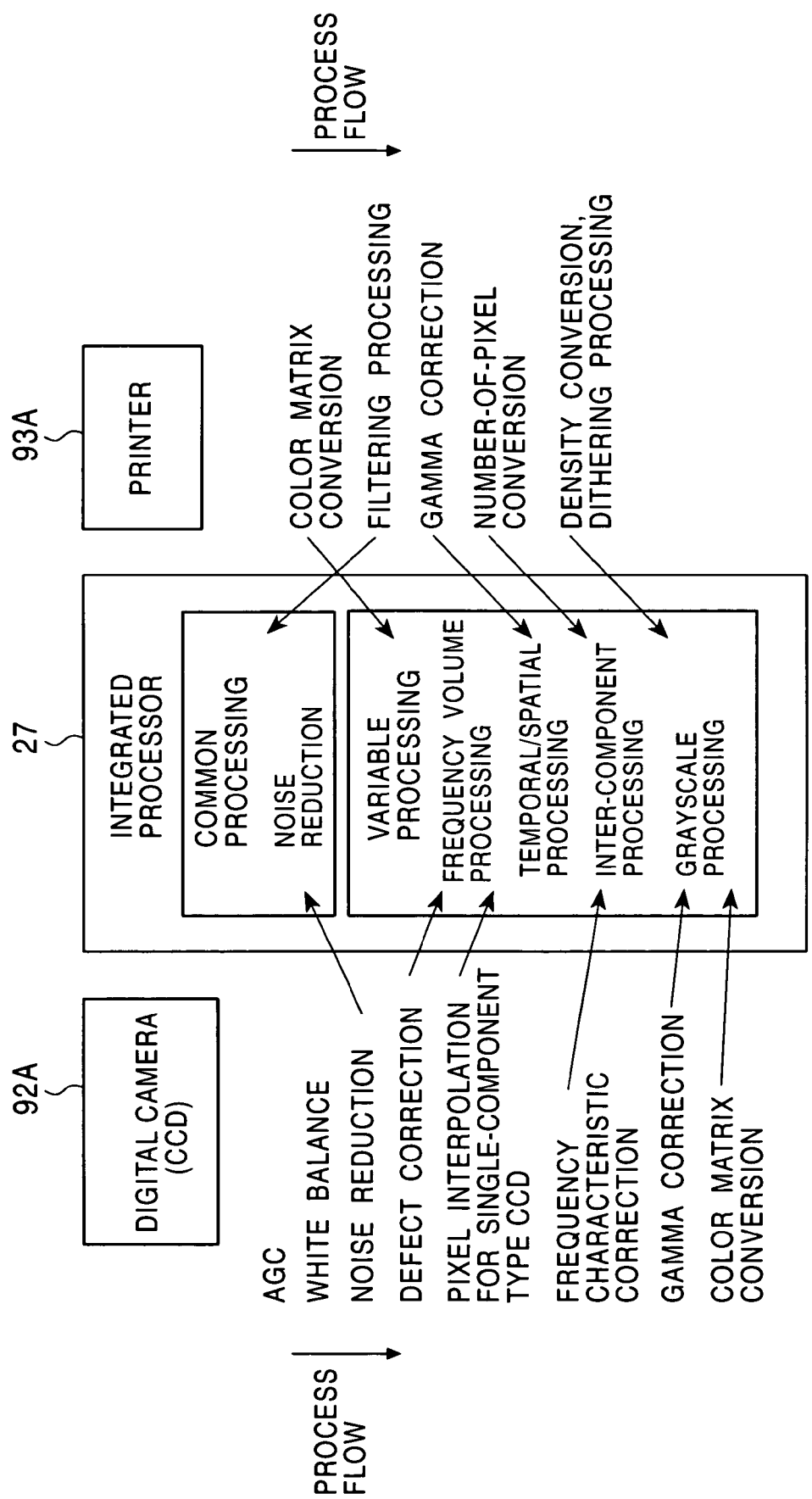
FIG. 28 illustrates the relationships between processing performed by a digital camera 92A or a printer 93A, which is a regular device, and common processing and variable processing.

FIG. 28 illustrates operations performed by a digital still camera (regular device) selected as an input device and by a printer (regular device) selected as an output device and common processing and variable processing performed by the integral processor 27.

In a digital camera 92A (regular device), AGC processing, WB processing, noise reduction processing, defect correction processing, pixel interpolation processing, frequency characteristic correction processing, γ correction processing, and color matrix conversion processing are performed. The digital camera 92A is basically configured similarly to the video camera (regular device) shown in FIG. 15.

In FIG. 28, among the operations performed by the digital camera 92A, the noise reduction processing is generally independent of whether the input device is the digital camera 92A, and is thus common processing. In contrast, the defect correction processing, the pixel interpolation processing, the frequency characteristic correction processing, the γ correction processing, and the color matrix conversion processing are dependent on whether the input device is the digital camera 92A, and are thus variable processing.

When the digital camera 92A (regular device) is connected to the integrated processing box 1 (FIG. 1) so as to receive image data from the digital camera 92A, the integrated processor 27 performs the following processing. The variable processing group 28 performs variable processing, such as the defect correction, the pixel interpolation, the frequency characteristic correction, the γ correction, and the color matrix conversion, on the image data as required. The common processing group 29 performs common processing, such as the noise reduction, as required.

That is, the integrated processor 27 performs the variable processing and common processing which are not executed by the digital camera 92A. Or, even among the variable processing and common processing executable by the digital camera 92A, the integrated processor 27 may perform the corresponding processing if it is able to perform it more effectively than the digital camera 92A.

In the printer 93A (regular device), color matrix conversion processing, filtering processing for noise reduction, γ correction processing, number-of-pixel conversion processing, density conversion processing, and dithering processing are performed.

In FIG. 28, among the operations performed by the printer 93A, the filtering processing is generally independent of whether the output device is the printer 93A, and is thus common processing. In contrast, the color matrix conversion processing, the γ correction processing, the number-of-pixel conversion processing, the density conversion processing, and the dithering processing are dependent on whether the output device is the printer 93A, and are thus variable processing.

When the printer 93A (regular device) is connected to the integrated processing box 1 (FIG. 1) so as to supply image data to the printer 93A, the integrated processor 27 performs the following processing. The variable processing group 28 performs variable processing, such as the color matrix conversion, the γ correction, the number-of-pixel conversion, the density conversion, and the dithering processing, on the image data as required. The common processing group 29 performs common processing, such as the filtering processing, as required.

That is, the integrated processor 27 performs the variable processing and common processing which are not executed by the printer 93A. Or, even among the variable processing and common processing executable by the printer 93A, the integrated processor 27 may perform the corresponding processing if it is able to perform it more effectively than the printer 93A.

Figure 29:
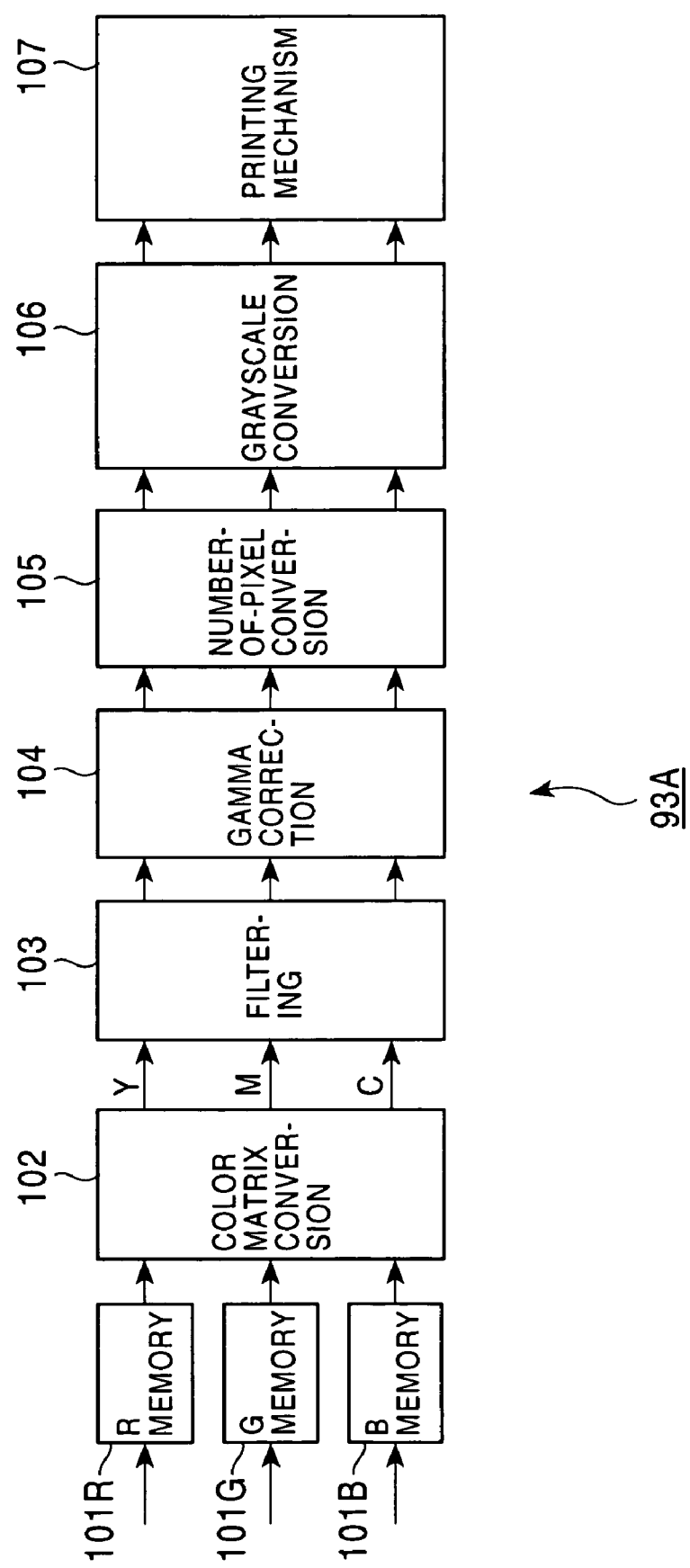
FIG. 29 is a block diagram illustrating an example of the configuration of the printer 93A.

FIG. 29 illustrates an example of the configuration of the printer 93A shown in FIG. 28.

R, G, and B components forming image data to be printed is externally supplied to the printer 93A. The R components, the G components, and the B components are stored in an R memory 101R, a G memory 101G, and a B memory 101B, respectively.

A color matrix conversion circuit 102 reads the R, G, and B components from the R memory 101R, the G memory 101G, and the B memory 101B, respectively. The color matrix conversion circuit 102 then performs color matrix conversion processing on the R, G, and B components, thereby converting the R, G, and B components into image data including Y, M, and C components. Alternatively, the image data including the R, G, and B components may be converted into Y, M, C and black (K) components.

Then, the Y, M, and C components are supplied to a filter 103. The filter 103 performs filtering processing on the Y, M, and C components for reducing noise, and supplies them to a γ correction circuit 104. The γ correction circuit 104 performs γ correction on the image data from the filter 103, and supplies it to a number-of-pixel conversion circuit 105. The number-of-pixel conversion circuit 105 converts the number of pixels of the image data from the γ correction circuit 104 to be suitable for the printer 93A, and then supplies the converted image data to a grayscale conversion circuit 106. The grayscale conversion circuit 106 performs grayscale conversion processing, such as density conversion processing and dithering processing, on the image data from the number-of-pixel conversion circuit 105, and supplies the resulting image data to a printing mechanism 107. The printing mechanism 107 prints the image on a predetermined sheet according to the image data supplied from the grayscale conversion circuit 106.

Figure 30:
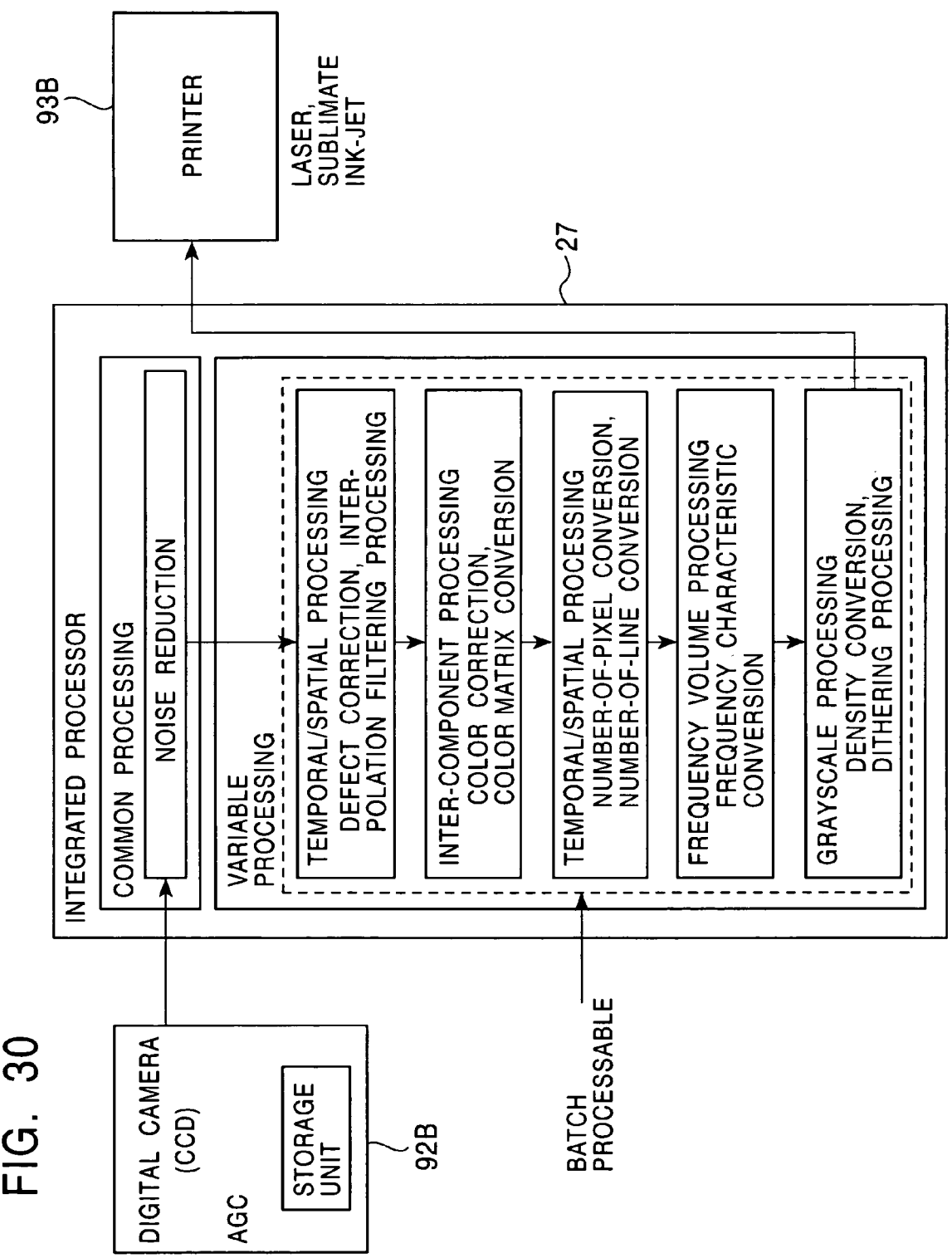
FIG. 30 illustrates processing performed by the integrated processing box 1 connected to a digital camera 92B and a printer 93B, both of which are unique devices.

FIG. 30 illustrates a digital camera (unique device) 92B selected as an input device and a printer (unique device) 93B selected as an output device connected to the integrated processing box 1.

Image data output from the digital camera 92B is supplied to the integrated processor 27. The common processing group 29 of the integrated processor 27 then performs common processing, such as noise reduction processing, on the image data. The variable processing group 28 performs the variable processing, such as defect correction and interpolation filtering as temporal/spatial processing, color correction and color matrix conversion as inter-component processing, number-of-pixel conversion and number-of-line conversion as temporal/spatial processing, frequency characteristic conversion as frequency volume processing, and density conversion and dithering processing as grayscale processing, on the image data to be suitable for the digital camera 92B and the printer 93B. The resulting image data is then supplied to the printer 93B.

More specifically, the number-of-pixel conversion processing, the number-of-line conversion processing, and the frequency characteristic conversion processing are performed based on the number of pixels of the CCD of the digital camera 92B, and the printing method used in the printer 93B (for example, the laser method, sublimate method, or ink-jet method) so that the image output from the digital camera 92B can be suitably printed by the printer 93B.

In FIG. 30, as in FIG. 25, the temporal/spatial processing, the grayscale processing, the frequency volume processing, and the inter-component processing can all be performed by classification adaptive processing. Accordingly, the above-described processing can be individually performed by learning the corresponding prediction coefficients. Alternatively, prediction coefficients for performing all the types of processing are learned, and the processing can be simultaneously performed.

In FIG. 30, the noise reduction processing as the common processing corresponds to the processing performed by the filter 103 shown in FIG. 29. The defect correction processing as the temporal/spatial processing corresponds to the processing performed by the defect correction circuit 45 shown in FIG. 15. The interpolation filtering processing as the temporal/spatial processing corresponds to the processing performed by the pixel interpolation circuit 48 shown in FIG. 15. The color correction processing as the inter-component processing corresponds to the processing performed by the WB circuit 46 shown in FIG. 15 and the filter 103 shown in FIG. 29. The color matrix conversion processing as the inter-component processing corresponds to the processing performed by the color matrix conversion circuit 49 shown in FIG. 15 and the color matrix conversion circuit 102 shown in FIG. 29. The number-of-pixel conversion processing and the number-of-line conversion processing as the temporal/spatial processing correspond to the processing performed by the number-of-pixel conversion processing circuit 105 shown in FIG. 29. The density conversion processing as the grayscale processing corresponds to the processing performed by the γ correction circuits 47 and 104 shown in FIGS. 15 and 29, respectively. The dithering processing as the grayscale processing corresponds to the processing performed by the grayscale conversion processing 106 shown in FIG. 29.

In FIG. 30, as in FIG. 21, the frequency characteristic conversion processing as the frequency volume processing is not performed in regular devices. The integrated processor 27 effectively performs the above-described processing which is not performed in regular devices.

Figure 31:
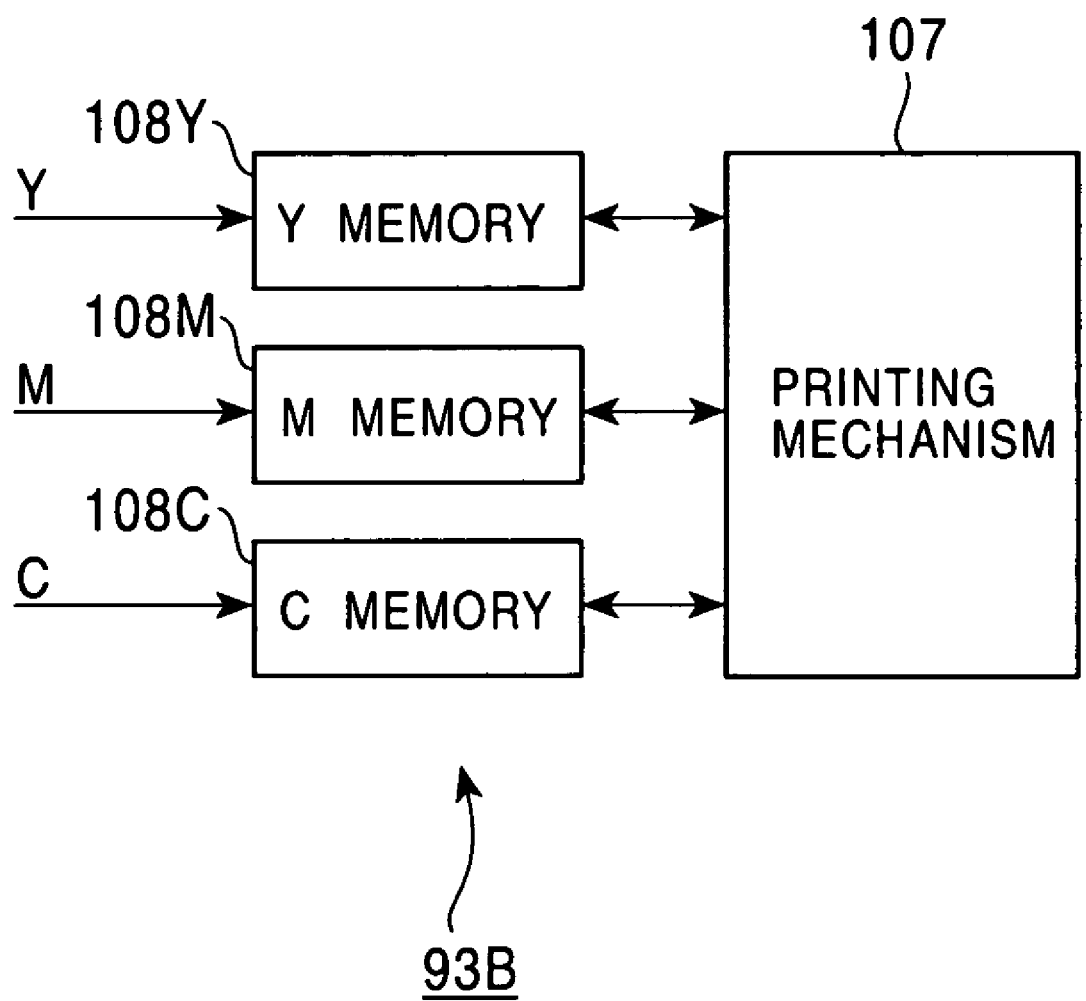
FIG. 31 is a block diagram illustrating an example of the configuration of the printer 93B.

FIG. 31 illustrates an example of the configuration of the printer 93B shown in FIG. 30. The same elements as those shown in FIG. 30 are represented by like reference numerals, and an explanation thereof will thus be omitted.

After the integrated processor 27 performs the processing discussed with reference to FIG. 30, Y, M, and C components forming image data are supplied to the printer 93B. The Y components, the M components, and the C components are stored in a Y memory 108Y, an M memory 108M, and a C memory 108C, respectively. The printing mechanism 107 then reads the Y, M, and C components from the Y memory 108Y, the M memory 108M, and the C memory 108C, respectively, and prints a corresponding image on a predetermined sheet according to the Y, M, and C components.

Since the common processing and the variable processing are performed by the integrated processor 27, the printer 93B can be formed without blocks performing such processing. That is, it is possible to form the printer 93B, as shown in FIG. 31, without the color matrix conversion circuit 102, the filtering circuit 103, the γ correction circuit 104, the number-of-pixel conversion circuit 105, and the grayscale conversion circuit 106 shown in FIG. 29.

Figure 32:
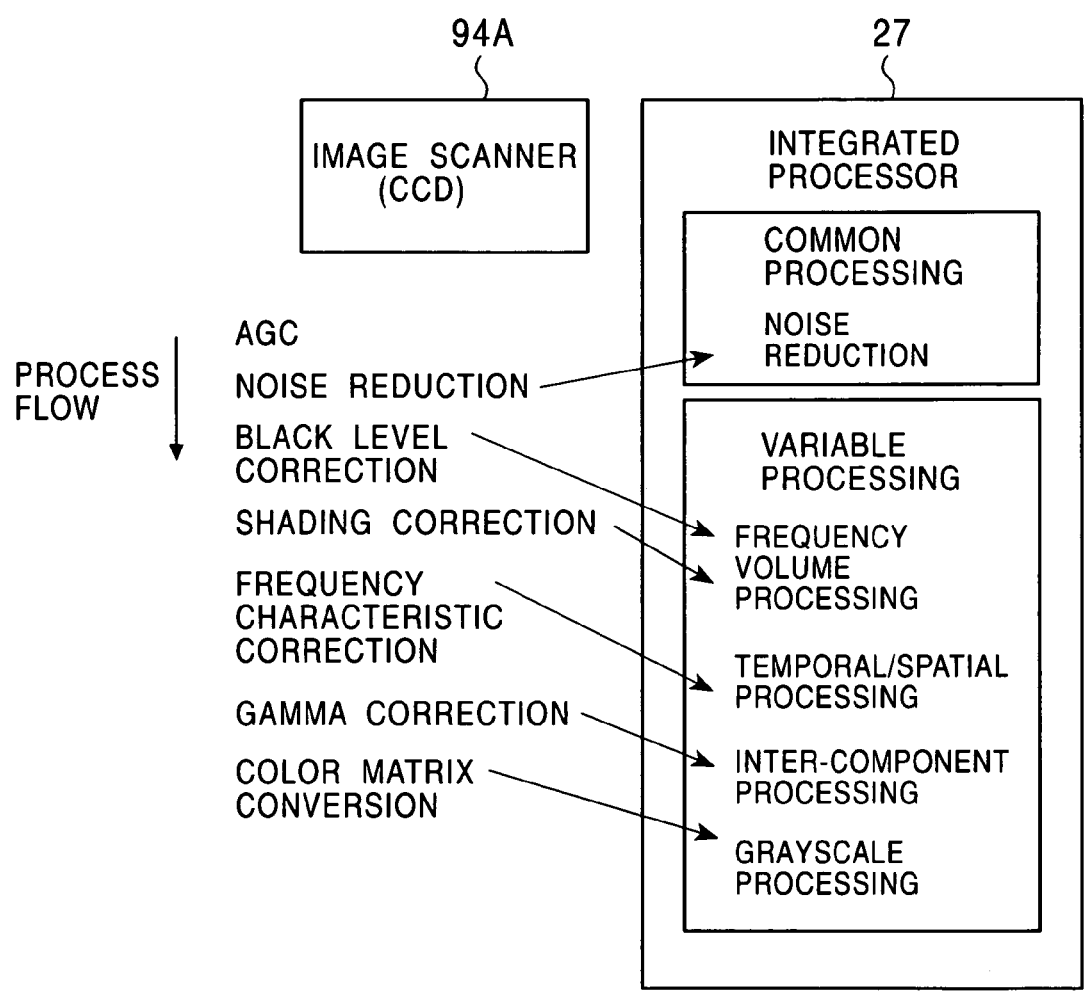
FIG. 32 illustrates the relationships between processing performed by an image scanner 94A, which is a regular device, and common processing and variable processing.

FIG. 32 illustrates the relationships between the operations performed by an image scanner (regular device), which serves as an input device, and the common processing and the variable processing performed by the integrated processor 27.

In an image scanner 94A (regular device), AGC processing, noise reduction processing, black level correction processing, shading processing, frequency characteristic correction processing, γ correction processing, color matrix conversion processing are performed.

In FIG. 32, among the operations performed by the image scanner 94A, the noise reduction processing is generally independent of whether the input device is the image scanner 94A, and is thus common processing. Conversely, the black level correction processing, the shading processing, the frequency characteristic correction processing, the γ correction processing, and the color matrix conversion processing are dependent on whether the input device is the image scanner 94A, and are thus variable processing.

When the image scanner 94A (regular device) is connected to the integrated processing box 1 so as to receive image data from the image scanner 94A, the integrated processor 27 performs the following processing. The variable processing group 28 performs the variable processing, such as the black level correction processing, the shading processing, the frequency characteristic correction processing, the γ correction processing, and the color matrix conversion processing, on the image data as required, while the common processing group 29 performs the common processing, such as the noise reduction processing, on the image data as required.

That is, the integrated processor 27 performs the variable processing and common processing which are not executed by the image scanner 94A. Or, even among the variable processing and common processing executable by the image scanner 94A, the integrated processor 27 may perform the corresponding processing if it is able to perform it more effectively than the image scanner 94A.

Figure 33:
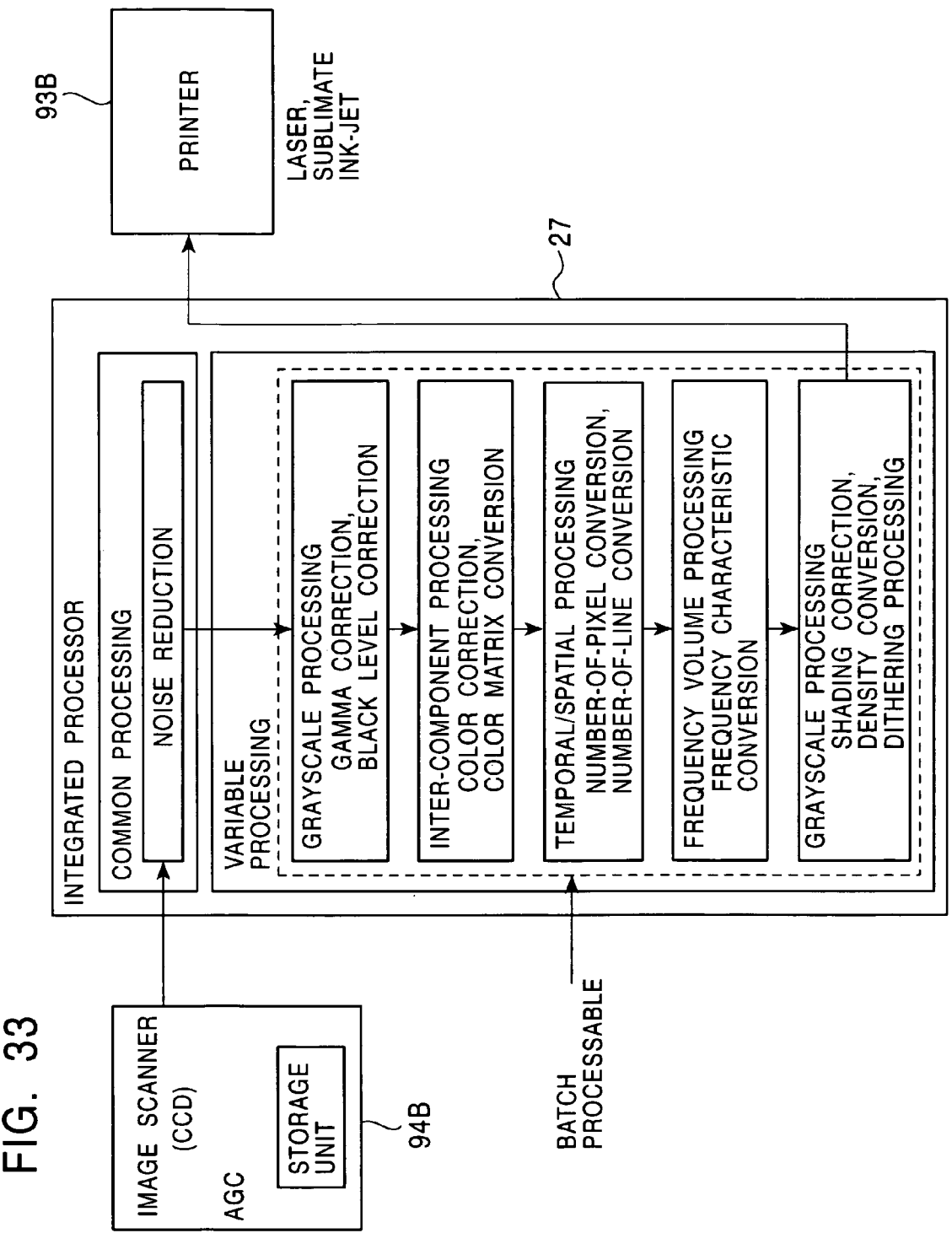
FIG. 33 illustrates processing performed by the integrated processing box 1 connected to an image scanner 94B and the printer 93B, both of which are unique devices.

FIG. 33 illustrates an image scanner (unique device) 94B selected as an input device and the printer (unique device) 93B selected as an output device connected to the integrated processing box 1.

Image data output from the image scanner 94B is supplied to the integrated processor 27. The common processing group 29 of the integrated processor 27 then performs common processing, such as noise reduction processing, on the image data. The variable processing group 28 then performs the variable processing, such as γ correction processing and black level correction processing as grayscale processing, color correction processing and color matrix conversion processing as inter-component processing, number-of-pixel conversion processing and number-of-line conversion processing as temporal/spatial processing, frequency characteristic conversion processing as frequency volume processing, and shading processing, density conversion processing, and dithering processing as grayscale processing, on the image data to be suitable for the image scanner 94B and the printer 93B. The resulting image data is then supplied to the printer 93B.

More specifically, the number-of-pixel conversion processing, the number-of-line conversion processing, and the frequency characteristic conversion processing are performed based on the number of pixels of the CCD of the image scanner 94B and the printing method used in the printer 93B so that the image output from the image scanner 94B can be suitably printed by the printer 93B.

In FIG. 33, as in FIG. 25, the temporal/spatial processing, the grayscale processing, the frequency volume processing, and the inter-component processing can all be performed by classification adaptive processing. Accordingly, the above-described processing can be individually performed by learning the corresponding prediction coefficients. Alternatively, prediction coefficients for performing all the types of processing are learned, and the processing can be simultaneously performed.

In FIG. 33, the black level correction processing and the shading correction processing correspond to the variable processing performed by an image scanner (regular device).

Figure 34:
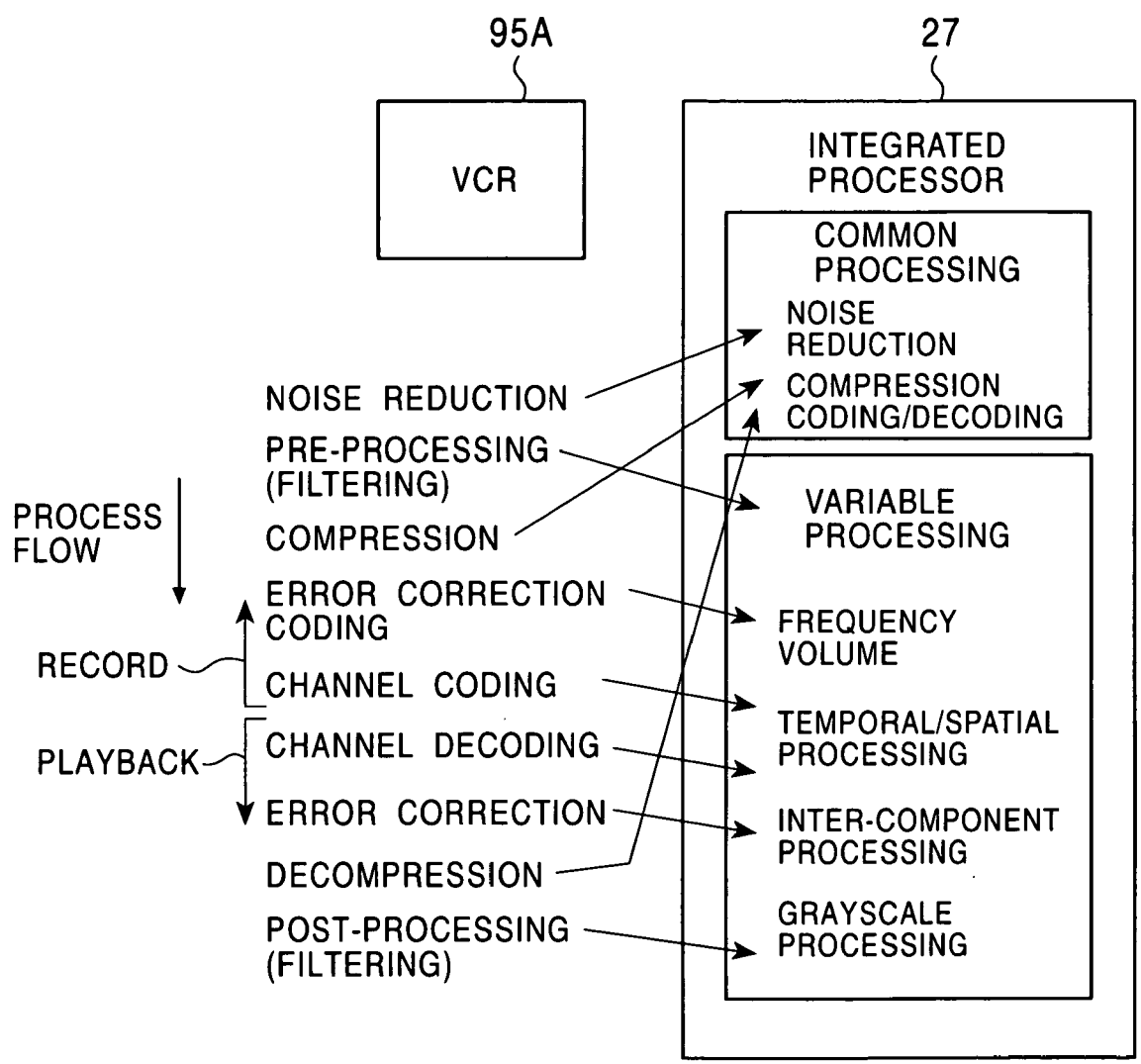
FIG. 34 illustrates the relationships between processing performed by a VCR 95A, which is a regular device, and common processing and variable processing.

FIG. 34 illustrates the relationships between operations performed by a VCR (regular device) selected as a storage device and the common processing and the variable processing performed by the integrated processor 27.

In a VCR 95A (regular device), when a recording (writing) operation is performed, noise reduction processing, pre-processing (filtering processing), MPEG compression processing, error correction coding processing, and channel coding processing are performed. When a playback (reading) operation is performed, channel decoding processing, error correction processing, decompression processing (for example, MPEG decoding processing), and post-processing (filtering processing) are performed.

In FIG. 34, among the operations performed by the VCR 95A, the noise reduction processing, and the MPEG compression and decompression processing are generally independent of whether the storage device is the VCR 95A, and are thus common processing. In contrast, the pre-processing, the error correction coding processing, the channel coding and decoding processing, the error correcting processing, and the post-processing are dependent on whether the storage device is the VCR 95A, and are thus variable processing.

When the VCR 95A is connected to the integrated processing box 1 so as to supply (record) image data to (on) the VCR 95A, the integrated processor 27 performs the following processing. More specifically, when image data is supplied to (recorded on) the VCR 95A, the variable processing group 28 performs variable processing, such as the pre-processing, and the error correction coding processing, the channel coding processing, on the image data as required, while the common processing group 29 performs common processing, such as the noise reduction processing and the compression processing, on the image data as required. When image data is played back (read) from the VCR 95A, the variable processing group 28 performs variable processing, such as the channel decoding processing, the error correction processing, and the post-processing, on the image data as required, while the common processing group 29 performs common processing, such as the noise reduction processing and the decompression processing, on the image data as required.

That is, the integrated processor 27 performs the variable processing and common processing which are not executed by the VCR 95A. Or, even among the variable processing and common processing executable by the VCR 95A, the integrated processor 27 may perform the corresponding processing if it is able to perform it more effectively than the VCR 95A.

Figure 35:
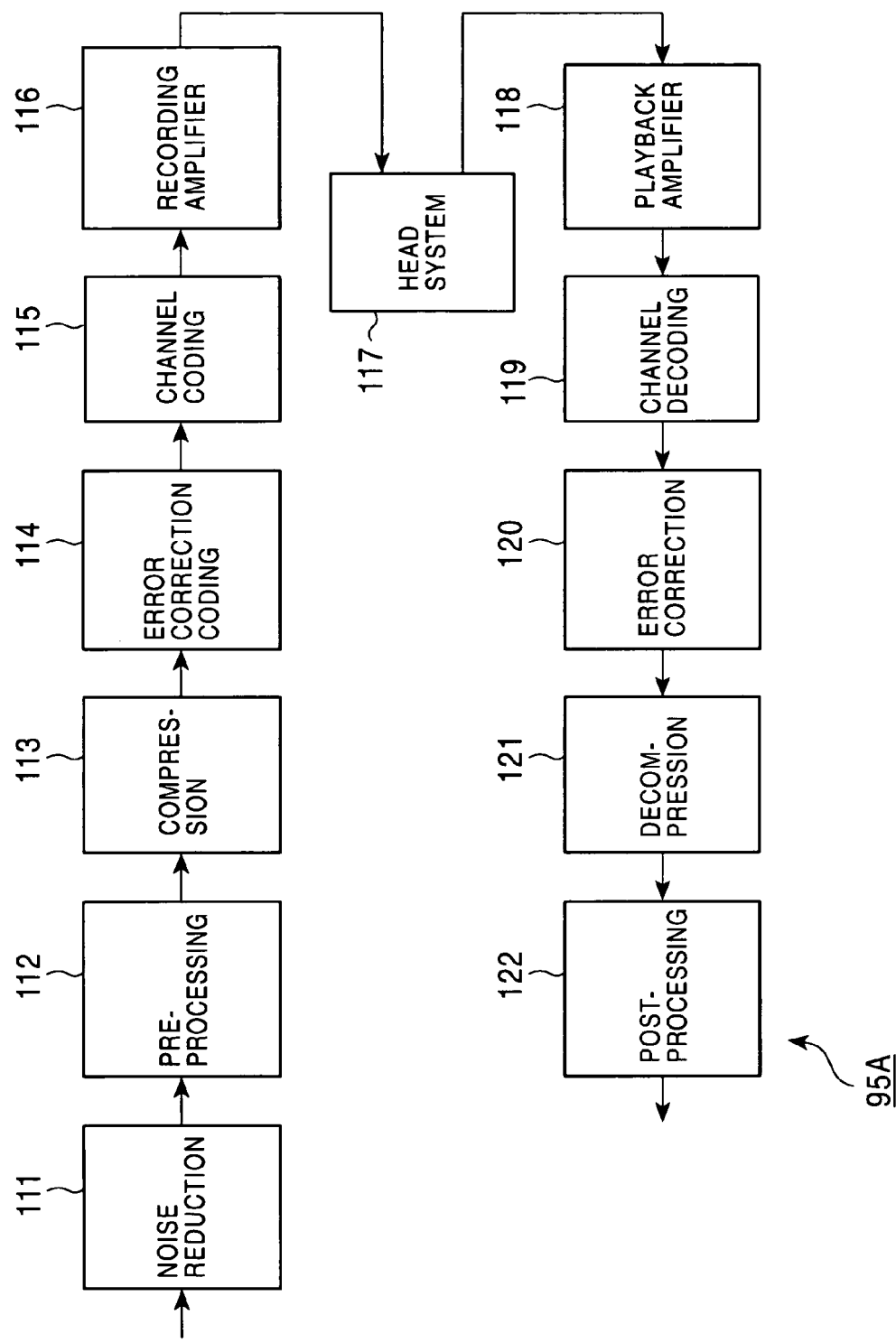
FIG. 35 is a block diagram illustrating an example of the configuration of the VCR 95A.

FIG. 35 illustrates an example of the configuration of the VCR 95A shown in FIG. 34.

In the recording operation, image data is supplied to a noise reduction circuit 111. The noise reduction circuit 111 reduces noise contained in the image data, and supplies the resulting image data to a pre-processing circuit 112. The pre-processing circuit 112 performs pre-processing on the image data supplied from the noise reduction circuit 111, and supplies it to a compression circuit 113. The compression circuit 113 performs MPEG coding on the image data from the pre-processing circuit 112, and supplies the compressed image data to an error correction coding circuit 114. The error correction coding circuit 114 calculates an error correction code and adds it to the output from the compression circuit 113, thereby outputting the resulting data to a channel coding circuit 115. The channel coding circuit 115 performs channel coding on the output from the error correction coding circuit 114, and supplies the resulting output to a recording amplifier 116. The recording amplifier 116 amplifies the output from the channel coding circuit 115, and supplies it to a head system 117 as a recording signal. The head system 117 then records the data on a recording medium, such as a video tape, according to the recording signal from the recording amplifier 116.

In the playback operation, the head system 117 plays back data from a recording medium, such as a video tape, and supplies it to a playback amplifier 118. The playback amplifier 118 amplifies the data output from the head system 117, and supplies it to a channel decoding circuit 119. The channel decoding circuit 119 performs channel decoding on the data from the playback amplifier 118, and supplies the resulting data to an error correction circuit 120. The error correcting circuit 120 checks for an error contained in the channel decoded data and, if any, corrects such an error, and then supplies the resulting data to a decompression circuit 121. The decompression circuit 121 decompresses the output from the error correction circuit 120 so as to decode it to the original image data. The original image data is then supplied to a post-processing circuit 122. The post-processing circuit 122 performs post-processing on the image data output from the decompression circuit 121.

Figure 36:
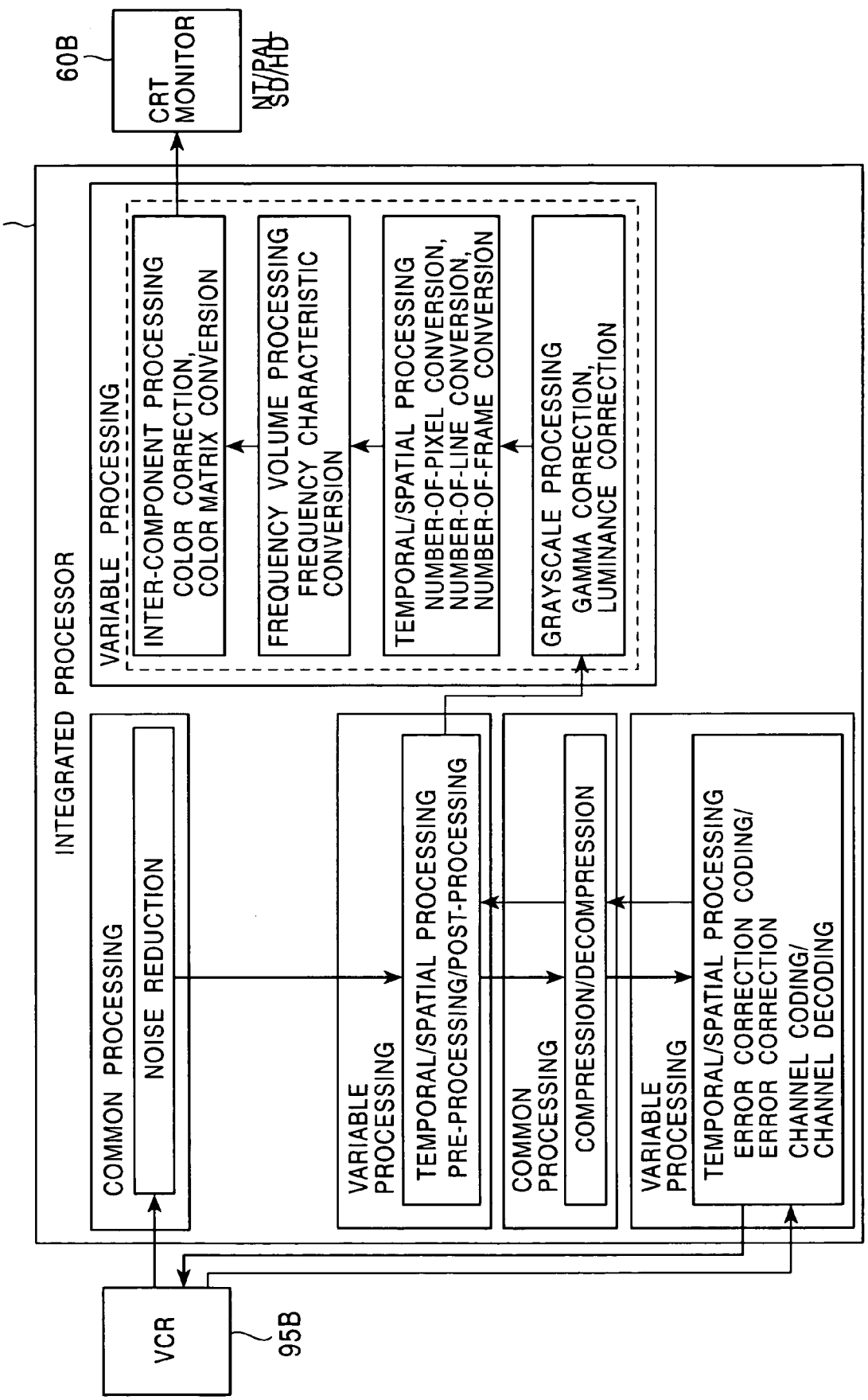
FIG. 36 illustrates processing performed by the integrated processing box 1 connected to a VCR 95B and a CRT monitor 60B, both of which are unique devices.

FIG. 36 illustrates a VCR 95B (unique device) selected as a storage device and the CRT monitor 60B (unique device) selected as an output device connected to the integrated processing box 1.

The VCR 95B is integrally formed with, for example, a video camera (unique device). In recording images, image data captured by the video camera is supplied to the integrated processor 27, as indicated by the thick lines in FIG. 36. In this case, the common processing group 29 performs noise reduction processing on the image data, and the variable processing group 28 performs the pre-processing as temporal/spatial processing on the image data to be suitable for the VCR 95B. Subsequently, the common processing group 29 performs the compression processing on the image data, and the variable processing group 28 performs the error correction coding processing and the channel coding processing as temporal/spatial processing to be suitable for the VCR 95B. The resulting image data is then supplied to and recorded in the VCR 95B.

When images are played back, playback data read from the VCR 95B is supplied to the integrated processor 27, as indicated by the thin lines in FIG. 36. More specifically, the variable processing group 28 performs channel decoding processing and error correction processing as temporal/spatial processing on the playback data to be suitable for the VCR 95B, and the common processing group 29 performs decompression processing on the error-corrected playback data, thereby decoding the playback data into image data. Subsequently, the variable processing group 28 performs pre-processing as temporal/spatial processing on the decompressed image data to be suitable for the VCR 95B, and then performs γ correction processing and luminance correction processing as grayscale processing, number-of-pixel conversion processing, number-of-line conversion processing, and number-of-frame conversion processing as temporal/spatial processing, frequency characteristic conversion processing as frequency volume processing, and color correction processing and color matrix conversion processing as inter-component processing, on the pre-processed image data to be suitable for the CRT monitor 60B. As a result, the image is supplied to and displayed on the CRT monitor 60B.

In FIG. 36, as in FIG. 25, the temporal/spatial processing, the grayscale processing, the frequency volume processing, and the inter-component processing, performed during the image playback operation, can all be performed by classification adaptive processing. Accordingly, the above-described processing can be individually performed by learning the corresponding prediction coefficients. Alternatively, prediction coefficients for performing all the types of processing are learned, and the processing can be simultaneously performed.

In FIG. 36, the noise reduction processing as the common processing corresponds to the processing performed by the noise reduction circuit 111 shown in FIG. 35. The pre-processing as the temporal/spatial processing corresponds to the processing performed by the pre-processing circuit 112 shown in FIG. 35, while the post-processing as the temporal/spatial processing corresponds to the processing performed by the post-processing circuit 122 shown in FIG. 35. The compression processing as the common processing corresponds to the processing performed by the compression circuit 113 sown in FIG. 35, while the decompression processing as the common processing corresponds to the processing performed by the decompression circuit 121 shown in FIG. 35. The error correction coding processing as the temporal/spatial processing corresponds to the processing performed by the error correction coding circuit 114 shown in FIG. 35, while the error correction coding processing as the temporal/spatial processing corresponds to the processing performed by the error correction circuit 120 shown in FIG. 35. The channel coding processing as the temporal/spatial processing corresponds to the processing performed by the channel coding circuit 115 shown in FIG. 35, while the channel decoding processing as the temporal/spatial processing corresponds to the processing performed by the channel decoding circuit 119 shown in FIG. 35. The color correction processing as the inter-component processing corresponds to the color adjusting circuit 74 shown in FIG. 18, while the color matrix conversion processing as the inter-component processing corresponds to the processing performed by the color matrix conversion circuit 70 shown in FIG. 18. The γ correction processing as the grayscale processing corresponds to the processing performed by the luminance correction circuit 68 shown in FIG. 18, while the luminance correction processing as the grayscale processing corresponds to the processing performed by the contrast adjusting circuit 67 and the luminance correction circuit 68 shown in FIG. 18.

Figure 37:
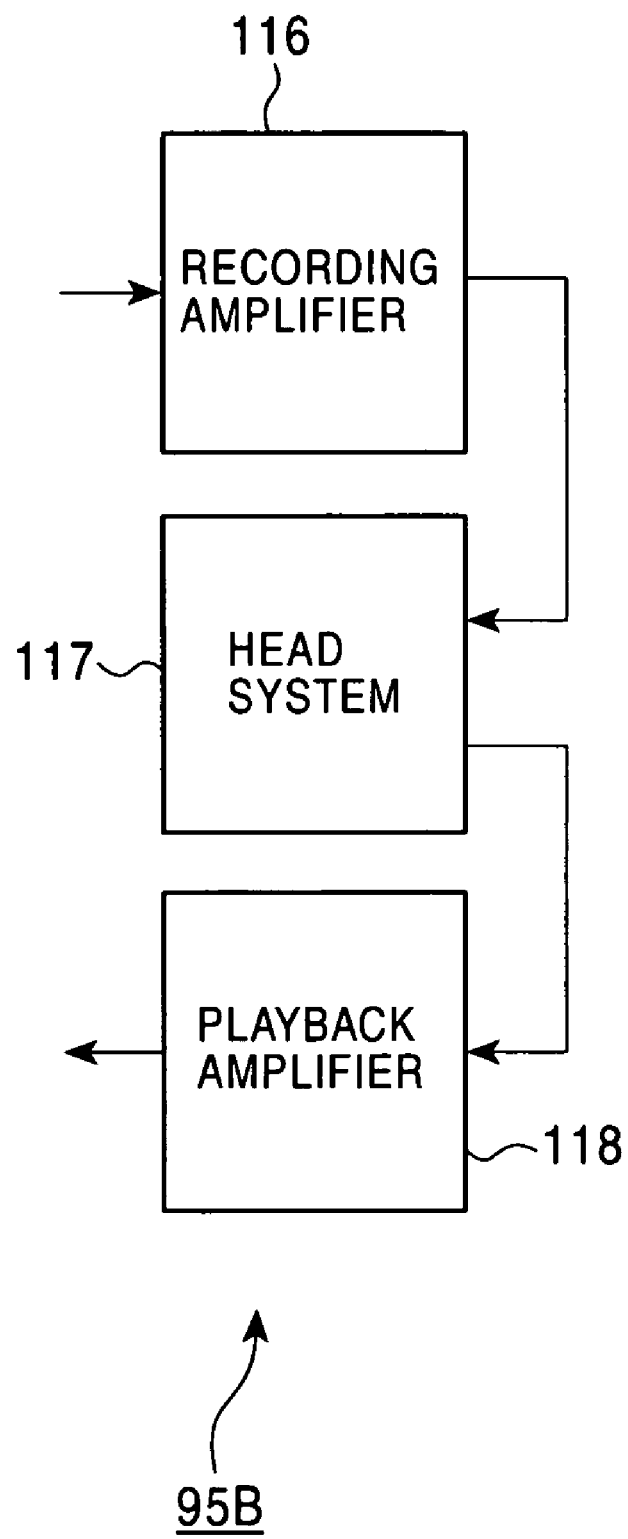
FIG. 37 is a block diagram illustrating an example of the configuration of the VCR 95B.

FIG. 37 illustrates an example of the configuration of the VCR 95B shown in FIG. 36. The same elements as those shown in FIG. 35 are designated with like reference numerals, and an explanation thereof will thus be omitted.

Since the common processing and the variable processing are performed by the integrated processor 27, the VCR 95B can be formed without blocks performing such processing.

That is, it is possible to form the VCR 95B, as shown in FIG. 37, without the noise reduction circuit 111, the pre-processing circuit 112, the compression circuit 113, the error correction coding circuit 114, the channel coding circuit 115, the channel decoding circuit 119, the error correction circuit 120, the decompression circuit 121, and the post-processing circuit 122.

Figure 38:
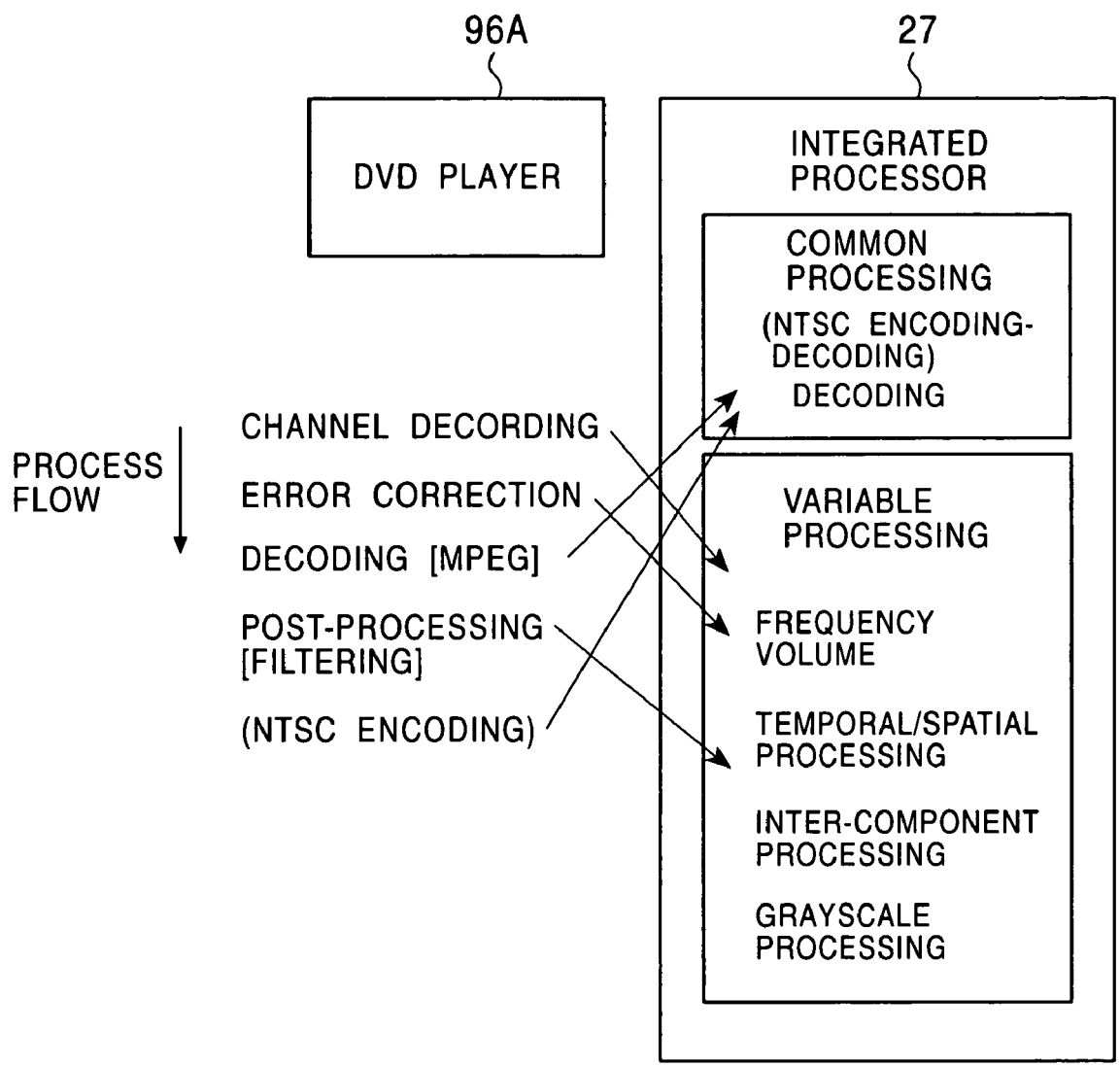
FIG. 38 illustrates the relationships between processing performed by a DVD player 96A, which is a regular device, and common processing and variable processing.

FIG. 38 illustrates the relationships between the operations performed by a DVD player (regular device) selected as a storage device and the common processing and the variable processing performed by the integrated processor 27.

In a DVD player 96A (regular device), channel decoding processing, error correction processing, MPEG decoding processing, post-processing (filtering processing), and NTSC encoding processing are performed.

In FIG. 38, among the operations performed by the DVD player 96A, the NTSC encoding processing and the MPEG decoding processing are independent of whether the storage device is the DVD player 96A, and are thus common processing. On the other hand, the channel decoding processing, the error correction processing, and the post-processing (filtering processing) are dependent on whether the storage device is the DVD player 96A, and are thus variable processing.

When the DVD player 96A is connected to the integrated processing box 1, and when image data is played back from the DVD player 96A and is supplied to the integrated processing box 1, the integrated processor 27 performs the following processing. The variable processing group 28 performs the channel decoding processing, the error correction processing, and the post-processing as required, and the common processing group 29 performs the decoding processing and the NTSC encoding processing as required.

That is, the integrated processor 27 performs the variable processing and common processing which are not executed by the DVD player 96A. Or, even among the variable processing and common processing executable by the DVD player 96A, the integrated processor 27 may perform the corresponding processing if it is able to perform it more effectively than the DVD player 96A.

Figure 39:
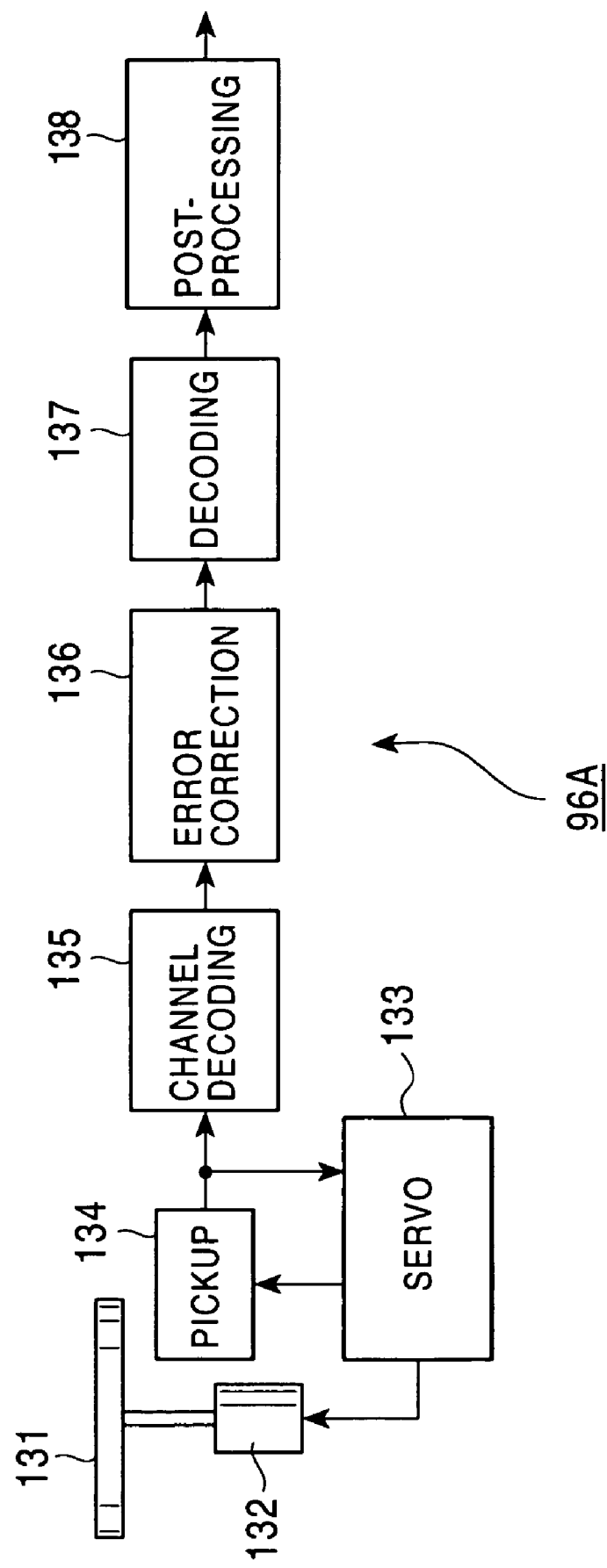
FIG. 39 is a block diagram illustrating an example of the configuration of the DVD player 96A.

FIG. 39 illustrates an example of the configuration of the DVD player 96A (regular device) shown in FIG. 38.

A DVD 131 is rotated by a spindle motor 132. A pickup 134 applies a light beam to the DVD 131, and receives light reflected by the DVD 131. The pickup 134 also supplies a playback signal indicating the amount of received light to a servo circuit 133 and a channel decoding circuit 135. The servo circuit 133 controls the spindle motor 132 and the pickup 134 based on the playback signal from the pickup 134.

The channel decoding circuit 135 performs channel decoding on the playback signal from the pickup 134, and supplies it to an error correction circuit 136. The error correction circuit 136 performs error correction on the output signal supplied from the channel decoding circuit 135 based on an error correcting code contained in the output signal, and supplies the resulting signal to a decoding circuit 137. The decoding circuit 137 performs MPEG decoding on the output from the error correction circuit 136, and supplies it to a post-processing circuit 138. The post-processing circuit 138 performs post-processing on the MPEG-decoded image data, and outputs the resulting image.

Figure 40:
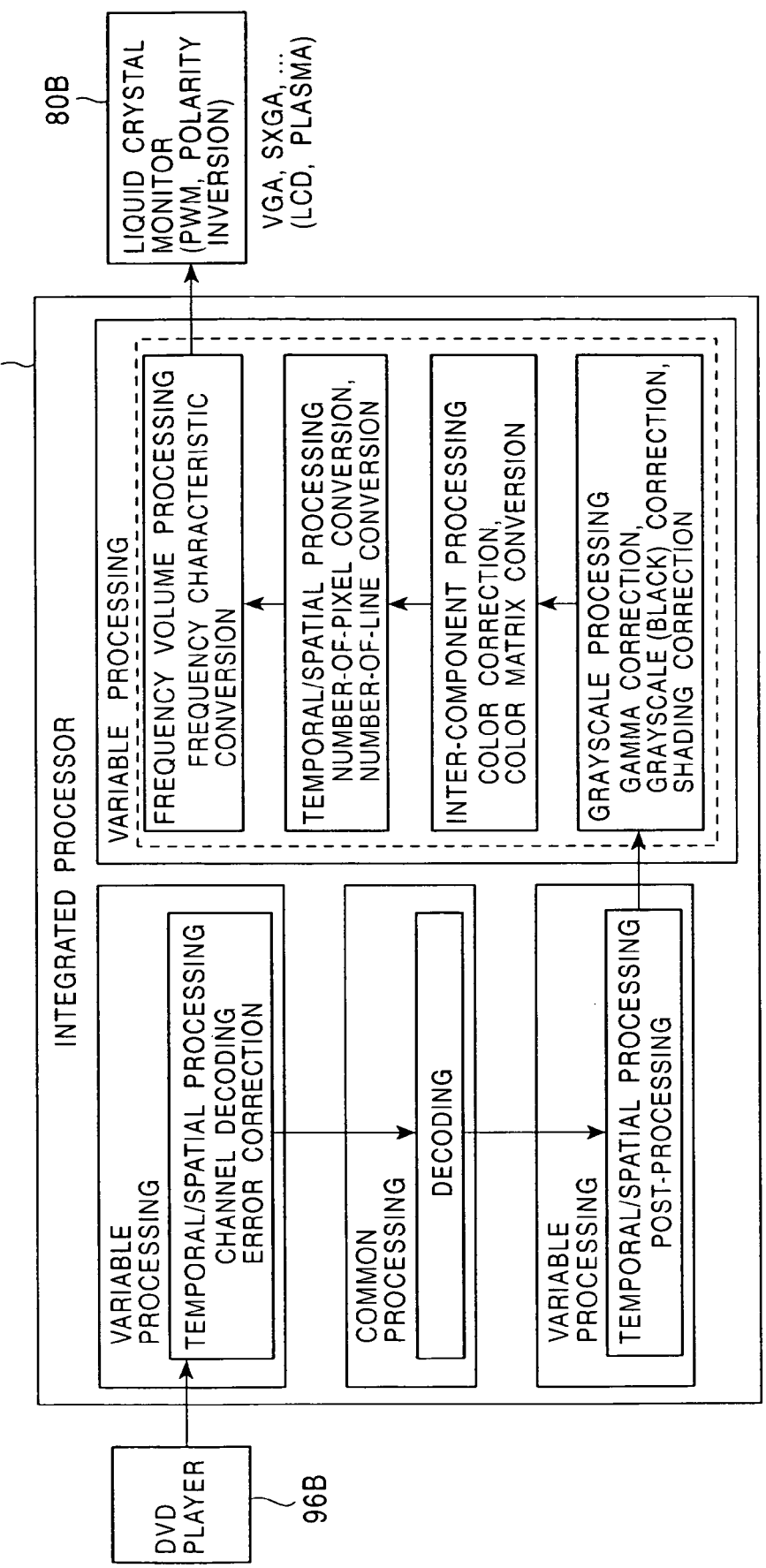
FIG. 40 illustrates processing performed by the integrated processing box 1 connected to a DVD player 96B and a liquid crystal monitor 80B, both of which are unique devices.

FIG. 40 illustrates a DVD player 96B (unique device) selected as a storage device and the liquid crystal monitor 80B (unique device) selected as an output device connected to the integrated processing box 1.

A playback signal obtained by the DVD player 96B is supplied to the integrated processor 27. The variable processing group 28 then performs the channel decoding processing and the error correction processing as the temporal/ spatial processing to be suitable for the DVD player 96B. The common processing group 29 then performs the decoding processing on the playback signal so as to decode it into image data. Subsequently, the variable processing group 28 performs the post-processing as the temporal/spatial processing on the decoded image data to be suitable for the DVD player 96B. The variable processing group 28 then performs the γ correction processing, the grayscale correction processing, the black level correction processing, and the shading processing as the grayscale processing, the color correction processing and the color matrix conversion processing as the inter-component processing, the number-of-pixel conversion processing and the number-of-line conversion processing as the temporal/spatial processing, and the frequency characteristic conversion processing as the frequency volume processing to be suitable for the liquid crystal monitor 80B. The resulting image is then supplied to and displayed on the liquid crystal monitor 80B.

In FIG. 40, as in FIG. 25, the grayscale processing, the inter-component processing, the temporal/spatial processing, and the frequency volume processing performed to be suitable for the liquid crystal monitor 80B can all be performed by classification adaptive processing. Accordingly, the above-described processing can be individually performed by learning the corresponding prediction coefficients. Alternatively, prediction coefficients for performing all the types of processing are learned, and the processing can be simultaneously performed.

In FIG. 40, the channel decoding processing as the temporal/spatial processing corresponds to the processing performed by the channel decoding circuit 135 shown in FIG. 39. The error correction coding processing as the temporal/spatial processing corresponds to the processing performed by the error correction circuit 136 shown in FIG. 39. The decoding processing as the common processing corresponds to the processing performed by the decoding circuit 137 shown in FIG. 39. The post-processing as the temporal/spatial processing corresponds to the post-processing circuit 138 shown in FIG. 39. The γ correction processing, the grayscale correction processing, and the black level correction processing as the grayscale processing correspond to the processing performed by the level conversion circuit 85 and the multi-leveling circuit 86 shown in FIG. 22.

In FIG. 40, in the color matrix conversion processing as the inter-component processing, when the image data output from the DVD player 96B is formed of Y, U, and V components, the Y, U, and V components are converted into R, G, and B components. However, when the image data output from the DVD player 96B is formed of R, G, and B components, the color matrix conversion processing is not performed.

Figure 41:
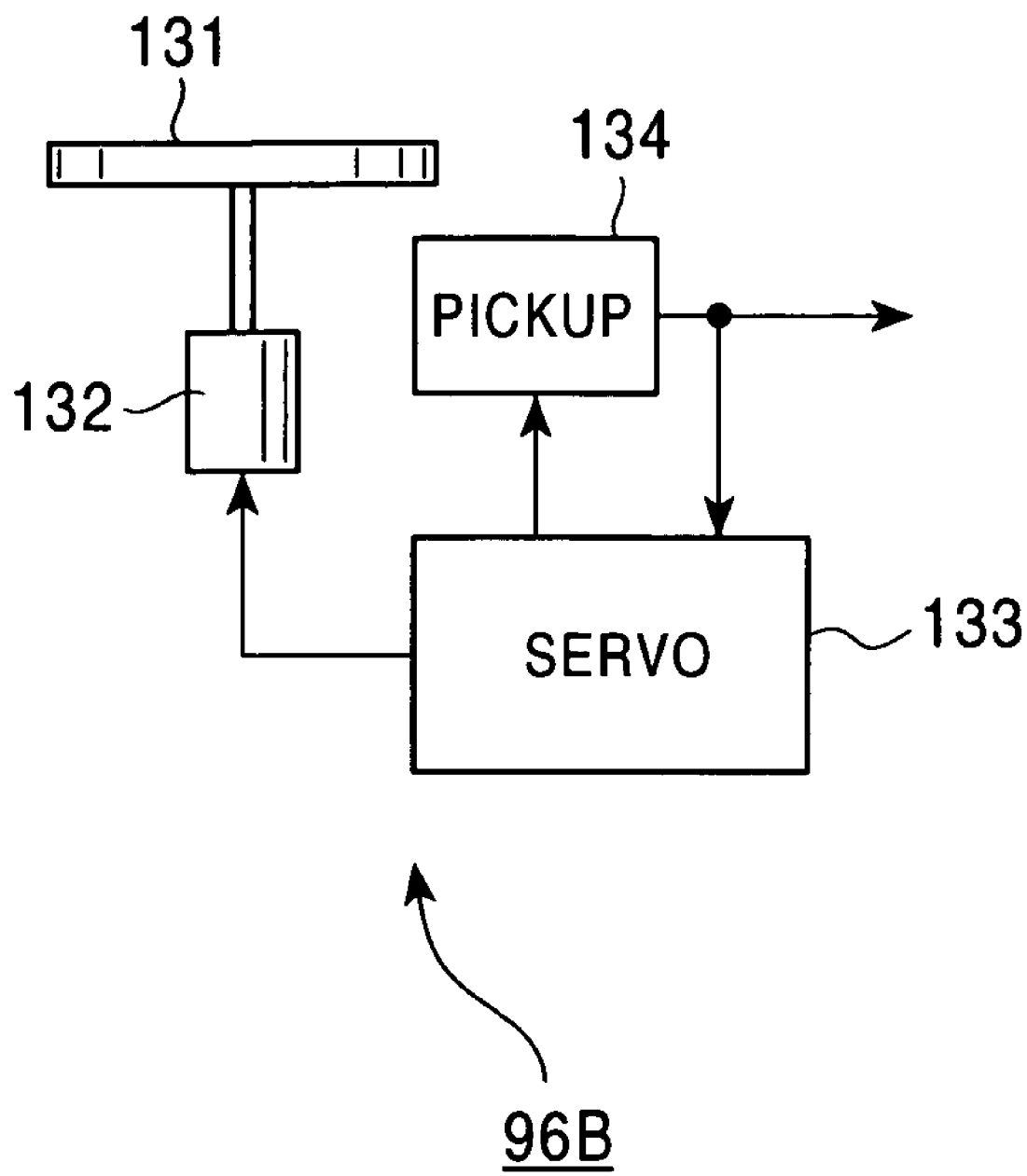
FIG. 41 is a block diagram illustrating an example of the configuration of the DVD player 96B.

FIG. 41 illustrates an example of the configuration of the DVD player 96B shown in FIG. 40. The same elements as those shown in FIG. 39 are designated with like reference numerals.

Since the common processing and the variable processing are performed by the integrated processor 27, the DVD player 96B can be formed without blocks performing such processing. That is, it is possible to form the DVD player 96B, as shown in FIG. 41, without the channel decoding circuit 135, the error correction circuit 136, the decoding circuit 137, and the post-processing circuit 138 shown in FIG. 39.

As is seen from the foregoing description, in the integrated processing box 1, common processing is performed on data supplied from and supplied to various devices, and variable processing for the individual devices is also performed. Thus, it is possible to form a device to be connected to the integrated processing box 1 only with minimal portions (unique portions) which serve the functions of the device. This enables the user to replace only the unique portions of the device, thereby reducing the financial burden on the user.

The above-described series of processing performed by the integrated processing box 1 may be executed by hardware or software. If software is used, the corresponding software program is installed in a general-purpose computer.

Figure 42:
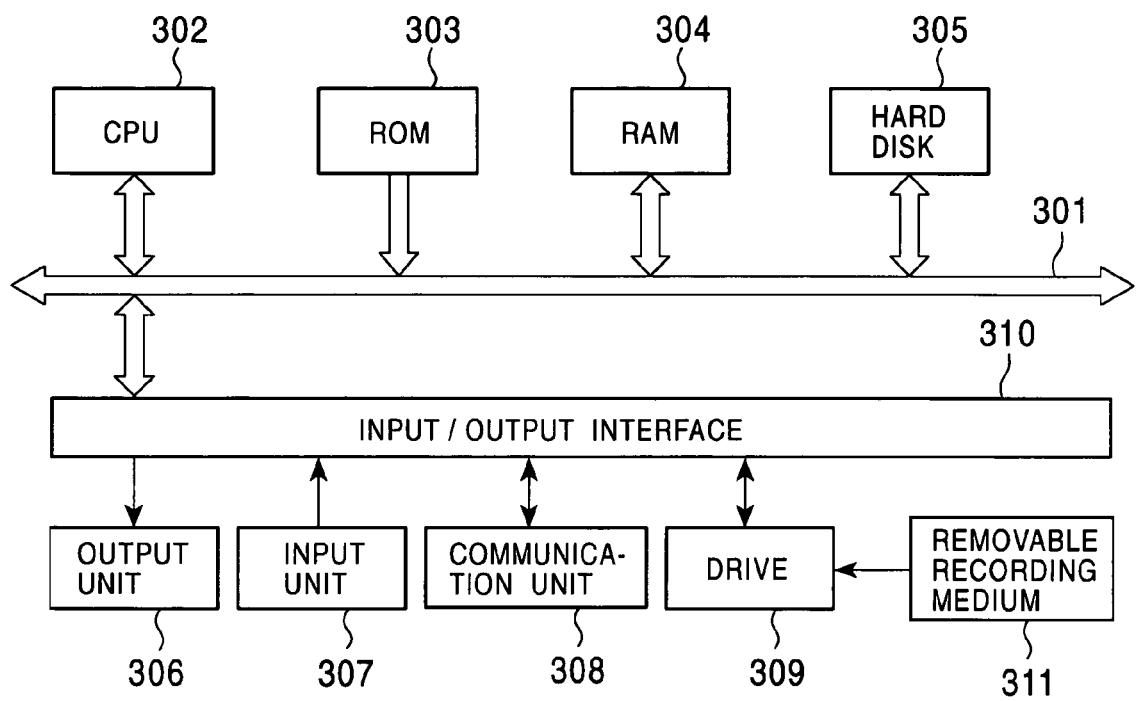
FIG. 42 is a block diagram illustrating an example of the configuration of a computer to which the present invention is applied.

FIG. 42 illustrates an example of the configuration of a computer into which the above-described software program is installed.

The program may be recorded in advance in a hard disk 305 or a read only memory (ROM) 303 as a recording medium built into a computer.

Alternatively, the program may be temporarily or permanently stored (recorded) in a removable recording medium 311, such as a floppy disk, a compact disc read only memory (CD-ROM), a magneto optical (MO) disk, a DVD disk, a magnetic disk, and a semiconductor memory. Such a removable recording medium 311 may be provided as package software.

Instead of installing the program from the removable recording medium 311 to a computer, the program may be transferred from a download site to the computer wirelessly via a digital broadcast artificial satellite, or by cable via a network, such as the Internet or a local area network (LAN). The computer may then receive the program by a communication unit 308 and install it in the built-in hard disk 305.

The computer has a built-in central processing unit (CPU) 302. An input/output interface 310 is connected to the CPU 302 via a bus 301. When a user inputs an instruction by operating an input unit 307, such as a keyboard, a mouse, or a microphone, via the input/output interface 310, the CPU 302 executes a program stored in the ROM 303. The CPU 302 also loads the following types of programs into a random access memory (RAM) 304, and executes them: a program stored in the hard disk 305, a program transferred via a satellite or a network, received by the communication unit 308, and then installed in the hard disk 305, and a program read from the removable recording medium 311 attached to a drive 309 and then installed in the hard disk 305. In this case, the CPU 302 executes the processing indicated by the above-described flow charts or block diagrams. The CPU 302 then outputs the processed result from an output unit 306, such as a LCD or a speaker, or transmits the processed result from the communication unit 308, or record it in the hard disk 305, via the input/output interface 310, as required.

It is not essential that the steps forming the program which causes a computer to perform various types of processing be executed chronologically according to the order discussed in this specification. Alternatively, they may be executed concurrently or individually (for example, concurrent or object processing may be performed).

The program may be executed by a single computer. Alternatively, distributed processing may be performed on the program by a plurality of computers. Or, the program may be transferred to and executed in a remote computer.

The integrated processing box 1 may be formed as a portable type, and may be attached to, for example, a video camera (either a unique device or a regular device).

The integrated processing box 1 may be connected to devices other than the above-described devices.

Although in this embodiment image data is processed in the integrated processing box 1, data other than the image data, such as audio data, may be processed.

Additionally, the same types of input devices, such as video cameras, may be handled as different types, according to the manufacturers or machine types, in which case, the integrated processor 27 performs different types of processing for such video cameras. The same applies to output devices and storage devices.

What is claimed is:

1. A data processing apparatus for selectively receiving information data from a plurality of types of input devices, comprising:
    input interface means functioning as an interface with said plurality of types of input devices;
    input common processing means for performing processing, commonly to said plurality of types of input devices, on the information data received from said plurality of types of input devices via said input interface means; and
    input variable processing means for performing processing, variably according to the type of input device selected from said plurality of types of input devices, on the information data received from said plurality of types of input devices via said input interface means,
    wherein said input common processing means and said input variable processing means are simultaneously performed using prediction coefficients learned for performing the input common processing means and the input variable processing means at one time.

2. A data processing apparatus according to claim 1, further comprising input device detection means for detecting the type of input device from which the information data is received via said input interface means, wherein said input common processing means and said input variable processing means perform the processing based on a detection result obtained from said input device detection means.

3. A data processing apparatus according to claim 1, wherein said input interface means functions as an interface with each of at least two of said input devices.

4. A data processing apparatus according to claim 1, further comprising:
    output interface means functioning as an interface with a plurality of types of output devices;
    output common processing means for performing processing, commonly to said plurality of types of output devices, on information data to be supplied to said plurality of types of output devices via said output interface means; and
    output variable processing means for performing processing, variably according to the type of output device selected from said plurality of types of output devices, on the information data supplied to said plurality of types of output devices via said output interface means.

5. A data processing apparatus according to claim 4, further comprising output device detection means for detecting the type of output device to which the information data is to be supplied via said output interface means, wherein said output common processing means and said output variable processing means perform the processing based on a detection result obtained from said output device detection means.

6. A data processing apparatus according to claim 4, wherein said output interface means functions as an interface with each of at least two of said output devices.

7. A data processing apparatus according to claim 4, wherein said input interface means and said output interface means are integrated into a single interface.

8. A data processing apparatus according to claim 1, further comprising:
    storage interface means functioning as an interface with a plurality of types of storage devices;
    storage common processing means for performing processing, commonly to said plurality of types of storage devices, on information data received from said plurality of types of storage devices via said storage interface means or information data supplied to said plurality of storage devices via said storage interface means; and
    storage variable processing means for performing processing, variably according to the type of storage device selected from said plurality of types of storage devices, on the information data received from said plurality of types of storage devices via said storage interface means or the information data supplied to said plurality of types of storage devices via said storage interface means.

9. A data processing apparatus according to claim 8, further comprising storage device detection means for detecting the type of storage device from or to which the information data is received or supplied via said storage interface means, wherein said storage common processing means and said storage variable processing means perform the processing based on a detection result obtained from said storage device detection means.

10. A data processing apparatus according to claim 8, wherein said storage interface means functions as an interface with each of at least two of said storage devices.

11. A data processing apparatus according to claim 8, wherein said input interface means and said storage interface means are integrated into one interface.

12. A data processing apparatus according to claim 4, further comprising:
    storage interface means functioning as an interface with a plurality of types of storage devices;
    storage common processing means for performing processing, commonly to said plurality of types of storage devices, on information data received from said plurality of types of storage devices via said storage interface means or information data supplied to said plurality of storage devices via said storage interface means; and
    storage variable processing means for performing processing, variably according to the type of storage device selected from said plurality of types of storage devices, on the information data received from said plurality of types of storage devices via said storage interface means or the information data supplied to said plurality of types of storage devices via said storage interface means.

13. A data processing apparatus according to claim 12, wherein said input interface means, said output interface means, and said storage interface means are integrated into a single interface.

14. A data processing method for use in a data processing apparatus for selectively receiving information data from a plurality of types of input devices, comprising:
    an input common processing step of performing processing, commonly to said plurality of types of input devices, on the information data received from said plurality of types of input devices via input interface means functioning as an interface with said plurality of types of input devices; and an input variable processing step of performing processing, variably according to the input device selected from said plurality of types of input devices, on the information data received from said plurality of types of input devices via said input interface means, wherein said input common processing step and said input variable processing step are simultaneously performed using prediction coefficients learned for performing the input common processing step and the input variable processing step at one time.

15. A recording medium for storing a program which causes a computer to perform data processing for processing information data received from a plurality of types of input devices, said program comprising:

an input common processing step of performing processing, commonly to said plurality of types of input devices, on the information data received from said plurality of types of input devices via input interface means functioning as an interface with said plurality of types of input devices; and an input variable processing step of performing processing, variably according to the input device selected from said plurality of types of input devices, on the information data received from said plurality of types of input devices via said input interface means, wherein said input common processing step and said input variable processing step are simultaneously performed using prediction coefficients learned for performing the input common processing step and the input variable processing step at one time.

16. A data processing apparatus for selectively supplying information data to a plurality of types of output devices, comprising:

output interface means functioning as an interface with said plurality of types of output devices;

output common processing means for performing processing, commonly to said plurality of types of output devices, on the information data to be supplied to said plurality of types of output devices via said output interface means; and output variable processing means for performing processing, variably according to the type of output device selected from said plurality of types of output devices, on the information data to be supplied to said plurality of types of output devices via said output interface means, wherein said output common processing means and said output variable processing means are simultaneously performed using prediction coefficients learned for performing the output common processing means and the output variable processing means at one time.

17. A data processing apparatus according to claim 16, further comprising output device detection means for detecting the type of output device to which the information data is to be supplied via said output interface means, wherein said output common processing means and said output variable processing means perform the processing based on a detection result obtained from said output device detection means.

18. A data processing apparatus according to claim 16, wherein said output interface means functions as an interface with each of at least two of said output devices.

19. A data processing apparatus according to claim 16, further comprising:

storage interface means functioning as an interface with a plurality of types of storage devices;

storage common processing means for performing processing, commonly to said plurality of types of storage devices, on information data received from said plurality of types of storage devices via said storage interface means or information data supplied to said plurality of storage devices via said storage interface means; and storage variable processing means for performing processing, variably according to the type of storage device selected from said plurality of types of storage devices, on the information data received from said plurality of types of storage devices via said storage interface means or the information data supplied to said plurality of types of storage devices via said storage interface means.

20. A data processing apparatus according to claim 19, further comprising storage device detection means for detecting the type of storage device from or to which the information data is received or supplied via said storage interface means, wherein said storage common processing means and said storage variable processing means perform the processing based on a detection result obtained from said storage device detection means.

21. A data processing apparatus according to claim 19, wherein said storage interface means functions as an interface with each of at least two of said storage devices.

22. A data processing apparatus according to claim 19, wherein said output interface means and said storage interface means are integrated into a single interface.

23. A data processing method for use in a data processing apparatus for selectively supplying information data to a plurality of types of output devices, comprising:

an output common processing step of performing processing, commonly to said plurality of output devices, on the information data to be supplied to said plurality of types of output devices via output interface means functioning as an interface with said plurality of types of output devices; and an output variable processing step of performing processing, variably according to the type of output device selected from said plurality of types of output devices, on the information data to be supplied to said plurality of types of output devices via said output interface means, wherein said output common processing step and said output variable processing step are simultaneously performed using prediction coefficients learned for performing the output common processing step and the output variable processing step at one time.

24. A recording medium for storing a program which causes a computer to perform data processing for processing information data to be supplied to a plurality of types of output devices, said program comprising:

an output common processing step of performing processing, commonly to said plurality of output devices, on the information data to be supplied to said plurality of types of output devices via output interface means functioning as an interface with said plurality of types of output devices; and an output variable processing step of performing processing, variably according to the type of output device selected from said plurality of types of output devices, on the information data to be supplied to said plurality of types of output devices via said output interface means, wherein said output common processing step and said output variable processing step are simultaneously performed using prediction coefficients learned for performing the output common processing step and the output variable processing step at one time.

25. A data processing apparatus for selectively receiving and supplying information data from and to a plurality of types of storage devices, comprising:
storage interface means functioning as an interface with a plurality of types of storage devices;
storage common processing means for performing processing, commonly to said plurality of types of storage devices, on the information data received from said plurality of types of storage devices via said storage interface means or the information data supplied to said plurality of storage devices via said storage interface means; and
storage variable processing means for performing processing, variably according to the type of storage device selected from said plurality of types of storage devices, on the information data received from said plurality of types of storage devices via said storage interface means or information data supplied to said plurality of types of storage devices via said storage interface means,
wherein said storage common processing means and said storage variable processing means are simultaneously performed using prediction coefficients learned for performing the storage common processing means and the storage variable processing means at one time.

26. A data processing apparatus according to claim 25, further comprising storage device detection means for detecting the type of storage device from or to which the information data is received or supplied via said storage interface means, wherein said storage common processing means and said storage variable processing means perform the processing based on a detection result obtained from said storage device detection means.

27. A data processing apparatus according to claim 25, wherein said storage interface means functions as an interface with each of at least two of said storage devices.

28. A data processing method for use in a data processing apparatus for selectively receiving and supplying information data from and to a plurality of types of storage devices, comprising:
a storage common processing step of performing processing, commonly to said plurality of types of storage devices, on the information data to be supplied to said plurality of types of storage devices via storage interface means functioning as an interface with said plurality of types of storage devices, or on the information data received from said plurality of types of storage devices via said storage interface means; and
a storage variable processing step of performing processing, variably according to the type of storage device selected from said plurality of types of storage devices, on the information data to be supplied to said plurality of types of storage devices from said storage interface means, or on the information data received from said plurality of types of storage devices via said storage interface means,
wherein said storage common processing step and said storage variable processing step are simultaneously performed using prediction coefficients learned for performing the storage common processing step and the storage variable processing step at one time.

29. A recording medium for storing a program which causes a computer to perform data processing for processing information data received and supplied from and to a plurality of types of storage devices, said program comprising:
a storage common processing step of performing processing, commonly to said plurality of types of storage devices, on the information data to be supplied to said plurality of types of storage devices via storage interface means functioning as an interface with said plurality of types of storage devices, or on the information data received from said plurality of types of storage devices via said storage interface means; and
a storage variable processing step of performing processing, variably according to the type of storage device selected from said plurality of types of storage devices, on the information data to be supplied to said plurality of types of storage devices from said storage interface means, or on the information data received from said plurality of types of storage devices via said storage interface means,
wherein said storage common processing step and said storagevariable processing step are simultaneously performed using prediction coefficients learned for performing the storage common processing steps and the storage variable processing step at one time.

30. A data processing unit adapted to selectively receive information data from a plurality of types of input devices, comprising:
input interface unit adapted to function as an interface with said plurality of types of input devices;
input common processing unit adapted to perform processing, commonly to said plurality of types of input devices, on the information data received from said plurality of types of input devices via said input interface unit; and
input variable processing unit adapted to perform processing, variably according to the type of input device selected from said plurality of types of input devices, on the information data received from said plurality of types of input devices via said input interface unit,
wherein said input common processing and said input variable processing are simultaneously performed using prediction coefficients learned for performing the input common processing and the input variable processing at one time.

31. A data processing unit according to claim 30, further comprising input device detection unit adapted to detect the type of input device from which the information data is received via said input interface unit, wherein said input common processing unit and said input variable processing unit perform the processing based on a detection result obtained from said input device detection unit.

32. A data processing unit according to claim 30, wherein said input interface unit adapted to function as an interface with each of at least two of said input devices.

33. A data processing unit according to claim 30, further comprising:
output interface unit adapted to function as an interface with a plurality of types of output devices;
output common processing unit adapted to perform processing, commonly to said plurality of types of output devices, on information data to be supplied to said plurality of types of output devices via said output interface unit; and
output variable processing unit adapted to perform processing, variably according to the type of output device selected from said plurality of types of output devices, on the information data supplied to said plurality of types of output devices via said output interface unit.

34. A data processing unit according to claim 33, further comprising output device detection unit adapted to detect the type of output device to which the information data is to be supplied via said output interface unit, wherein said output common processing unit and said output variable processing unit perform the processing based on a detection result obtained from said output device detection unit.

35. A data processing unit according to claim 33, wherein said output interface unit adapted to function as an interface with each of at least two of said output devices.

36. A data processing unit according to claim 33, wherein said input interface unit and said output interface unit are integrated into a single interface.

37. A data processing unit according to claim 30, further comprising:
    storage interface unit adapted to function as an interface with a plurality of types of storage devices;
    storage common processing unit adapted to perform processing, commonly to said plurality of types of storage devices, on information data received from said plurality of types of storage devices via said storage interface unit or information data supplied to said plurality of storage devices via said storage interface unit; and
    storage variable processing unit adapted to perform processing, variably according to the type of storage device selected from said plurality of types of storage devices, on the information data received from said plurality of types of storage devices via said storage interface unit or the information data supplied to said plurality of types of storage devices via said storage interface unit.

38. A data processing unit according to claim 37, further comprising storage device detection unit adapted to detect the type of storage device from or to which the information data is received or supplied via said storage interface unit, wherein said storage common processing unit and said storage variable processing unit perform the processing based on a detection result obtained from said storage device detection unit.

39. A data processing unit according to claim 37, wherein said storage interface unit adapted to function as an interface with each of at least two of said storage devices.

40. A data processing unit according to claim 37, wherein said input interface unit and said storage interface unit are integrated into one interface.

41. A data processing unit according to claim 33, further comprising:
    storage interface unit adapted to function as an interface with a plurality of types of storage devices;
    storage common processing unit adapted to perform processing, commonly to said plurality of types of storage devices, on information data received from said plurality of types of storage devices via said storage interface unit or information data supplied to said plurality of storage devices via said storage interface unit; and
    storage variable processing unit adapted to perform processing, variably according to the type of storage device selected from said plurality of types of storage devices, on the information data received from said plurality of types of storage devices via said storage interface unit or the information data supplied to said plurality of types of storage devices via said storage interface unit.

42. A data processing unit according to claim 41, wherein said input interface unit, said output interface unit, and said storage interface unit are integrated into a single interface.

43. A data processing unit adapted to selectively supply information data to a plurality of types of output devices, comprising:
    an output interface unit adapted to function as an interface with said plurality of types of output devices;
    an output common processing unit adapted to perform processing, commonly to said plurality of types of output devices, on the information data to be supplied to said plurality of types of output devices via said output interface unit; and
    an output variable processing unit adapted to perform processing, variably according to the type of output device selected from said plurality of types of output devices, on the information data to be supplied to said plurality of types of output devices via said output interface unit,
    wherein said output common processing and said output variable processing are simultaneously performed using prediction coefficients learned for performing the output common processing and the output variable processing at one time.

44. A data processing unit according to claim 43, further comprising output device detection unit adapted to detect the type of output device to which the information data is to be supplied via said output interface unit, wherein said output common processing unit and said output variable processing unit perform the processing based on a detection result obtained from said output device detection unit.

45. A data processing unit according to claim 43, wherein said output interface unit adapted to function as an interface with each of at least two of said output devices.

46. A data processing unit according to claim 43, further comprising:
    storage interface unit adapted to function as an interface with a plurality of types of storage devices;
    storage common processing unit adapted to perform processing, commonly to said plurality of types of storage devices, on information data received from said plurality of types of storage devices via said storage interface unit or information data supplied to said plurality of storage devices via said storage interface unit; and
    storage variable processing unit adapted to perform processing, variably according to the type of storage device selected from said plurality of types of storage devices, on the information data received from said plurality of types of storage devices via said storage interface unit or the information data supplied to said plurality of types of storage devices via said storage interface unit.

47. A data processing unit according to claim 46, further comprising storage device detection unit adapted to detect the type of storage device from or to which the information data is received or supplied via said storage interface unit, wherein said storage common processing unit and said storage variable processing unit perform the processing based on a detection result obtained from said storage device detection unit.

48. A data processing unit according to claim 46, wherein said storage interface unit adapted to function as an interface with each of at least two of said storage devices.

49. A data processing unit according to claim 46, wherein said output interface unit and said storage interface unit are integrated into a single interface.

50. A data processing unit adapted to selectively receive and supply information data from and to a plurality of types of storage devices, comprising:
storage interface unit adapted to function as an interface with a plurality of types of storage devices;
storage common processing unit adapted to perform processing, commonly to said plurality of types of storage devices, on the information data received from said plurality of types of storage devices via said storage interface unit or the information data supplied to said plurality of storage devices via said storage interface unit; and
storage variable processing unit adapted to perform processing, variably according to the type of storage device selected from said plurality of types of storage devices, on the information data received from said plurality of types of storage devices via said storage interface unit or information data supplied to said plurality of types of storage devices via said storage interface unit,
wherein said storage common processing and said storage variable processing storage are simultaneously performed using prediction coefficients learned for performing the storage common processing and the storage variable processing at one time.

51. A data processing unit according to claim 50, further comprising storage device detection unit adapted to detect the type of storage device from or to which the information data is received or supplied via said storage interface unit, wherein said storage common processing unit and said storage variable processing unit perform the processing based on a detection result obtained from said storage device detection unit.

52. A data processing unit according to claim 50, wherein said storage interface unit adapted to function as an interface with each of at least two of said storage devices.

* * * * *